United States Patent
Okamoto et al.

(10) Patent No.: US 7,277,123 B1
(45) Date of Patent: Oct. 2, 2007

(54) DRIVING-OPERATION ASSIST AND RECORDING MEDIUM

(75) Inventors: Shusaku Okamoto, Hirakata (JP); Hirofumi Ishii, Nara (JP); Masamichi Nakagawa, Hirakata (JP); Kunio Nobori, Kadoma (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/581,004

(22) PCT Filed: Oct. 6, 1999

(86) PCT No.: PCT/JP99/05509

§ 371 (c)(1),
(2), (4) Date: Jul. 17, 2000

(87) PCT Pub. No.: WO00/20257

PCT Pub. Date: Apr. 13, 2000

(30) Foreign Application Priority Data

Oct. 8, 1998 (JP) .................................. 10-286246
Dec. 8, 1998 (JP) .................................. 10-349107

(51) Int. Cl.
*H04N 7/18* (2006.01)
(52) U.S. Cl. ................................................... 348/148
(58) Field of Classification Search .............. 348/14.1, 348/118–175; 340/461, 901, 937; 359/896; 382/104, 283; 701/41, 301; *H04N 7/18*
See application file for complete search history.

(56) References Cited

U.S. PATENT DOCUMENTS

| | | | |
|---|---|---|---|
| 4,926,346 A | 5/1990 | Yokoyama | |
| 5,410,346 A | 4/1995 | Saneyoshi et al. | |
| 5,424,952 A | 6/1995 | Asayama | |
| 5,517,412 A | 5/1996 | Unoura | |
| 5,530,420 A | 6/1996 | Tsuchiya et al. | |
| 5,535,144 A | 7/1996 | Kise | |
| 5,587,938 A | 12/1996 | Hoetzel | |
| 5,638,116 A | 6/1997 | Shimoura et al. | |
| 5,647,019 A | 7/1997 | Iino et al. | |

(Continued)

FOREIGN PATENT DOCUMENTS

EP  0 841 648 A2  5/1998

(Continued)

OTHER PUBLICATIONS

English Translation of Japanese Search Report, application No. PCT/JP/99/04061, dated Oct. 26, 1999.

(Continued)

*Primary Examiner*—Tung Vo
(74) *Attorney, Agent, or Firm*—RatnerPrestia

(57) ABSTRACT

A vehicle-operation assist includes a circumferential-state imager for imaging a circumferential state of a vehicle with a camera and generating a circumferential-state image; a synthetic-image generator for generating a synthetic image by superimposing on the circumferential-state image, an assumed-movement pattern of the vehicle performing a predetermined series of driving operations; and a display for displaying the synthetic image. The circumferential-state imager has at least one camera and a camera parameter table for storing characteristics of the camera and generating the circumferential-state image on the basis of the camera characteristics.

2 Claims, 44 Drawing Sheets

U.S. PATENT DOCUMENTS

| | | | |
|---|---|---|---|
| 5,692,061 A | 11/1997 | Sasada et al. | |
| 5,757,287 A * | 5/1998 | Kitamura et al. | 340/937 |
| 5,796,991 A * | 8/1998 | Shimizu | 703/1 |
| 5,883,739 A * | 3/1999 | Ashihara et al. | 359/462 |
| 5,915,033 A | 6/1999 | Tanigawa et al. | |
| 5,929,784 A | 7/1999 | Kawaziri et al. | |
| 5,949,331 A | 9/1999 | Schofield et al. | |
| 5,969,969 A * | 10/1999 | Ejiri et al. | 701/41 |
| 5,994,701 A | 11/1999 | Tsuchimoto et al. | |
| 6,119,068 A * | 9/2000 | Kannonji | 701/301 |
| 6,169,572 B1 | 1/2001 | Sogawa | |
| 6,396,535 B1 * | 5/2002 | Waters | 348/159 |
| 6,476,855 B1 * | 11/2002 | Yamamoto | 348/148 |
| 6,583,403 B1 * | 6/2003 | Koike et al. | 250/221 |

FOREIGN PATENT DOCUMENTS

| | | |
|---|---|---|
| EP | 1179958 A1 * | 2/2002 |
| JP | 52-57867 | 5/1977 |
| JP | 61-113532 | 5/1986 |
| JP | 64-14700 | 1/1989 |
| JP | 3-99952 | 4/1991 |
| JP | 3-166534 | 7/1991 |
| JP | 5-310078 | 11/1993 |
| JP | 6-234341 | 8/1994 |
| JP | 7-186833 | 7/1995 |
| JP | 08-48198 | 2/1996 |
| JP | 08-96118 | 4/1996 |
| JP | 08-241498 | 9/1996 |
| JP | 08-280006 | 10/1996 |
| JP | 9-114979 | 2/1997 |
| JP | 09-189517 | 7/1997 |
| JP | 9-305796 | 11/1997 |
| JP | 10-40499 | 2/1998 |
| JP | 10-124704 | 5/1998 |
| JP | 10-164566 | 6/1998 |
| JP | 10 244891 A | 9/1998 |
| JP | 10-257482 * | 9/1998 |
| JP | 10-262240 | 9/1998 |
| JP | 10 264841 A | 10/1998 |
| WO | WO 02/01876 A1 * | 1/2002 |
| WO | WO 02/01876 A1 * | 2/2002 |

OTHER PUBLICATIONS

European Search Report corresponding to application No. EP 99-93-3145 dated Jan. 31, 2005.

European Search Report corresponding to application EP 99 97 0064, dated Aug. 18, 2005.

* cited by examiner

| Number of revolutions of tire (Unit: One turn) | Steering angle of steering wheel (Unit: Degree) |
|---|---|
| 0.25 | 0 |
| 0.25 | -45 |
| 0.25 | -90 |
| 0.2 | -135 |
| 0.1 | -180 |
| 0.2 | -135 |
| 0.25 | -90 |
| 0.25 | -45 |
| 0.8 | 0 |
| 0.25 | 45 |
| 0.25 | 90 |
| 0.2 | 135 |
| 0.1 | 180 |
| 0.2 | 135 |
| 0.25 | 90 |
| 0.25 | 45 |
| 0.25 | 30 |
| 0.25 | 15 |
| 0.5 | 5 |
| 0.5 | 0 |

| Number of revolutions of tire (Unit: One turn) | Steering angle of steering wheel (Unit: Degree) |
|---|---|
| 0.2 | 0 |
| 0.25 | 45 |
| 0.25 | 90 |
| 0.2 | 135 |
| 0.1 | 180 |
| 0.2 | 135 |
| 0.25 | 90 |
| 0.25 | 45 |
| 0.25 | 30 |
| 0.25 | 15 |
| 0.5 | 5 |
| 0.75 | 0 |

601 Operation start position
602 Operation end position
603 Tire trace

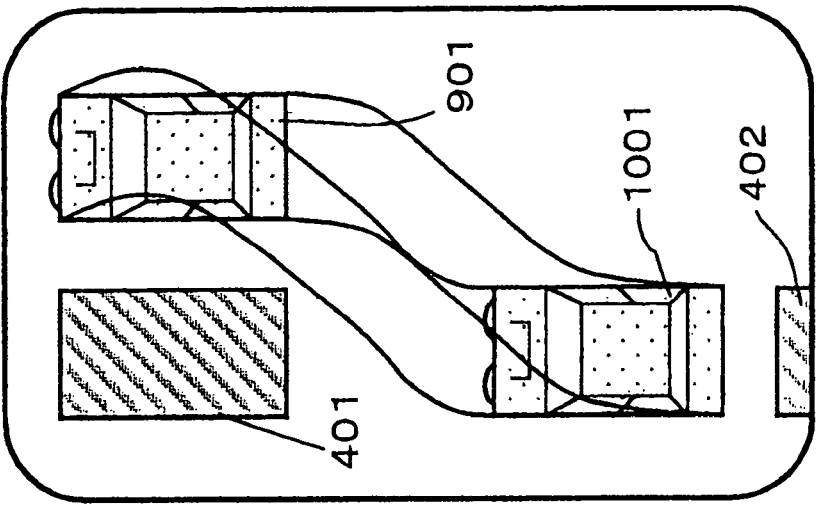
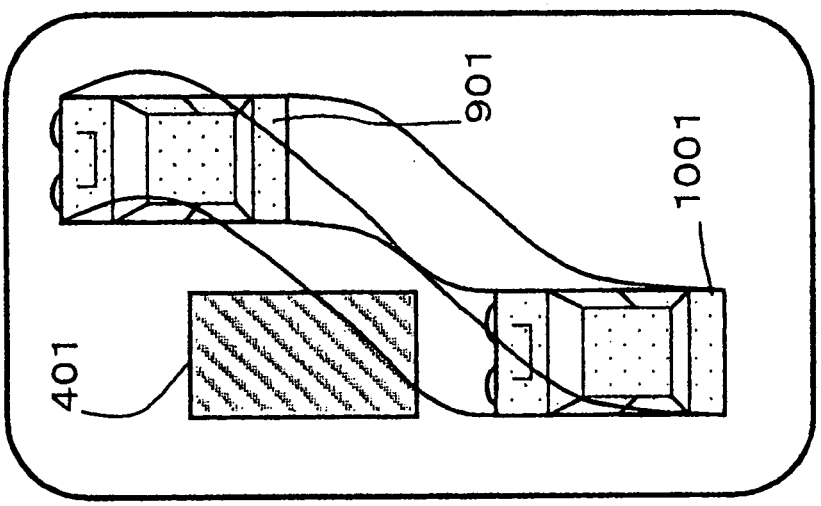
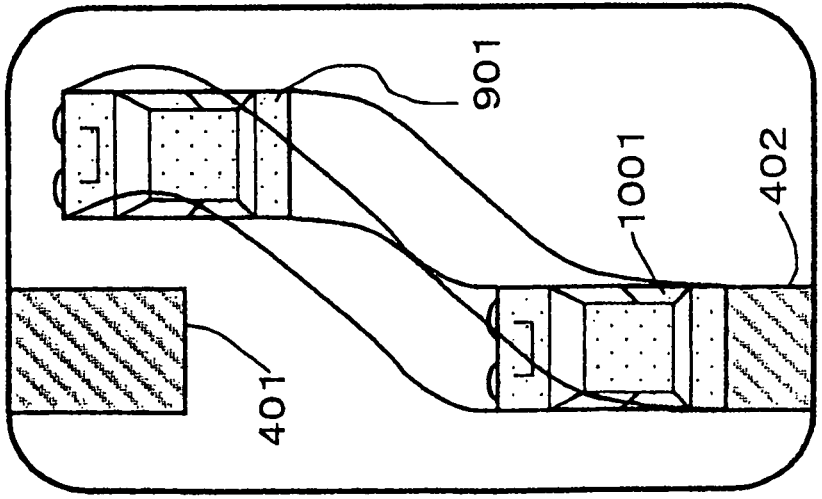

Fig. 11
Assumed-movement pattern 1101
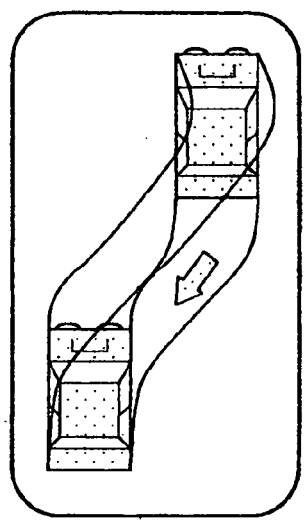
Assumed-movement pattern 1102
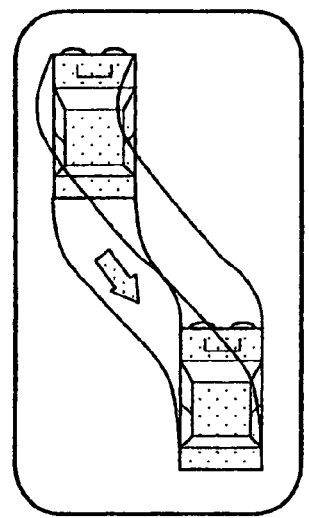
Assumed-movement pattern 1103
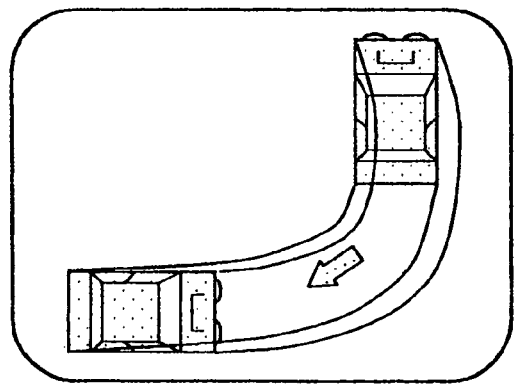
Assumed-movement pattern 1104
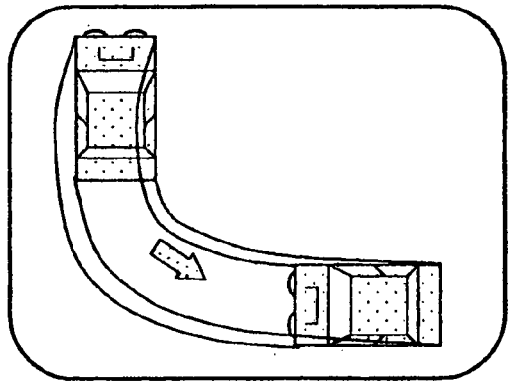

Parking-operation start position 1401

1402 Current vehicle position

1401 Parking-operation start position

1402 Current vehicle position

1403 Assumed-movement pattern

Synthetic image 1401
401
1402
1403
402

Fig. 24

| (1,10,10) | (1,11,11) | (1,12,12) | | | | | | | (2,0,100) |
|---|---|---|---|---|---|---|---|---|---|
| (1,12,12) | (1,12,13) | (1,12,14) | . | . . . . . | . | | | | (2,2,102) |
| ⋮ | ⋮ | ⋮ | | | | | | | ⋮ |
| | | | | | | | | | |
| (3,50,80) | (3,49,82) | (3,48,84) | | . . . . . . | | | | | (3,0,192) |

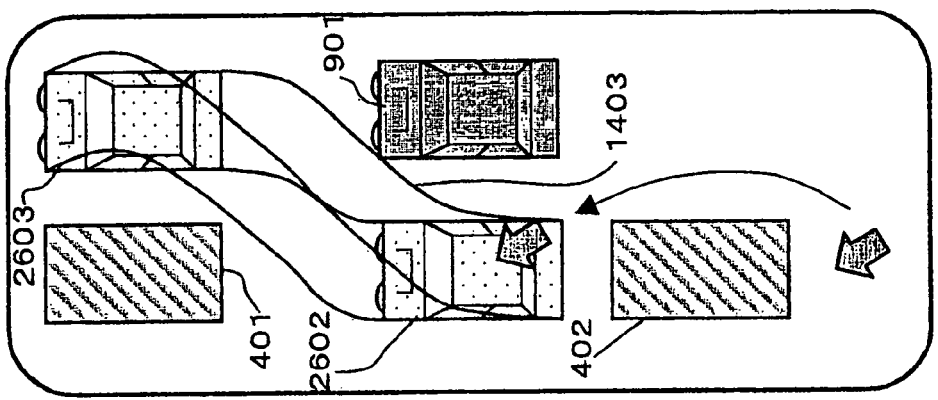
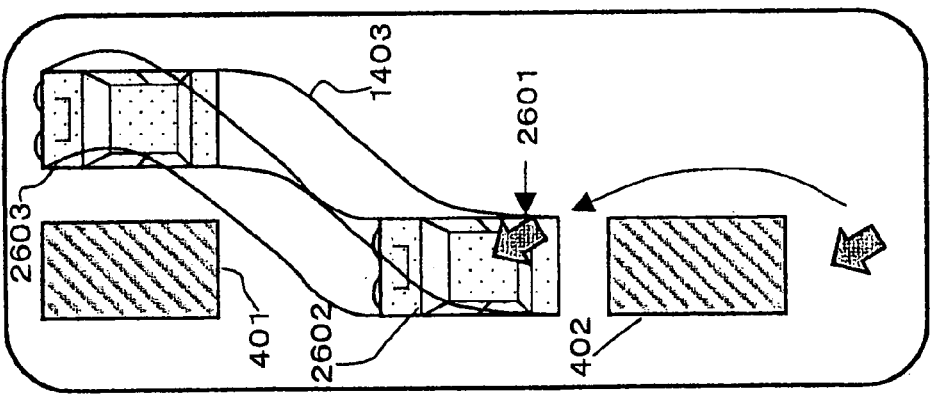
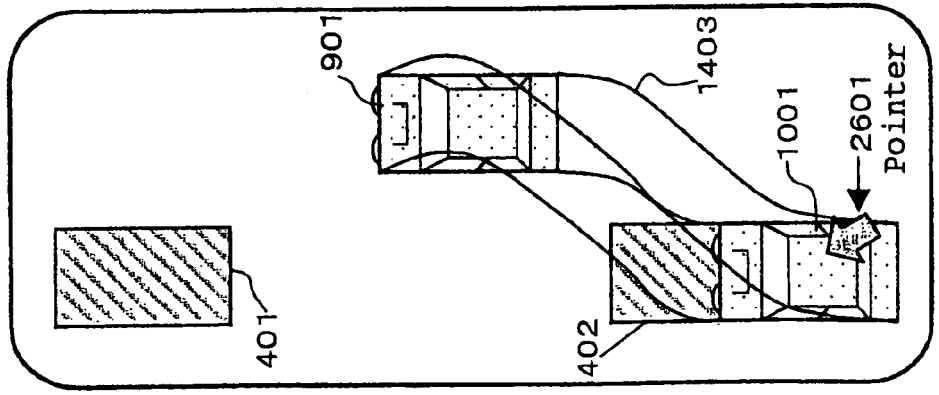

① Fixing of viewpoint to vehicle

② Start of driving operation

③ Fixing of viewpoint to space (Ground)

604 Circumscribed-area trace (Solid line)

603 Tire trace (Broken line)

| Tire | Hand | Hand |
|---|---|---|
| 0.2 | 180 | -180 |
| 0.4 | 180 | -180 |
| 0.6 | 180 | -180 |
| 0.8 | 180 | -180 |
| 1 | 180 | -180 |
| 1.2 | 180 | -180 |
| 1.4 | 180 | -180 |
| 1.6 | 180 | -180 |
| 1.8 | 180 | -180 |
| 2 | 180 | -180 |

| Tire | Hand |
|------|------|
| 0.2  | 180  |
| 0.4  | 180  |
| 0.6  | 180  |
| 0.8  | 180  |
| 0.8  | -180 |
| 0.6  | -180 |
| 0.6  | 180  |
| 0.8  | 180  |
| 1    | 90   |
| 1.2  | 30   |
| 1.4  | 0    |

Fig. 38

$$H'' = \Sigma n \Sigma i H(Xi, Yi) n$$
$$= \Sigma n \Sigma i H(fx(tm, km), fy(tm, km)) n$$

| Tire | Hand |
|---:|---:|
| 0.2 | 180 |
| 0.4 | 180 |
| 0.6 | 180 |
| 0.8 | 180 |
| 0.8 | -180 |
| 0.6 | -180 |
| 0.6 | 180 |
| 0.8 | 180 |
| 1 | 90 |
| 1.2 | 30 |
| 1.4 | 0 |

| Tire | Hand |
|---:|---:|
| 0.2 | 30 |
| 0.4 | 120 |
| 0.7 | 180 |
| 0.9 | 180 |
| 0.9 | -180 |
| 0.7 | -180 |
| 0.7 | 180 |
| 0.9 | 180 |
| 1.1 | 90 |
| 1.2 | 30 |
| 1.4 | 0 |

DRIVING-OPERATION ASSIST AND RECORDING MEDIUM

THIS APPLICATION IS A U.S. NATIONAL PHASE APPLICATION OF PCT INTERNATIONAL APPLICATION PCT/JP99/05509.

TECHNICAL FIELD

The present invention relates to a driving-operation assist for assisting driving operations of a vehicle and a recording medium for storing a program for making a computer execute all or some of functions of each means of the driving-operation assist.

BACKGROUND ART

A conventional general driving-operation assist estimates a moving trace of a vehicle corresponding to a steering angle of a steering wheel for backward movement of the vehicle by a steering sensor for detecting the steering angle of the steering wheel. When a vehicle moves backward, an image of a rear or side-rear field of view photographed by a camera is displayed and moreover, when the steering wheel is operated, a moving trace of the vehicle estimated correspondingly to the steering angle of the steering wheel is superimposed on the image of the rear or side-rear field of view. According to the assist, driving operations by a driver will be performed as described below. That is, a driver moves a vehicle to a place where the vehicle can be probably parked while fixing the steering wheel of the vehicle. Then, at the place, the driver finds a steering angle capable of moving the vehicle to a space for parking the vehicle without operating any steering wheel while confirming a vehicle-moving trace estimated by operating the steering wheel. Then, by moving the vehicle backward toward a parking space while keeping the steering angle, parking is theoretically completed.

A conventional example of the above driving-operation assist is disclosed in the official gazette of Japanese Patent Laid-Open No. 1-14700.

However, to park a vehicle by using the above assist, it is necessary to find a place where the vehicle can be moved to a parking space and then determine a steering angle at which the steering wheel is fixed. To master these operations, skill is necessary. Moreover, when the size of a vehicle to be driven is changed, a sense differs. Therefore, the driving know-how accumulated during skill is not greatly useful.

Incidentally, to park a vehicle, it is generally difficult to complete parking operations while keeping a steering angle of a steering wheel constant from start of the parking operations except a case in which there is no obstacle nearby. For example, to perform parallel parking, a driver first moves a vehicle backward by turning the steering wheel in a proper direction while moving the vehicle to a place for parking the vehicle from a parking-operation start position and then, moves the vehicle to a target place by inversely turning the steering wheel when the vehicle properly moves backward. That is, in case of taking parallel parking as an example, it is difficult to park a vehicle while keeping a steering angle of a steering wheel constant.

Moreover, as for a conventional assist, if a driver slightly moves the steering wheel of a vehicle, a moving route of the vehicle re-estimated by the slight steering-angle change is displayed. Therefore, the driver may be confused.

That is, as for a conventional driving-operation assist, a driver cannot intuitively find a place where a vehicle can be easily moved to a parking space at a glance while confirming an image obtained by synthesizing the parking space, a state around the space, and a route for guiding the vehicle to the parking space.

DISCLOSURE OF THE INVENTION

The present invention is made to solve the above problems of an conventional driving-operation assist and its object is to provide a driving-operation assist by which a driver can directly confirm the relation between movements of a vehicle according to a predetermined series of driving operations and the circumferential state by displaying movements of the vehicle when the driver performs the predetermined series of driving operations together with the circumferential state and the load of the driver can be reduced.

Furthermore, it is another object of the present invention to provide a recording medium for storing a program for making a computer execute all or some of functions of each means of the above driving-operation assist.

To solve the above described problems the present invention provides a driving-operation assist characterized by comprising:

circumferential-state imaging means for imaging a circumferential state of a vehicle with a camera and generating a circumferential-state image and/or storing the generated circumferential-state image;

synthetic-image generating means for generating a synthetic image by superimposing on the circumferential-state image, an assumed-movement pattern which is the video data showing movement of the vehicle in case of performing a predetermined series of driving operations for the vehicle; and displaying means for displaying the synthetic image.

Another aspect of the present invention (corresponding to claim 26[sic; claim 33]) is a recording medium characterized by storing a program for making a computer execute all or some of functions of each means of the above driving-operation assist.

BRIEF DESCRIPTION OF THE DRAWINGS

FIGS. 10(a) to 10(c) are illustrations showing synthetic images of the driving-operation assist of the first embodiment of the present invention;

FIG. 11 shows illustrations of variation of assumed-movement patterns stored in assumed-movement-pattern storing means 108 of the driving-operation assist of the first embodiment of the present invention;

FIG. 24 is a conceptual view showing a mapping table stored in a mapping table 2302 of the driving-operation assist of the seventh embodiment of the present invention;

FIGS. 26(a) to 26(c) are illustrations showing synthetic images of the driving-operation assist of the eighth embodiment of the present invention;

FIG. 38 is an illustration [sic; expression] showing a contact-hazard evaluation function of the driving-operation assist of the eleventh embodiment of the present invention;

DESCRIPTION OF SYMBOLS

Figure 1:
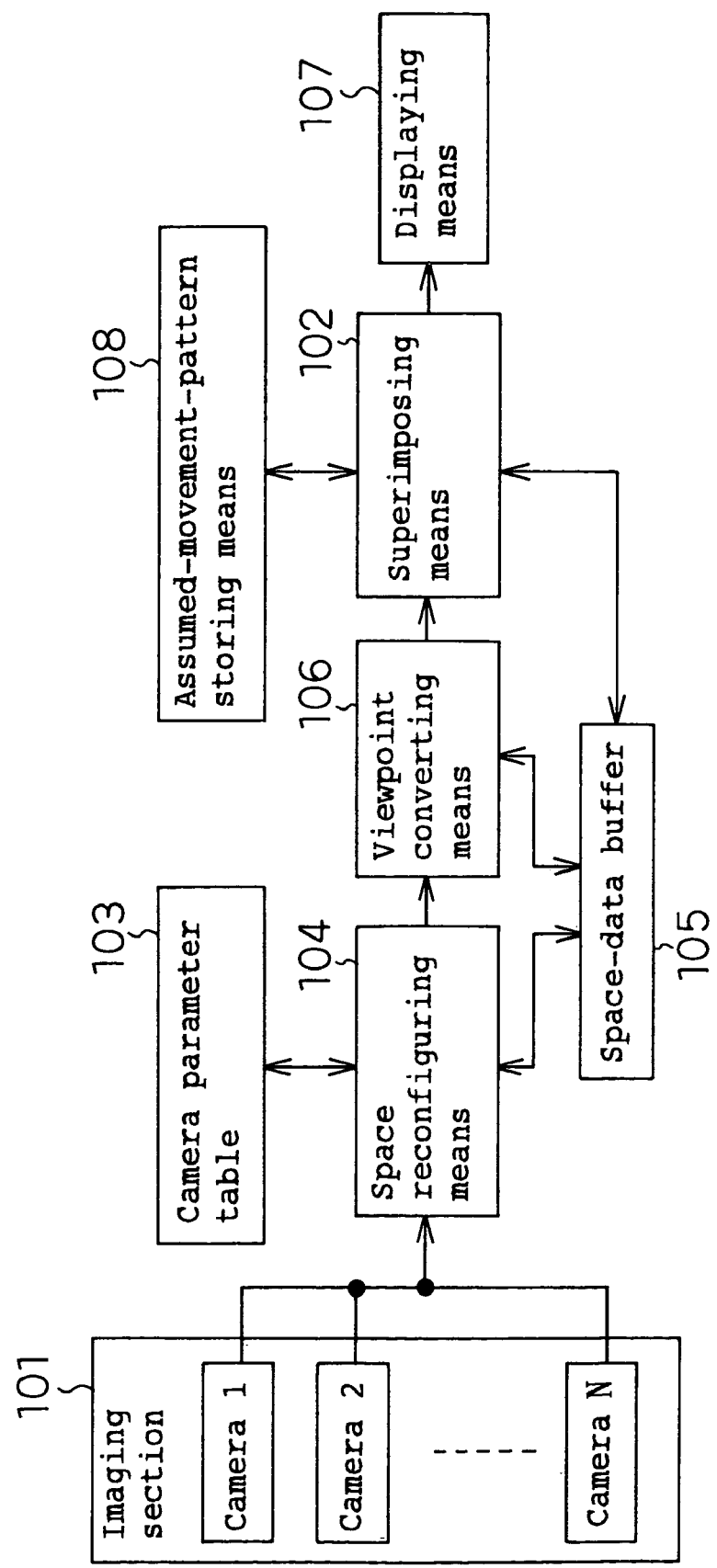
FIG. 1 is a block diagram showing a configuration of a driving-operation assist of a first embodiment of the present invention.

101 Imaging section
102 Superimposing means
103 Camera parameter table
104 Space reconfiguring means
105 Space-data buffer
106 Viewpoint converting means
107 Displaying means
108 Assumed-movement-pattern storing means
1301, 1501 Start detecting means
1302, 1703 Integrating means
1303, 1503, 1704 Space converting means
1502 Image tracking means
1701 Start inputting means 1702 Driving controlling means
1801 Trace correcting means
2001 CG-image synthesizing means.
2201 Camera
2301 Mapping means
2302 Mapping table
2501 Final-position inputting means
2502 Start-position determining means
2503 Space fixing means

BEST MODE FOR CARRYING OUT THE INVENTION

Embodiments of the present invention will be described by referring to the accompanying drawing.

First Embodiment

First, a first embodiment of the present invention will be described by referring to the drawings.

FIG. 1 is a block diagram showing a configuration of the driving-operation assist of this embodiment. The driving-operation assist of this embodiment is mainly used to assist driving operations for garaging or parallel parking and the like.

As shown in FIG. 1, the driving-operation assist of this embodiment is configured by an imaging section 101 comprising N cameras (camera 1 to camera N), a camera parameter table 103 for storing camera parameters which are characteristics of the cameras, space configuring means 104 for generating space data relating each pixel configuring an image output from each camera to a point in a three-dimensional space in accordance with a camera parameter, viewpoint converting means 106 for generating an image viewed from a predetermined viewpoint as a circumferential-state image by referring to the space data, a space-data buffer 105 for temporarily storing the space data, assumed-movement-pattern storing means 108 for storing assumed-movement data including assumed-movement patterns, superimposing means 102 for superimposing the assumed-movement pattern on the circumferential-state image and generating a synthetic image, and displaying means 107 for displaying a synthetic image.

An assembly including the imaging section 101, camera parameter table 103, space reconfiguring means 104, and viewpoint converting means 106 corresponds to circumferential-state imaging means of the present invention and the superimposing means 102 corresponds to synthetic-image generating means of the present invention.

First, a detailed configuration of the imaging section 101 and a procedure in which a circumferential-state image of the present invention is generated in accordance with video data imaged by the imaging section 101 will be described below.

Figure 2:
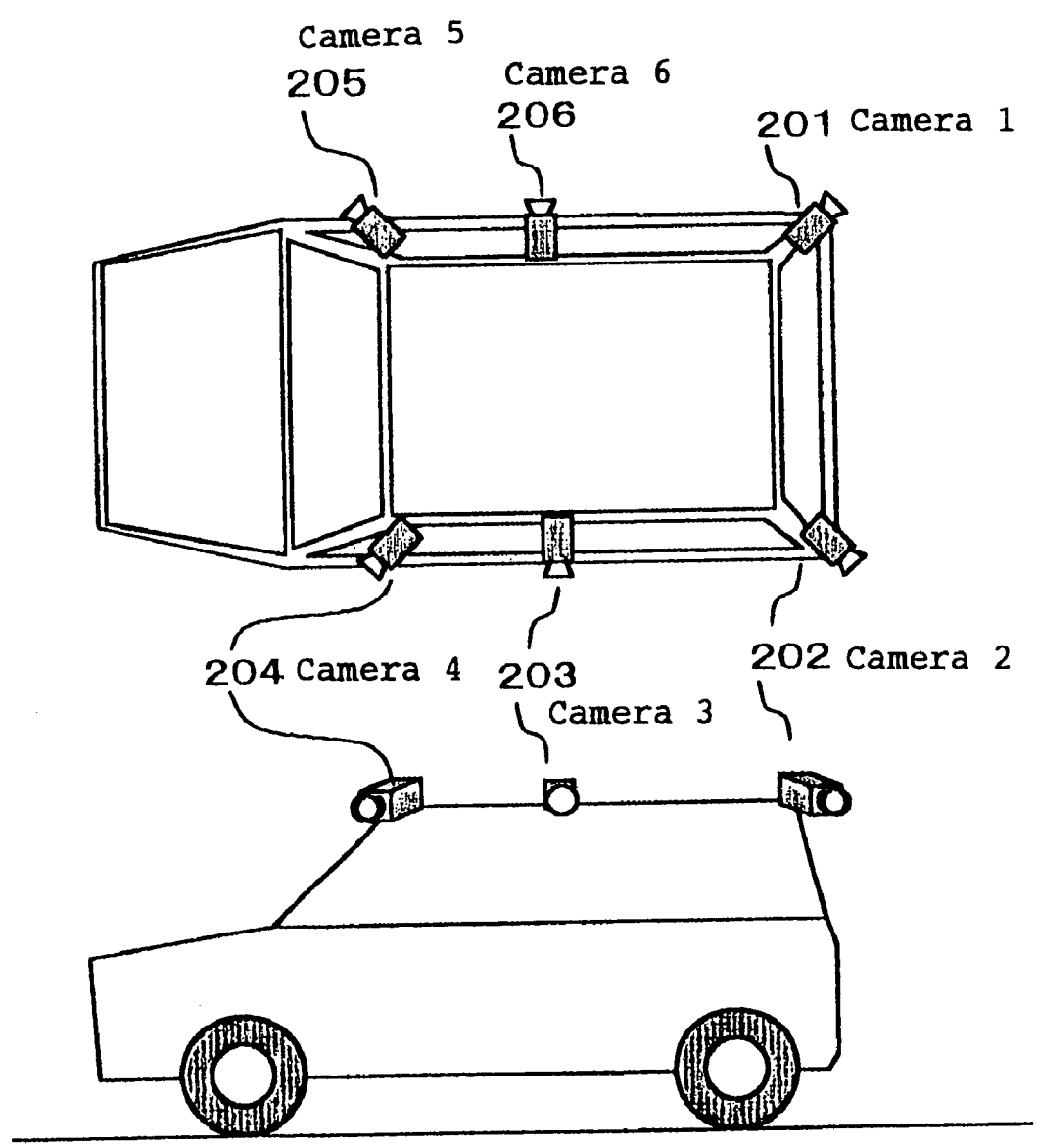
FIG. 2 shows a top view and an elevation view of a vehicle provided with cameras of an imaging section 101 of a driving-operation assist of the first embodiment of the present invention.

FIG. 2 shows a top view and an elevation view of a vehicle provided with cameras of the imaging section 101. In this example, six cameras 201 to 206 are arranged on the roof portion of a vehicle as N=6. The six cameras 201 to 206 are arranged so that a part of each camera overlaps with a part of the imaging range of other camera and no dead angle is produced flatly.

The camera parameter table 103 stores camera parameters of each of the above cameras (parameters showing camera characteristics such as setting position, setting angle, lens-strain correction value, and focal distance of camera). The space reconfiguring means 104 generates space data relating each pixel configuring an image output from each camera in accordance with the camera parameters to a point in a three-dimensional space on the basis of a vehicle. The space-data buffer 105 temporarily stores the above space data and the viewpoint converting means 106 generates an image viewed from an optional viewpoint such as a viewpoint of a virtual camera 301 shown in FIG. 3 as a circumferential-state image by referring to space data and thereby synthesizing pixels.

Figure 3:
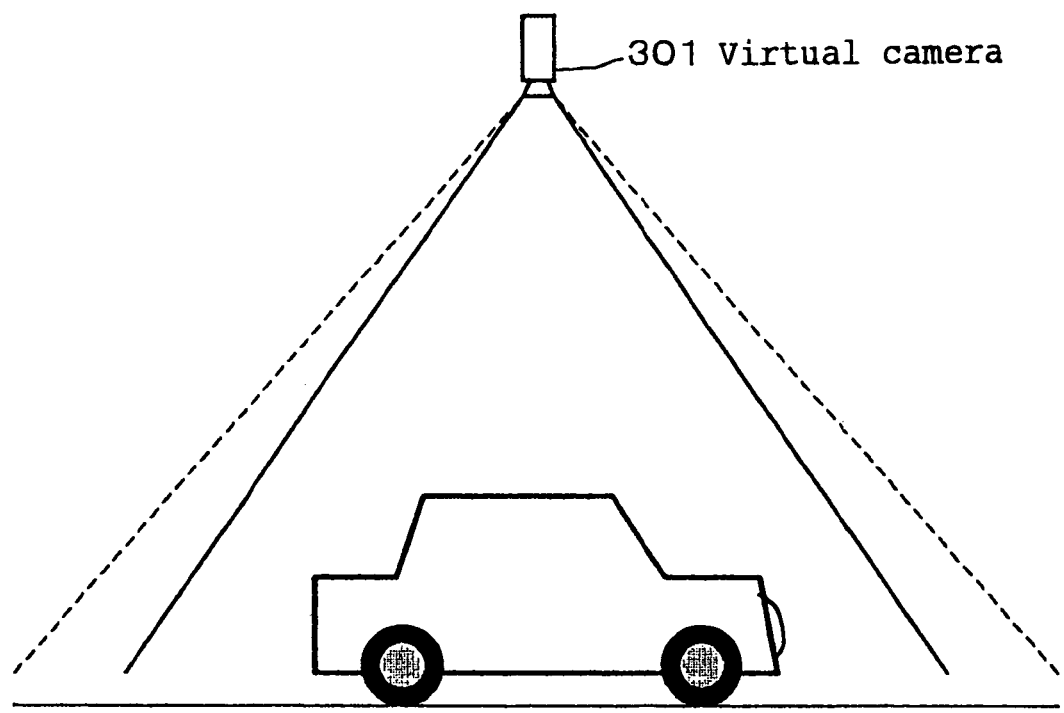
FIG. 3 is an elevation view showing a viewpoint of a virtual camera of the driving-operation assist of the first embodiment of the present invention.
Figure 4:
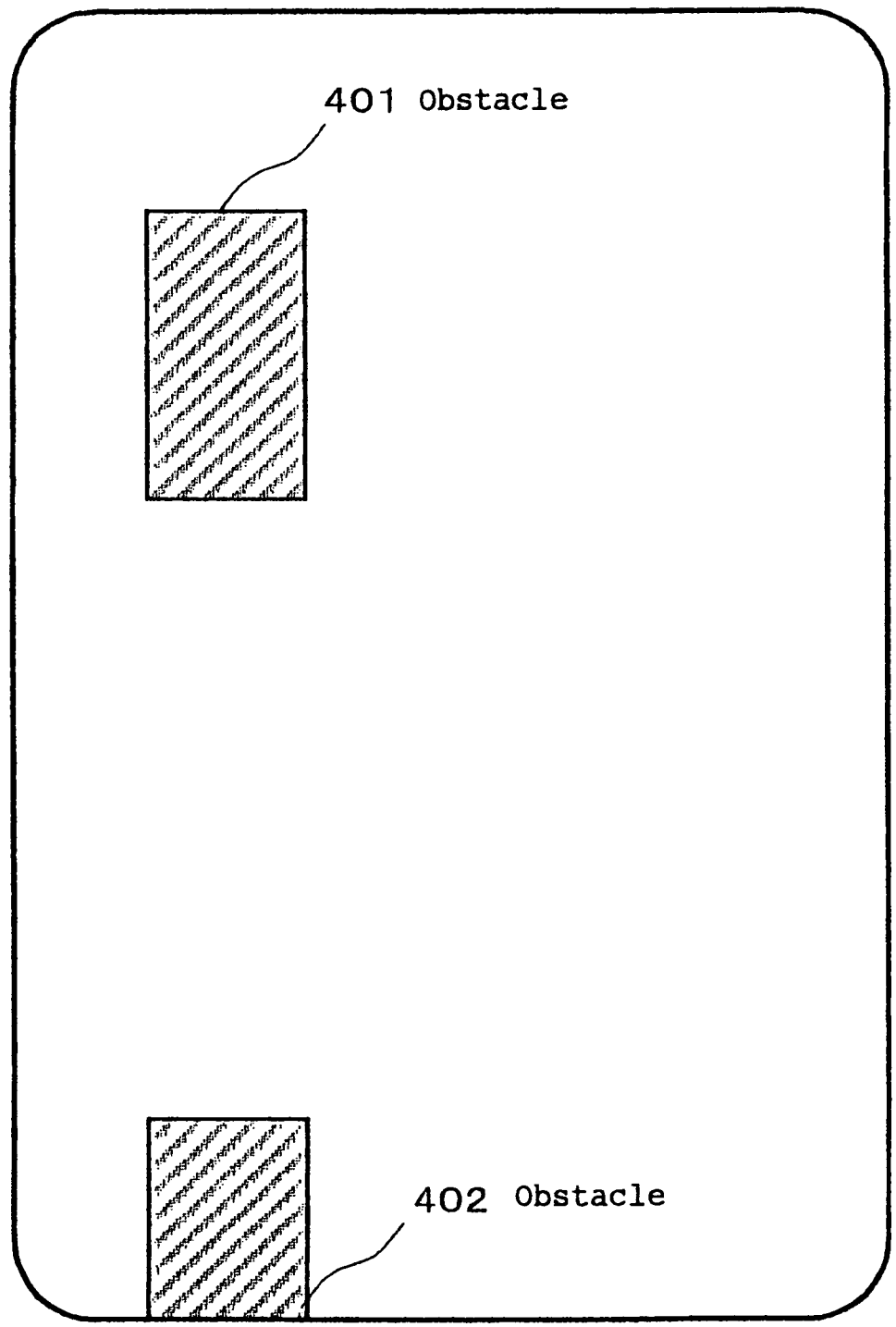
FIG. 4 is an illustration showing a circumferential-state image viewed from the virtual camera of the driving-operation assist of the first embodiment of the present invention.

FIG. 4 shows a circumferential-state image viewed from the viewpoint of the virtual camera 301 shown in FIG. 3. This example shows a case of performing parallel parking, in which two vehicles currently parked are shown on the circumferential-state image as an obstacle 401 and an obstacle 402.

Then, a procedure will be described in which the superimposing means 102 generates a synthetic image of the present invention and finally, the displaying means 107 displays the synthetic image.

The assumed-movement-pattern storing means 108 stores an assumed-movement pattern which is video data showing movement of a vehicle to which a typical vehicle driving operation is applied and time-series data showing the relation between vehicle moving distance (moving distance due to rotation of tire) and steering angle of steering wheel (rotation angle of steering wheel) as assumed-movement data of the present invention.

Figures 5A, 5B:
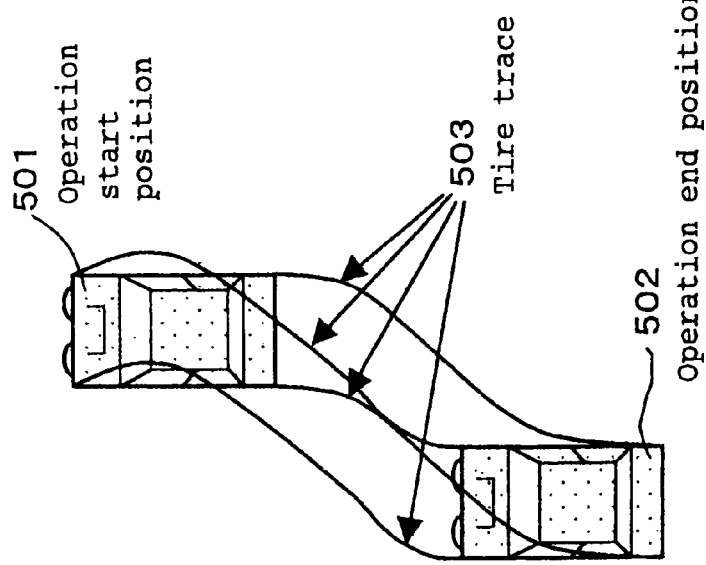
FIGS. 5(*a*) and 5(*b*) are illustrations showing assumed-movement data of the driving-operation assist of the first embodiment of the present invention.
Figures 6A, 6B:
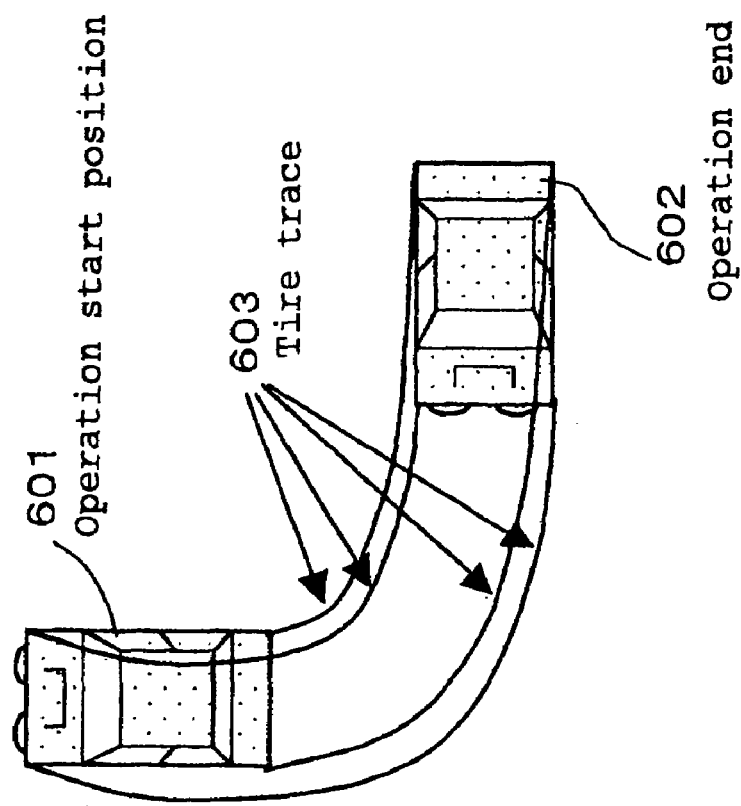
FIGS. 6(*a*) and 6(*b*) are illustrations showing assumed-movement data of the driving-operation assist of the first embodiment of the present invention.

Among stored assumed-movement data, the assumed-movement data for performing the driving operation of parallel parking to the left side is shown in FIG. 5 and the assumed-movement data for performing the driving operation for garaging to the right side is shown in FIG. 6. FIGS. 5(a) and 6(a) respectively show an assumed-movement pattern which is video data corresponding to a driving operation according to the time-series data shown in FIGS. 5(b) and 6(b) and showing operation start positions 501 and 601 (corresponding to an assumed-movement start area of the present invention), operation end positions 502 and 602 (corresponding to an assumed-movement end area of the present invention), and tire traces 503 and 603 (corresponding to video data showing vehicle tire traces of the present invention).

First, a driver selects one of the assumed-movement patterns stored in the assumed-movement-pattern storing means 108 by pattern selecting means (not illustrated). The superimposing means 102 superimposes a selected assumed-movement pattern (for example, FIG. 5(a)) on a circumferential-state image generated by the viewpoint converting means 106 (for example, FIG. 4) to synthesize them and generate a synthetic image of the present invention, and the displaying means 107 displays the synthetic image. In this case, for example, by adjusting the operation start position 501 in FIG. 5(a) to the current position of the vehicle, the operation end position 502 becomes an operation end position when starting a driving operation corresponding to the assumed-movement pattern from the current position, that is, a parking position.

Figure 7:
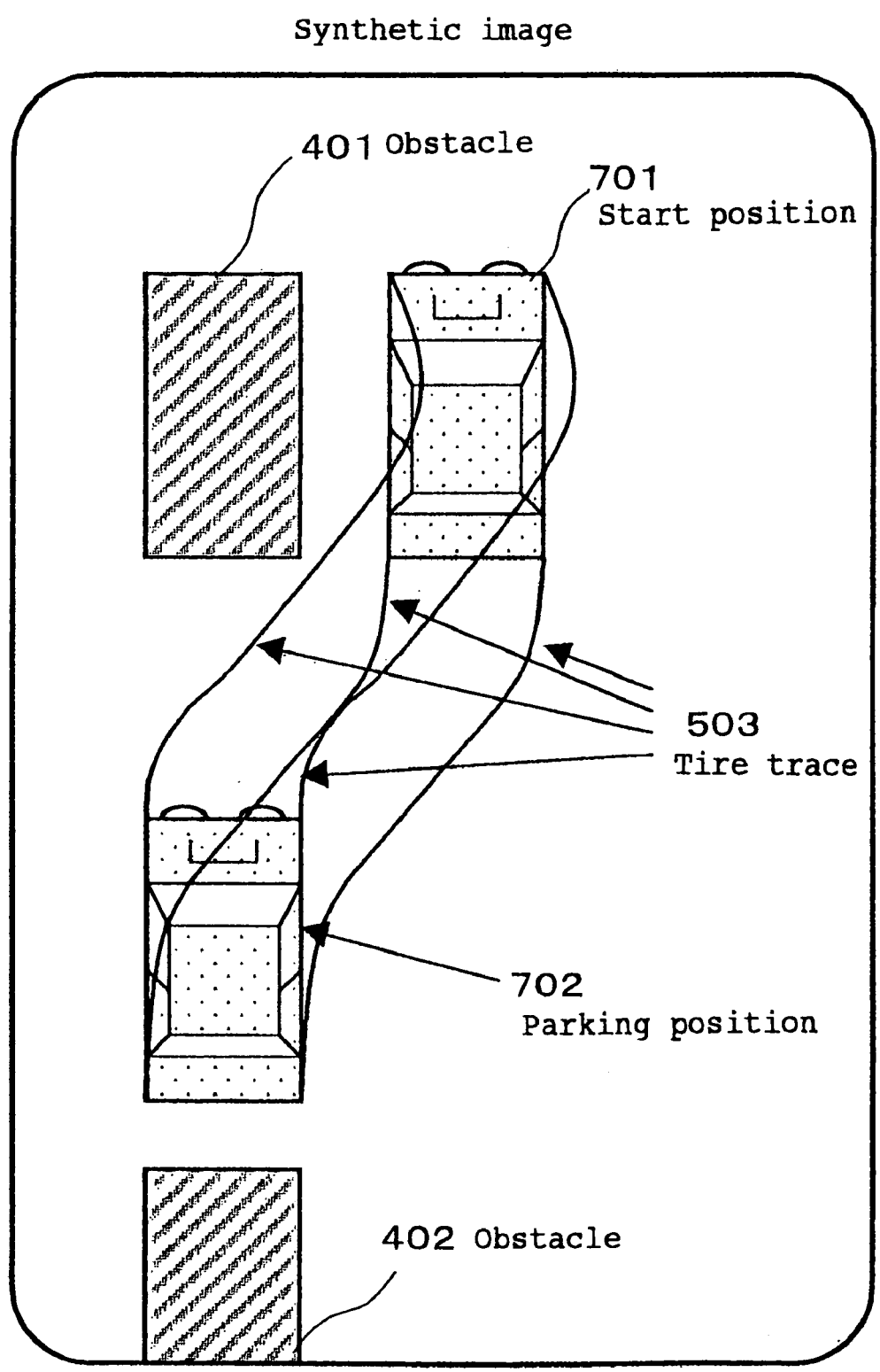
FIG. 7 is an illustration showing a synthetic image of the driving-operation assist of the first embodiment of the present invention.
Figure 8:
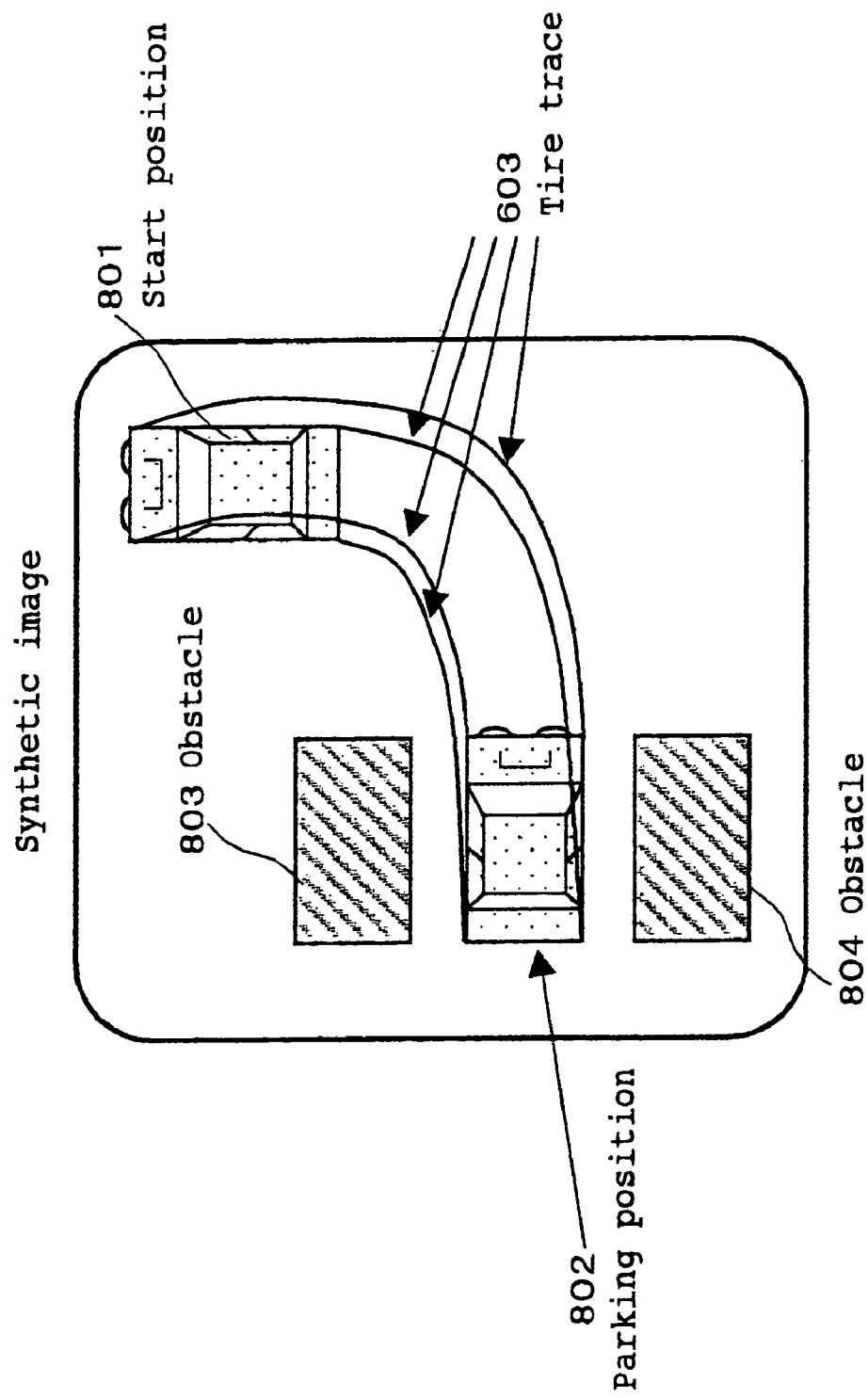
FIG. 8 is an illustration showing a synthetic image of the driving-operation assist of the first embodiment of the present invention.

FIG. 7 shows a synthetic image obtained by synthesizing the assumed-movement patterns shown in FIG. 5 and FIG. 8 shows a synthetic image obtained by synthesizing the assumed-movement patterns shown in FIG. 6.

That is, in FIG. 7 (FIG. 8), the driver can perform parallel parking to the left side (garaging to the right side) by moving the vehicle to a start position 701 (801) where the obstacles 401 and 402 (803 and 804) do not interfere with a parking position 702 (802), the tire trace 503 (603), and the start position 701 (801) and starting a series of driving operations according to time-series data from the position so as to park the vehicle at the parking position 702 (802).

A detailed procedure for moving the vehicle to the start position 701 (801) will be described below by using a case of performing parallel parking to the left side as an example and referring to FIG. 9 and FIGS. 10(*a*) to 10(*c*).

Figure 9:
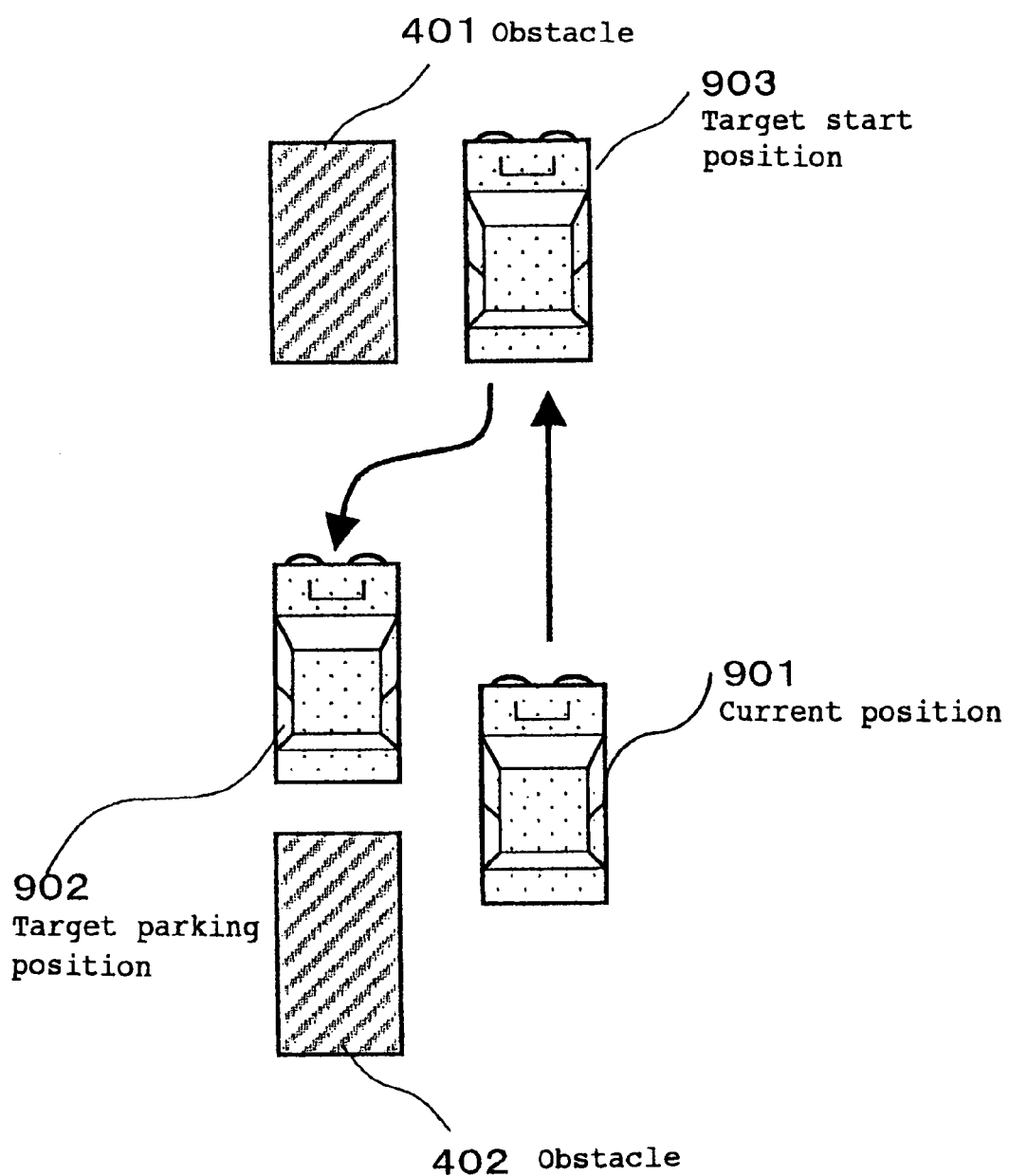
FIG. 9 is an illustration showing movement of a vehicle at the time of performing parallel parking to the left side.

FIG. 9 is an illustration showing movement of a vehicle when performing parallel parking to the left side. As shown in FIG. 9, to park the vehicle at a target parking position 902, a driver of the vehicle must move the vehicle located at a current position 901 to a target start position 903 by assuming the operation start position 501 when adjusting the operation end position 502 of the assumed-movement pattern (FIG. 5(*a*)) for performing parallel parking to the left side to the target parking position 902 as the target start position 903.

The relative positional relation between the operation end position 502 and the operation start position 501 in FIG. 5(*a*) corresponds to a case of performing a driving operation in accordance with the time-series data in FIG. 5(*b*). As for an actual driving operation, fine adjustment can be made in accordance with fine adjustment of a currently-operated steering wheel.

When the driving-operation assist of this embodiment is not used, the driver must move the vehicle to the target start position 903 by assuming the obstacles 401 and 402 and the target parking position 902 in accordance with a scene which can be confirmed from the inside of the vehicle through direct viewing or a mirror. In this case, there is a problem that an operation for the driver to assume the obstacles 401 and 402 and the target parking position 902 in accordance with the scene which can be confirmed from the inside of the vehicle through direct viewing or a mirror requires skill. Moreover, even when a size of a vehicle or a position of a mirror is changed, there is a problem that a driver cannot easily correspond to the change.

However, when the driving-operation assist of this embodiment is used, the assumed-movement pattern shown in FIG. 5(*a*) is superimposed on the circumferential-state image viewed from a viewpoint of a virtual camera as if being imaged from a position just above the vehicle as shown in FIG. 4 and thereby, the synthetic image shown in FIG. 7 is generated and displayed for a driver.

Therefore, at the time of performing a driving operation for moving the vehicle to the target start position 903 in FIG. 9, the operation end position 502 when assuming the current position 901 as the operation start position 501 is displayed as a parking position 1001 corresponding to the current position together with tire traces by displaying adjusting the current position 901 of the vehicle to the operation start position 501 in FIG. 5(*a*) as shown in FIGS. 10(*a*) to 10(*c*). When the vehicle is located at the current position 901 where the parking position 1001 coincides with the target parking position 902, movement to the target start position 903 is completed.

That is, if a parking operation is started from the position when the synthetic image 1 in FIG. 10(*a*) is displayed on the displaying means 107, the parking position 1001 overlaps with the obstacle 402. Therefore, a driver can confirm at a glance that the parking operation must be started from a position where the vehicle is further moved forward (upward in FIG. 10(*a*)).

Moreover, if a parking operation is started from the position when the synthetic image 2 in FIG. 10(*b*) is displayed on the displaying means 107, a tire trace overlaps with the obstacle 401. Therefore, the driver can confirm at a glance that the parking operation must be started from a position where the vehicle is further moved backward (downward in FIG. 10(*a*)).

Furthermore, if a parking operation is started from the position when the synthetic image 3 in FIG. 10(*c*) is displayed on the displaying means 107, a tire trace does not overlap with the obstacle 401 or 402 and the driver can confirm at a glance that the parking position 1001 is a position suitable for parking. Therefore, it is possible to confirm that a parking operation can be started from the position.

Thus, by virtually synthesizing images showing the positional relation between a vehicle viewed from a position just above the vehicle, circumferential obstacles, parking end position, and tire traces and showing a synthesized image to a driver, the driver can directly confirm the positional relation between them at a glance. As a result, the driver can confirm a place suitable for start of a parking operation at a glance, easily move a vehicle to the place, and start a parking operation. Therefore, it is possible to park the vehicle at a purposed position more safely and accurately.

Assumed-movement-pattern-operation start and end positions and a tire trace are intrinsic to each vehicle. For example, they are greatly different in small vehicle and large vehicle. This can be settled by storing an assumed-movement pattern in the assumed-movement-pattern storing means 108 in FIG. 1 every vehicle. Therefore, a driver can perform driving operations while confirming the relation between an assumed-movement pattern corresponding to the vehicle and a circumferential obstacle even if the vehicle is changed to another one.

Moreover, when vehicles are changed, it is considered that positions of and the number of vehicle-mounted cameras shown in FIG. 2 are also changed. However, this can also be settled by the fact that the camera parameter table 103 in FIG. 1 stores camera parameters of each camera every vehicle and an image shown to a driver is not directly influenced. Therefore, the driver can perform driving operations while confirming the relation between an assumed-movement pattern corresponding to a vehicle displayed in a synthetic image almost similarly displayed before vehicles are changed and a circumferential obstacle even if vehicles are changed and thereby, camera positions are changed.

As described above, according to this embodiment, it is possible to directly confirm a driving vehicle, an obstacle, and a purposed position at a glance in a driving operation such as parallel parking conventionally requiring a considerable skill for a driver, perform more safe and accurate driving operation, and greatly decrease an operation load of the driver.

Moreover, a driver can perform a driving operation while confirming the relation between an assumed-movement pattern corresponding to a vehicle and a circumferential obstacle or the like, almost similarly to a state before vehicles are changed even if vehicles are changed and thereby, it is possible to greatly decrease a load of a driver's skill for change of vehicles.

FIG. 11 shows a variation of assumed-movement patterns stored in the assumed-movement-pattern storing means 108 in FIG. 1. The patterns are right and left parallel-parking assumed-movement patterns 1101 and 1102 and right and left garaging assumed-movement patterns 1103 and 1104. As described above, a driver selects any one of these patterns by pattern selecting means (not illustrated). Areas to be displayed as synthetic images are also determined as shown by outer frames of the assumed-movement patterns 1101 to 1104 in FIG. 11 correspondingly to the above four assumed-movement patterns. That is, an operation start position is assumed as a current vehicle position and a rectangular area including a tire trace and an operation end position is assumed as a synthetic-image area.

Though a vehicle is not imaged from a vehicle-mounted camera in general, it is permitted in this case to hold CG data for a vehicle and actual-vehicle data and display these data in a synthetic image by superimposing them on each other similarly to trace data.

For this embodiment, assumed-movement patterns of the present invention are described as video data showing an operation start position (assumed-movement start area of the present invention), an operation end position (assumed-movement end area of the present invention), and tire traces (image data showing vehicle tire traces of the present invention). However, other pattern is also permitted, for example, it can be that traces (video data showing a vehicle moving area of the present invention) in which a projection of a vehicle moves are included instead of or together with tire traces. In short, it is only necessary that assumed-movement patterns of the present invention serve as video data showing movement of a vehicle when assuming that a predetermined series of driving operations are previously applied to the vehicle.

Figure 12:
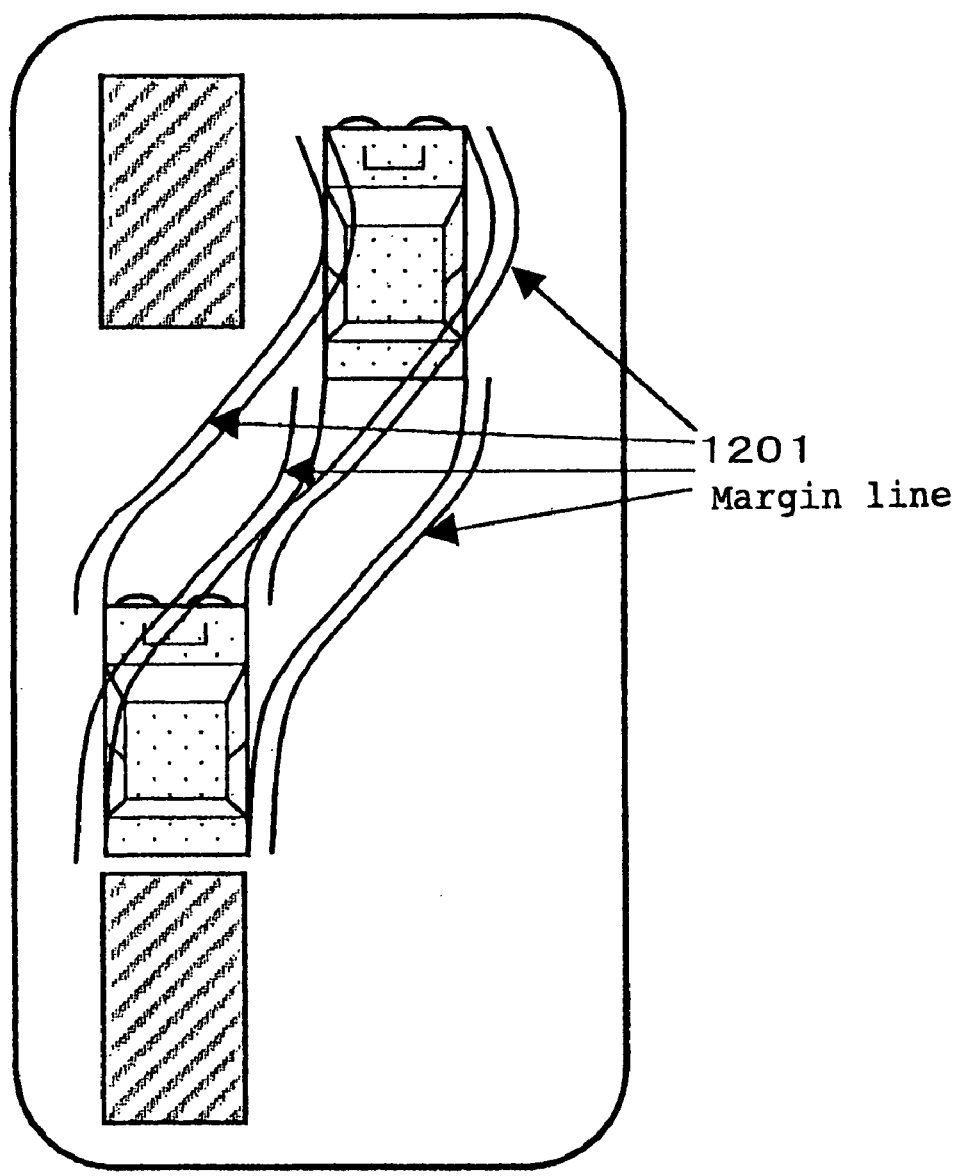
FIG. 12 is an illustration showing a modification of the synthetic image of the driving-operation assist of the first embodiment of the present invention.

Moreover, as described above, if directly displaying a tire trace and/or a vehicle moving area, there is no margin for contact between the vehicle and an obstacle or the like. Therefore, as shown in FIG. 12, it is also permitted to display a margin line 1201 set outward by a predetermined value (e.g. 50 cm) from a tire trace or the outer margin of a vehicle moving area.

Furthermore, for this embodiment, it is described that a circumferential-state image of the present invention is obtained by synthesizing video data imaged by the imaging section 101 in real time. However, at a place where the same driving operation is frequently performed and circumferential state is hardly fluctuated, other pattern is also permitted, for example, it can be to store the data produced in accordance with already-imaged video data in the space-data buffer 105 and use the data.

Second Embodiment

Then, a second embodiment of the present invention will be described below by referring to the accompanying drawings.

Figure 13:
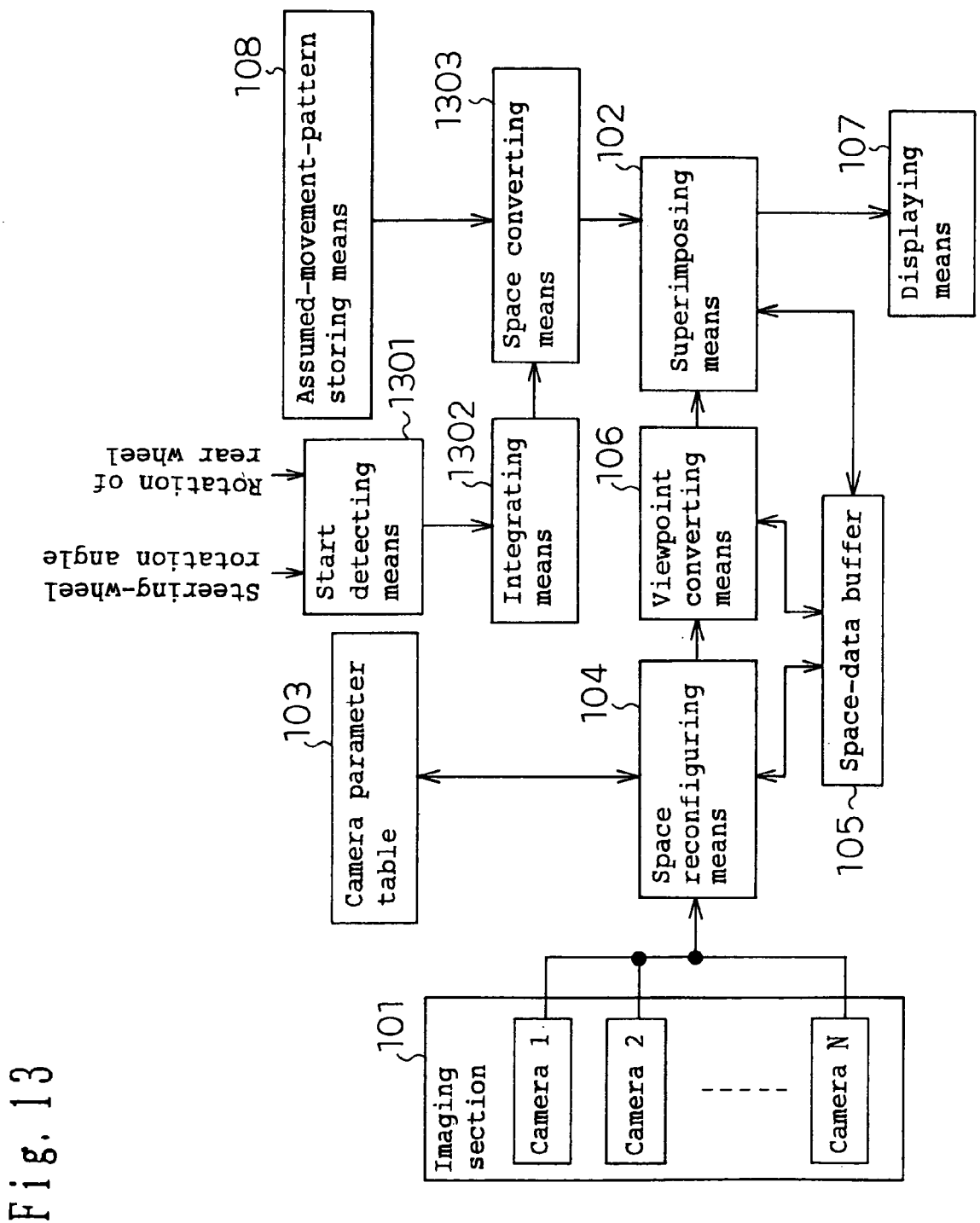
FIG. 13 is a block diagram showing a configuration of a driving-operation assist of a second embodiment of the present invention.

FIG. 13 is a block diagram showing a configuration of the driving-operation assist of the second embodiment of the present invention. The driving-operation assist of this embodiment is also mainly used to assist driving operations such as garaging and parallel parking. Therefore, in this embodiment, it is assumed that a component with no explanation is the same as the case of the first embodiment and a component provided with the same symbol as the case of the first embodiment has the function as the case of the first embodiment unless otherwise explained. Moreover, it is assumed that each modified example described for the first embodiment can be applied to this embodiment by applying the same modification unless otherwise described.

As shown in FIG. 13, the configuration of the driving-operation assist of this embodiment is different from that of the driving-operation assist of the first embodiment in that start detecting means 1301, integrating means 1302, and space converting means 1303 are included.

The start detecting means 1301 to which a gear signal showing forward movement or backward movement and a steering-wheel-turning-angle signal showing a front-wheel steering angle are input judges that a driving operation (parking operation) corresponding to an assumed-movement pattern stored in the assumed-movement-pattern storing means 108 is started when a gear signal shows a backward-movement state and a front-wheel steering angle according to a steering-wheel-turning-angle signal reaches a certain value or more, which corresponds to operation start detecting means of the present invention.

The integrating means 1302 integrates the steering-wheel rotation angle and the number of revolutions of rear wheels and computes a spatial movement change of a vehicle up to the current point of time after a driving operation (parking operation) is started, which corresponds to moving-position computing means of the present invention.

The space converting means 1303 moves an assumed-movement pattern in accordance with the spatial movement change and an assembly of the superimposing means 102 and space converting means 1303 corresponds to synthetic-image generating means of the present invention.

In this embodiment, a procedure until a circumferential-state image of the present invention is generated in accordance with video data imaged by the imaging section 101 is the same as the procedure described for the first embodiment. Moreover, a procedure until an actual driving operation corresponding to an assumed-movement pattern is started in a procedure until the superimposing means 102 generates a synthetic image of the present invention and the displaying means 107 displays the synthetic image is the same as that described for the first embodiment.

A procedure until the superimposing means 102 generates a synthetic image of the present invention and the displaying means 107 displays the synthetic image after an actual driving operation corresponding to an assumed-movement pattern is started is described below by using a case of performing parallel parking to the left side as an example.

When a driver starts a driving operation corresponding to parallel parking to the left side, a gear signal shows a backward-movement state and a front-wheel steering angle according to a steering-wheel-turning-angle signal reaches a certain value or more. Therefore, the start detecting means 1301 judges that a driving operation (parking operation) corresponding to parallel parking to the left side is started, communicates to the integrating means 1302 that the driving operation (parking operation) is started, and thereafter inputs the steering-wheel-rotation-angle signal and the number-of-revolution-of-rear-wheel signal to the integrating means 1302.

Figure 14:
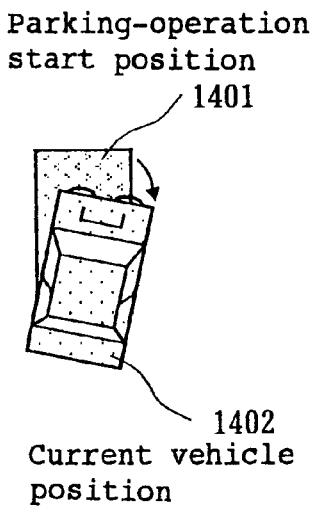
FIGS. 14(a) to 14(c) are illustrations showing synthetic images of the driving-operation assist of the second embodiment of the present invention.
Figure 14:
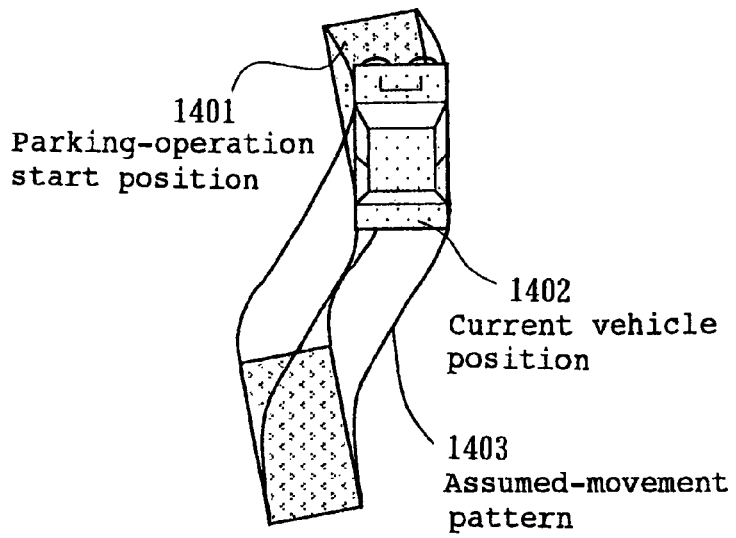
Figure 14:
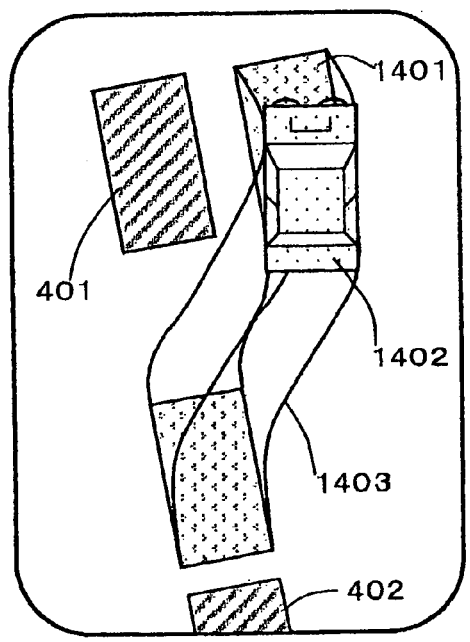

The integrating means 1302 integrates the input steering-wheel-rotation-angle signal and number-of-revolution-of-rear-wheel signal after start of the driving operation and computes the positional relation between a current vehicle position 1402 and a parking-operation start position 1401 as shown in FIG. 14(*a*).

In accordance with the computed positional relation, the space converting means 1303 moves an assumed-movement pattern 1403 corresponding to parallel parking to the left side so that the operation start position (501 in FIG. 5) coincides with the parking-operation start position 1401 as shown in FIG. 14(*b*). In other words, the space converting means 1303 spatially fixes the assumed-movement pattern 1403 at a position when the parking operation starts after start of the driving operation.

After start of a driving operation, the superimposing means 102 synthesizes the assumed-movement pattern 1403 spatially fixed at the parking-operation start position and the current vehicle position 1402 by superimposing the pattern 1403 and the position 1402 on a circumferential-state image to generate a synthetic image of the present invention as shown in FIG. 14(c). The displaying means 107 displays the synthetic image. Because circumferential-state images such as the obstacles 401 and 402 are naturally fixed in a space, the positional relation between the circumferential-state images and the assumed-movement pattern 1403 is fixed in the synthetic image. Moreover, because a synthetic image is an image viewed from a viewpoint fixed on to a vehicle, only the current vehicle position 1402 is fixed on the screen when the vehicle moves and circumferential-state images and the assumed-movement pattern 1403 are displayed while they relatively move in FIG. 14(c).

That is, according to this embodiment, a circumferential-state image viewed from a viewpoint of a virtual camera moves in accordance with movement of an actual vehicle and the superimposed and synthesized assumed-movement pattern 1403 also moves in accordance with movement of a vehicle computed by the integrating means 1302. Therefore, the circumferential-state image and the assumed-movement pattern 1403 show coincident movement. Because a driver only has to operate a steering wheel along a tire trace of an assumed-movement pattern displayed at each point of time, a simpler and safer vehicle operation is realized.

Third Embodiment

Then, a third embodiment of the present invention will be described below by referring to the accompanying drawings.

Figure 15:
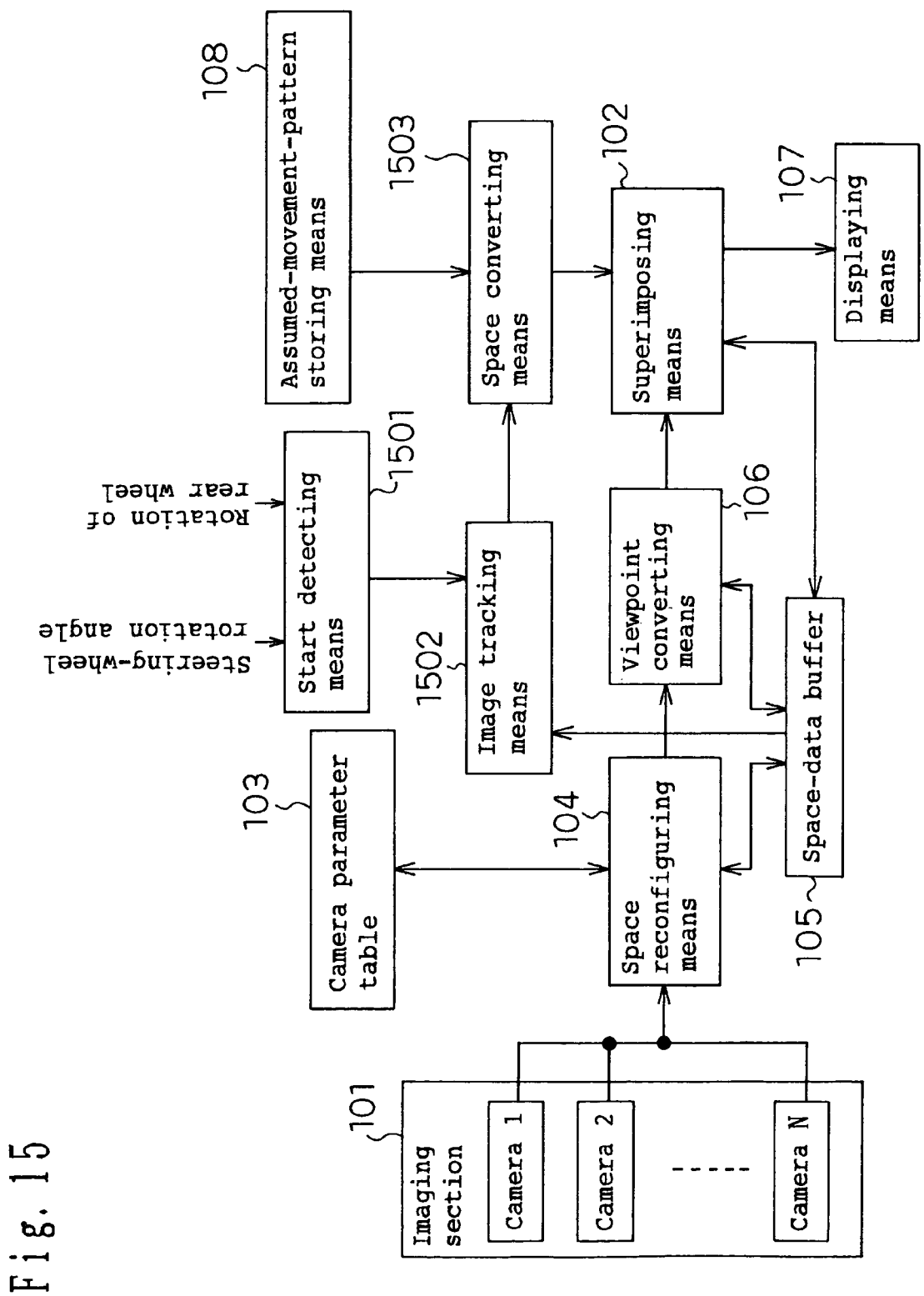
FIG. 15 is a block diagram showing a configuration of a driving-operation assist of a third embodiment of the present invention.

FIG. 15 is a block diagram showing a configuration of the driving-operation assist of the third embodiment of the present invention. The driving-operation assist of this embodiment is also mainly used to assist driving operations for garaging, parallel parking and the like. Therefore, in this embodiment, it is assumed that a component with no explanation is the same as the case of the first embodiment and a component provided with the same symbol as the case of the first embodiment has the same function as the case of the first embodiment unless otherwise explained. Moreover, each modified example described for the first embodiment can be applied to this embodiment by applying the same modification unless otherwise described.

As shown in FIG. 15, the configuration of the driving-operation assist of this embodiment is different from that of the driving-operation assist of the first embodiment in that start detecting means 1501 and image tracking means 1502, and space converting means 1503 are included.

The start detecting means 1501 has the same functions as the start detecting means 1301 in FIG. 13 described for the second embodiment except that a steering-wheel-turning-angle signal or a number-of-revolution-of-rear-wheel signal is not output to any other unit.

The image tracking means 1502 stores positional information of the whole or a part (e.g. operation end position) of video data for assumed-movement patterns on the basis of the whole or a part (e.g. obstacle) of video data for circumferential-state images on a synthetic image when a driving operation (parking operation) is started and corresponds to positional-information storing means of the present invention.

The space converting means 1503 moves an assumed-movement pattern in accordance with the positional information and an assembly configured by the superimposing means 102 and space converting means 1503 corresponds to synthetic-image generating means of the present invention.

In this embodiment, a procedure until a circumferential-state image of the present invention is generated in accordance with video data imaged by the imaging section 101 is the same as that described for the first embodiment. Moreover, a procedure until an actual driving operation corresponding to an assumed-movement pattern is started in a procedure until the superimposing means 102 generates a synthetic image of the present invention and the displaying means 107 displays the synthetic image is the same as that described for the first embodiment.

A procedure until the superimposing means 102 generates a synthetic image of the present invention and the displaying means 107 displays the synthetic image after an actual driving operation corresponding to an assumed-movement pattern is started is described below by using a case of performing parallel parking to the left side as an example.

When a driver starts a driving operation corresponding to parallel parking to the left side, a gear signal shows a backward-movement state and a front-wheel steering angle according to a steering-wheel-turning-angle signal reaches a certain value or more. Therefore, the start detecting means 1501 judges that a driving operation (parking operation) corresponding to parallel parking to the left side is started and communicates to the image tracking means 1502 that the driving operation (parking operation) is started.

When the image tracking means 1502 receives the information showing that the driving operation (parking operation) is started, there is obtained the video data for an end-position circumferential image 1603 including a part of the obstacle 402 which is a part of the video data for a circumferential-state image and a parking-operation end position 1602 on the then synthetic image (FIG. 16(a)) through the space-data buffer 105, and the video data is stored. After start of the driving operation, the means 1502 finds the portion concerned of the obstacle 402 from a circumferential-state image at each point of time (obtained through the space-data buffer 105), adjusts the portion concerned of the obstacle 402 in the end-position circumferential image 1603 to the portion concerned of the obstacle 402 in a circumferential-state image, and thereby determines the positional relation between the parking-operation end position 1602 and the circumferential-state image at that point of time. That is, the image tracking means 1502 tracks the positional relation between the parking-operation end position 1602 and the circumferential-state image at each point of time.

According to the positional relation, the space converting means 1503 moves an assumed-movement pattern corresponding to parallel parking to the left side so that the operation end position (502 in FIG. 5) coincides with the parking-operation end position 1602. In other words, after start of the driving operation, the space converting means 1503 spatially fixes the assumed-movement pattern to a position at start of the parking operation.

As shown in FIG. 16(c), after start of the driving operation, the superimposing means 102 superimposes the assumed-movement pattern 1605 spatially-fixed to the position at start of the parking operation and the current vehicle position 1604 on a circumferential-state image and synthesizes them to generate a synthetic image of the present invention. The displaying means 107 displays the synthetic image. Because circumferential-state images of the obstacles 401 and 402 or the like, are naturally fixed in a space, the positional relation between the circumferential-state image and the assumed-movement pattern 1403 is fixed in the synthetic image.

Figure 16:
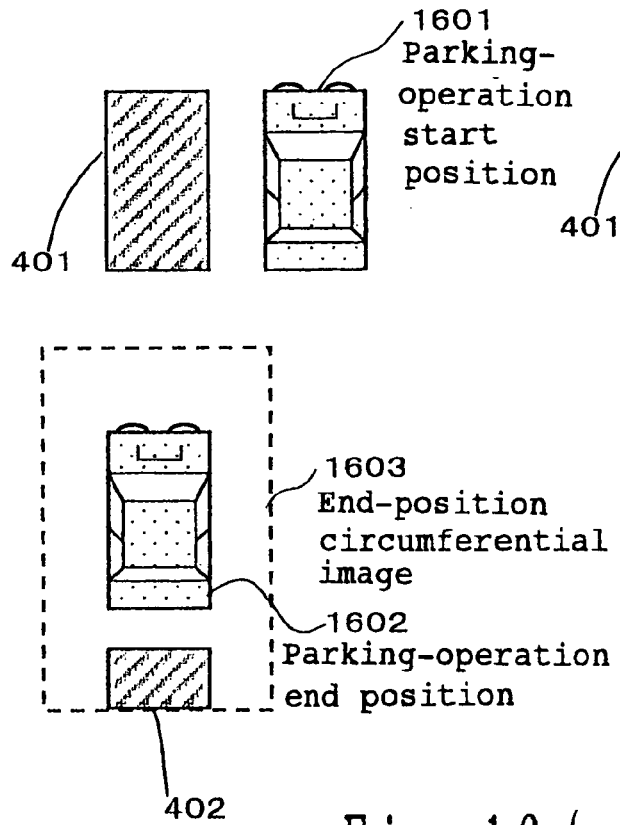
FIGS. 16(a) to 16(c) are illustrations showing synthetic images of the driving-operation assist of the third embodiment of the present invention.
Figure 16:
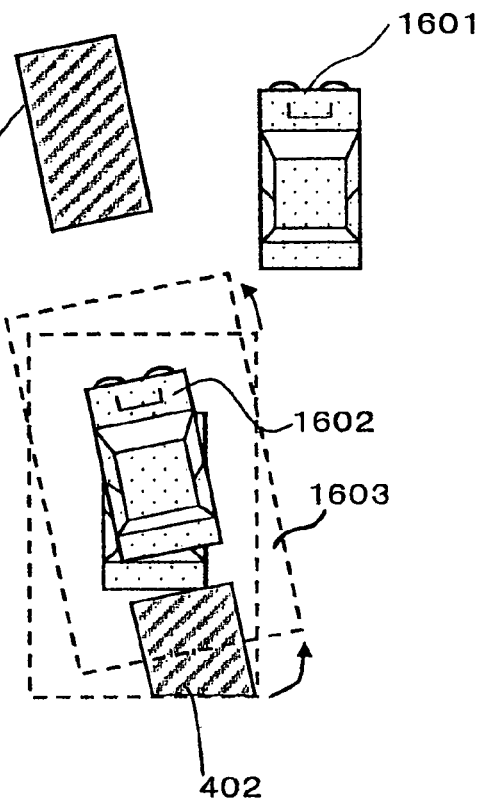
Figure 16:
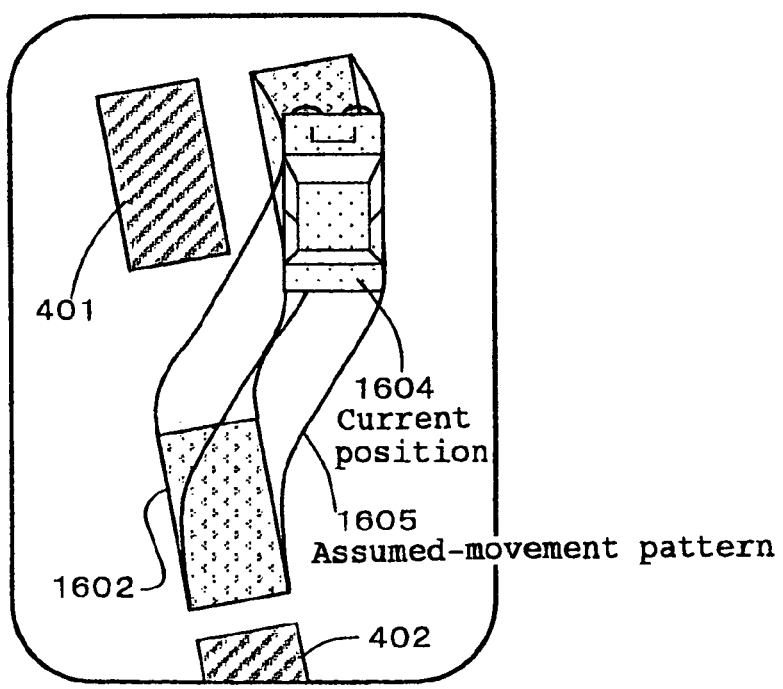

Moreover, in FIG. 16(c), because the synthetic image is an image viewed from a viewpoint fixed on a vehicle, if the vehicle moves, only the current vehicle position 1604 is fixed on the screen and the circumferential-state image and the assumed-movement pattern 1605 are displayed while they relatively move. That is, as for the driving-operation assist of this embodiment, if a procedure is executed under the same condition as the case of the driving-operation assist of the second embodiment, the synthetic image shown in FIG. 16(*c*) becomes same as the synthetic image shown in FIG. 14(*c*).

According to this embodiment, because a circumferential-state image viewed from a viewpoint of a virtual camera moves in accordance with movement of an actual vehicle and the superimposed and synthesized assumed-movement pattern 1605 also moves in accordance with the movement of the vehicle. Therefore, both show coincident movement. Because a driver only has to operate a steering wheel along trace data for an assumed-movement pattern displayed at each point of time, a simpler and safer vehicle operation is realized.

Fourth Embodiment

Then, a fourth embodiment of the present invention will be described below by referring to the accompanying drawings.

Figure 17:
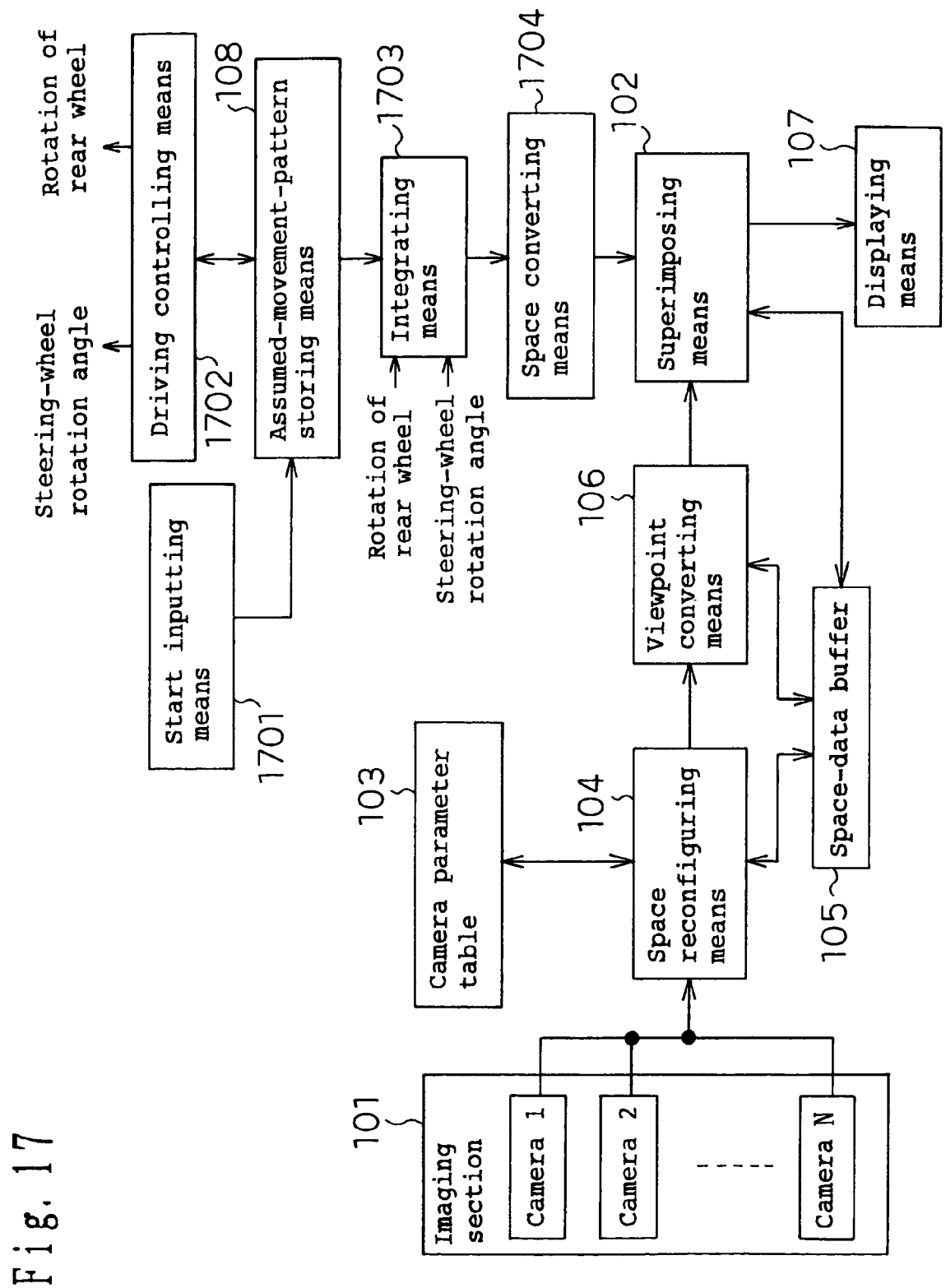
FIG. 17 is a block diagram showing a configuration of a driving-operation assist of a fourth embodiment of the present invention.

FIG. 17 is a block diagram showing a configuration of the driving-operation assist of the fourth embodiment of the present invention. The driving-operation assist of this embodiment is also mainly used to assist driving operations for garaging, parallel parking and the like. Therefore, it is assumed that a component with no explanation is the same as the case of the first embodiment and a component provided with the same symbol as the case of the first embodiment has the same function as the case of the first embodiment unless otherwise explained. Moreover, it is assumed that each modified example described for the first embodiment can be applied to this embodiment by applying the same modification unless otherwise described.

As shown in FIG. 17, the configuration of the driving-operation assist of this embodiment is different from that of the driving-operation assist of the first embodiment in that start inputting means 1701, driving controlling means 1702, integrating means 1703, and space converting means 1704 are included.

The start inputting means 1701 is used for a driver to input and designate start of an actual driving operation (parking operation) corresponding to an assumed-movement pattern, which corresponds to operation start detecting means of the present invention.

The driving controlling means 1702 automatically controls operations of a vehicle by controlling a steering-wheel rotation angle and the number of revolutions of rear wheels in accordance with time-series data (e.g. FIG. 5(*b*)) corresponding to an assumed-movement pattern when a driving-operation start instruction is input, which corresponds to operation controlling means of the present invention.

The integrating means 1703 integrates a steering-wheel rotation angle and the number of revolutions of rear wheels and computes a spatial movement change of a vehicle up to the current point of time after a driving operation (parking operation) is started, which corresponds to moving-position computing means of the present invention. That is, the integrating means 1703 has the same function as the integrating means 1302 in FIG. 13 described for the second embodiment.

The space converting means 1704 moves an assumed-movement pattern in accordance with the spatial movement change and an assembly constituted of the superimposing means 102 and space converting means 1704 corresponds to synthetic-image generating means of the present invention. That is, the space converting means 1704 has the same functions as the space converting means 1303 in FIG. 13 described for the second embodiment.

In this embodiment, a procedure until a circumferential-state image of the present invention is generated in accordance with video data imaged by the imaging section 101 is the same as that described for the first embodiment. Moreover, a procedure until an actual driving operation corresponding to an assumed-movement pattern is started in a procedure until the superimposing means 102 generates a synthetic image of the present invention and the displaying means 107 displays the synthetic image is the same as that described for the first embodiment.

A procedure until the superimposing means 102 generates a synthetic image of the present invention and the displaying means 107 displays the synthetic image after an actual driving operation corresponding to an assumed-movement pattern is started is described below by using a case of performing parallel parking to the left side as an example.

A driver locates a vehicle at a position suitable for start of a parking operation while viewing a synthetic image displayed on the displaying means 107 before starting the parking operation and then, inputs an instruction for start of the parking operation to the start inputting means 1701. The start inputting means 1701 communicates that the driving-operation start instruction is input to the driving controlling means 1702 and integrating means 1703 through the assumed-movement-pattern storing means 108.

When receiving a parking-operation start instruction, the driving controlling means 1702 automatically controls driving of a vehicle by generating a steering-wheel-rotation-angle control signal and a number-of-revolution-of-rear-wheel control signal in accordance with the time-series data (FIG. 5(*b*)) corresponding to an assumed-movement pattern and controlling a steering-wheel control system and a rear-wheel control system.

In case of receiving a parking-operation start instruction, the integrating means 1703 integrates a steering-wheel-operation-angle signal and a number-of-revolution-of-rear-wheel signal to compute the positional relation between the current vehicle position 1402 and the parking-operation start position 1401 as shown in FIG. 14(*a*).

As shown in FIG. 14(*b*), the space converting means 1704 moves the assumed-movement pattern 1403 corresponding to parallel parking to the left side so that the operation start position (501 in FIG. 5) and the parking-operation start position 1401 coincide with each other in accordance with the computed positional relation. In other words, after start of a driving operation, the space converting means 1704 spatially fixes the assumed-movement pattern 1403 to the parking-operation start position.

A subsequent procedure in which the superimposing means 102 generates a synthetic image and the displaying means 107 displays the synthetic image is the same as that described for the second embodiment. When the vehicle reaches a predetermined parking position, the driving control means 1702 stops the vehicle in accordance with the time-series data and thereby, the parking operation is completed.

According to this embodiment, it is possible to obtain an advantage that a steering-wheel operation, and the like are automatically performed in addition to the advantages described for the second embodiment after start of a driving operation is designated. Because a driver only has to confirm that a steering-wheel operation is automatically generated in accordance with the trace data for a displayed assumed-movement pattern at each point of time and monitor that a new obstacle appears, a simpler and safer vehicle operation is realized.

Fifth Embodiment

Then, a fifth embodiment of the present invention will be described below by referring to the accompanying drawings.

Figure 18:
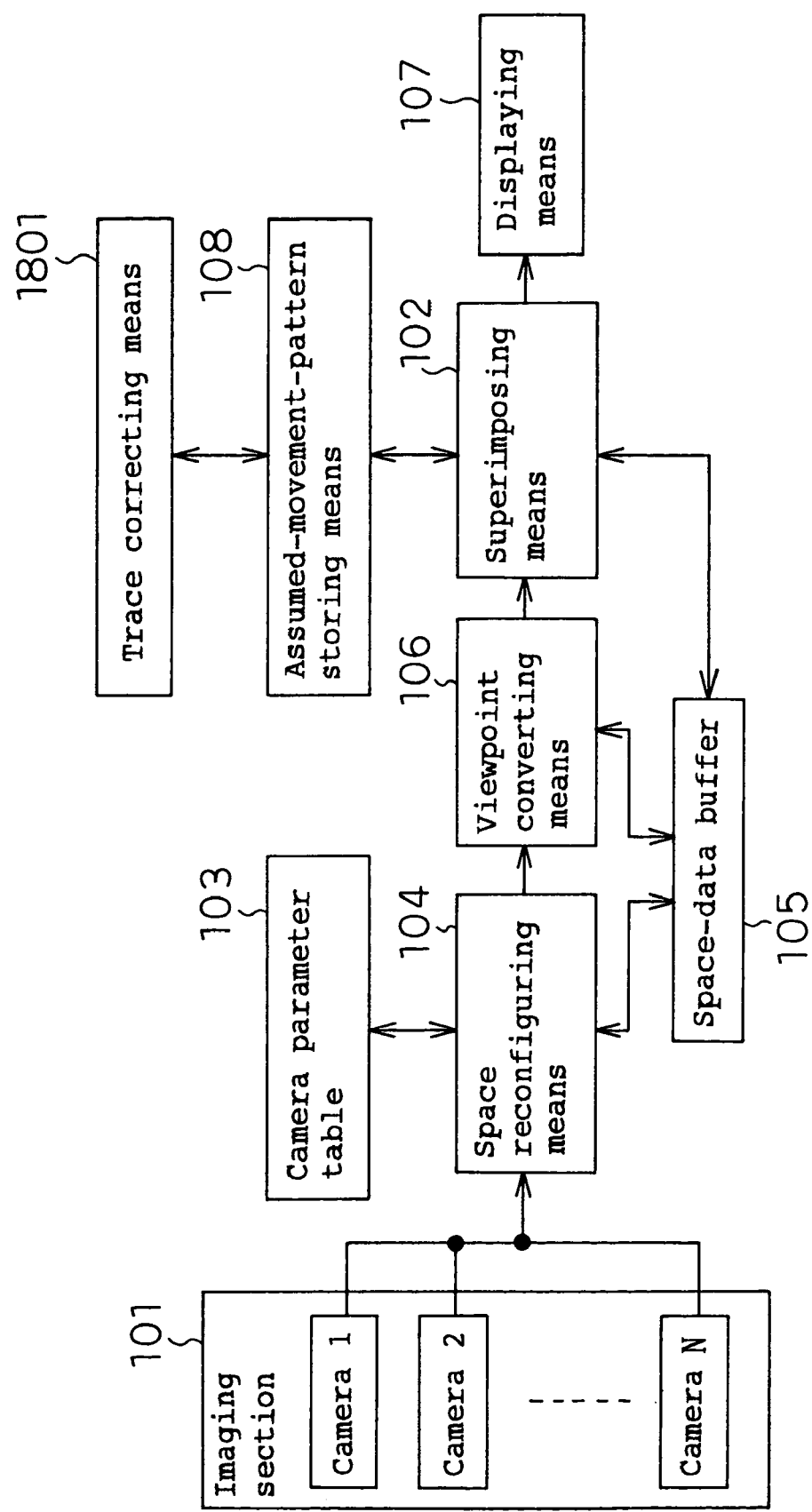
FIG. 18 is a block diagram showing a configuration of a driving-operation assist of a fifth embodiment of the present invention.

FIG. 18 is a block diagram showing a configuration of the driving-operation assist of the fifth embodiment of the present invention. The driving-operation assist of this embodiment is also mainly used to assist driving operations for garaging, parallel parking and the like. Therefore, it is assumed that a component with no explanation is the same as the case of the first embodiment and a component provided with the same symbol as the case of the first embodiment has the same function as the case of the first embodiment unless otherwise explained. Moreover, each modified example described for the first embodiment can be applied to this embodiment by applying the same modification unless otherwise described.

As shown in FIG. 18, the configuration of the driving-operation assist of this embodiment is different from that of the first embodiment in that trace correcting means 1801 is included.

The trace correcting means 1801 corrects an assumed-movement pattern and time-series data in accordance with a driving-operation start position and an operation end position input from a driver, which corresponds to pattern correcting means of the present invention.

In this embodiment, a procedure until a circumferential-state image of the present invention is generated in accordance with video data imaged by the imaging section 101 is the same as that described for the first embodiment. Moreover, a procedure until an assumed-movement pattern stored in the assumed-movement-pattern storing means 108 is displayed on a synthetic image by making the operation start position of the pattern coincide with the current vehicle position in a procedure until the superimposing means 102 generates a synthetic image of the present invention and the displaying means 107 displays the synthetic image is the same as that described for the first embodiment.

A procedure until a driver corrects an assumed-movement pattern and time-series data by using the trace correcting means 1801 and the assumed-movement pattern and time-series data are displayed on a synthetic image after the assumed-movement pattern is displayed on the synthetic image is described below by using a case of performing garaging to the left side as an example.

As shown in FIG. 9(a), a case is assumed in which as a result of moving a vehicle to a current position 1901 where an assumed-movement-pattern-operation end position coincides with a target parking position 1902 in order to perform a garaging operation by assuming the target parking position 1902 as an operation end position so that a driver does not contact with an obstacle 1904 or 1905, it is found that a tire trace 1903 of the assumed-movement pattern interferes with the obstacle 1905.

When the assumed-movement-pattern storing means 108 stores an assumed-movement pattern for a garaging operation to another left side, it is possible to study whether a parking operation is smoothly performed by selecting the assumed-movement pattern stored in the means 108 by pattern selecting means (not illustrated). However, when the means 108 does not store the assumed-movement pattern or when another assumed-movement pattern also interferes with an obstacle, a driver corrects the assumed-movement pattern.

Figure 19:
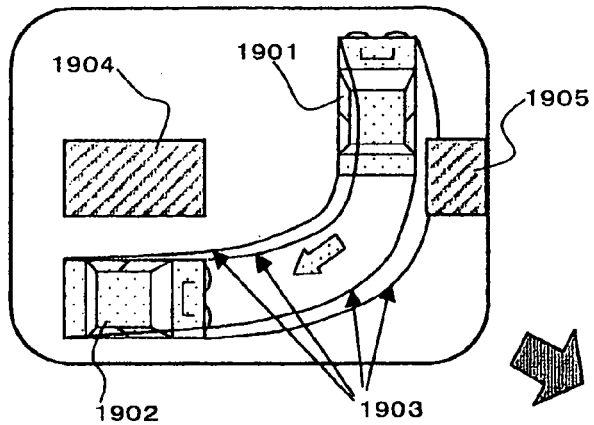
FIGS. 19(a) to 19(d) are illustrations showing synthetic images of the driving-operation assist of the fifth embodiment of the present invention.
Figure 19:
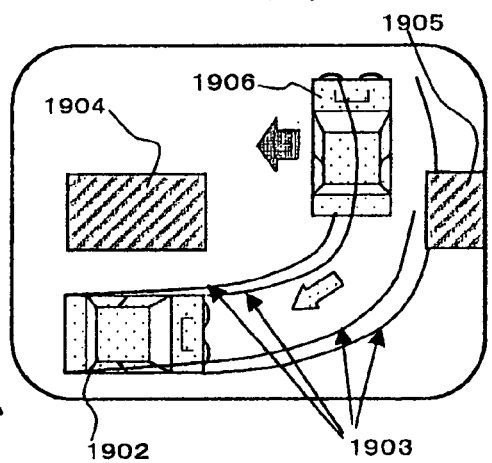
Figure 19:
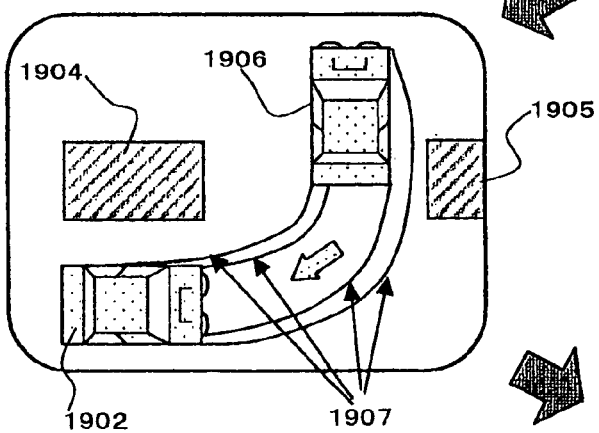
Figure 19:
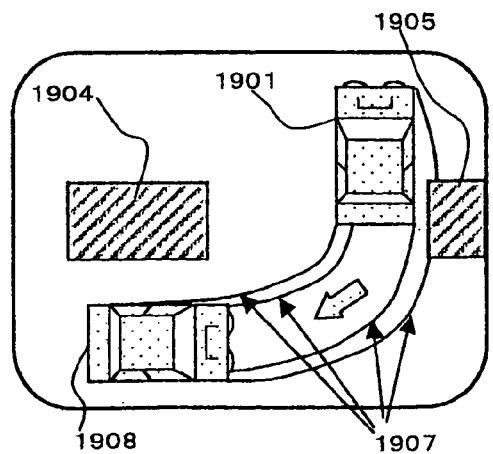

First, the driver moves a pattern showing a vehicle present at the current position 1901 of a synthetic image (FIG. 19(a)) displayed on the displaying means 107 to a new operation start position 1906 by inputting of a numerical value, a pointer, or other means as shown in FIG. 19(b).

When the new operation start position 1906 is determined, the trace correcting means 1801 obtains a new tire trace 1907 (refer to FIG. 19(c)) for a vehicle to move from the new operation start position 1906 to the target parking position 1902 and generates new assumed-movement patterns and time-series data corresponding to the new assumed-movement patterns.

The superimposing means 102 adjusts an operation start position of the new assumed-movement pattern to the current position 1901 of a vehicle and generates a synthetic image as shown in FIG. 19(d) and the displaying means 107 displays the synthetic image.

Therefore, a driver can park a vehicle to the target parking position 1902 by moving the vehicle so as to adjust an operation end position 1908 of the new assumed-movement pattern to the target parking position 1902 and then, starting a driving operation (parking operation) in accordance with the new assumed-movement pattern.

It is permitted to store the generated new assumed-movement pattern and time-series data in the assumed-movement-pattern storing means 108 after updating an original assumed-movement pattern or to additionally store the new assumed-movement pattern and time-series data in the assumed-movement pattern storing means 108 without updating the original assumed-movement pattern. Moreover, it is permitted not to store them as temporary matters assumed-movement pattern and time-series data in the means 108. Furthermore, it is permitted that a driver selects renewed storage, additional storage, or non-storage each time.

Moreover, for this embodiment, it is described that an assumed-movement pattern to be renewedly stored or additionally stored in the assumed-movement-pattern storing means 108 is automatically obtained in accordance with positions of a vehicle at start and end of driving input by a driver. However, it is also permitted to perform an actual driving operation, sample time-series data at that time for the steering angle of a steering wheel, the number of revolution of wheels and the like, and generate and store an assumed-movement pattern in accordance with the time-series data.

According to this embodiment, it is possible to realize an extensible driving-operation assist compared to the driving-operation assist of the first embodiment.

Sixth Embodiment

Then, a sixth embodiment of the present invention will be described below by referring to the accompanying drawings.

Figure 20:
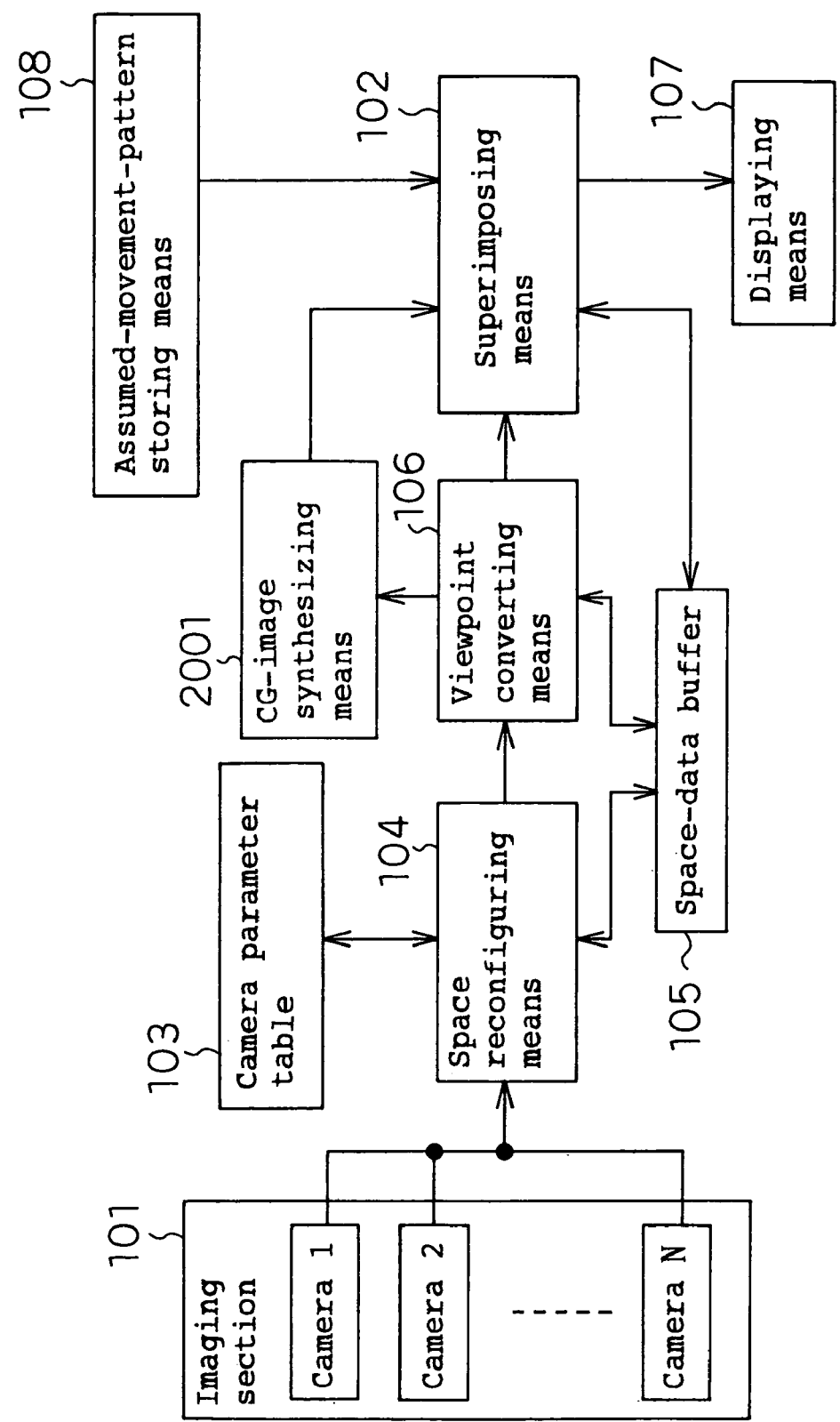
FIG. 20 is a block diagram showing a configuration of a driving-operation assist of a sixth embodiment of the present invention.

FIG. 20 is a block diagram showing a configuration of the driving-operation assist of the sixth embodiment of the present invention. The driving-operation assist of this embodiment is also mainly used to assist driving operations for garaging, parallel parking and the like. Therefore, in this embodiment, it is assumed that a component with no explanation is the same as the case of the first embodiment and a component provided with the same symbol as the case of the first embodiment has the same function as the case of the first embodiment unless otherwise explained. Moreover, each modified example described for the first embodiment can be applied to this embodiment by applying the same modification unless otherwise described.

As shown in FIG. 20, the configuration of the driving-operation assist of this embodiment is different from that of the driving-operation assist of the first embodiment in that CG-image synthesizing means 2001 is included.

The CG-image synthesizing means 2001 stores three-dimensional data corresponding to the assumed-movement patterns stored in the assumed-movement-pattern storing means 108 and generates a three-dimensional (or two-dimensional) image adjusted to a viewpoint of a circumferential-state image, which corresponds to a part of the function of assumed-movement-pattern storing means of the present invention and a part of the function of synthetic-image generating means of the present invention.

It is assumed that the viewpoint converting means 106 can change positions of a viewpoint automatically or in accordance with an input from a driver.

Figure 21:
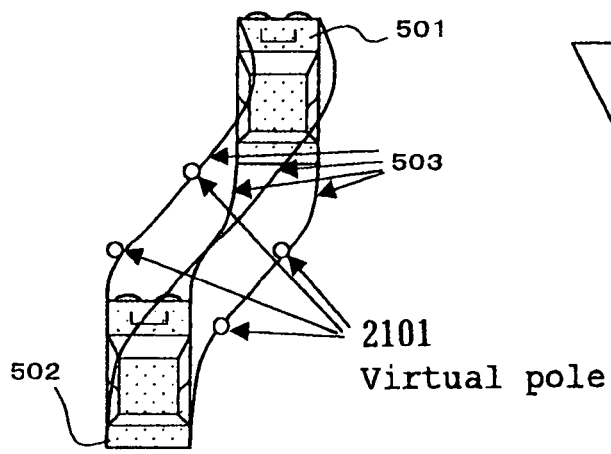
FIGS. 21(a) to 21(e) are illustrations showing synthetic images of the driving-operation assist of the sixth embodiment of the present invention.
Figure 21:
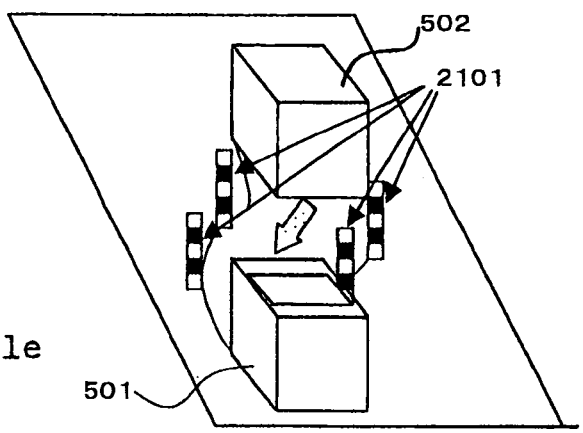
Figure 21:
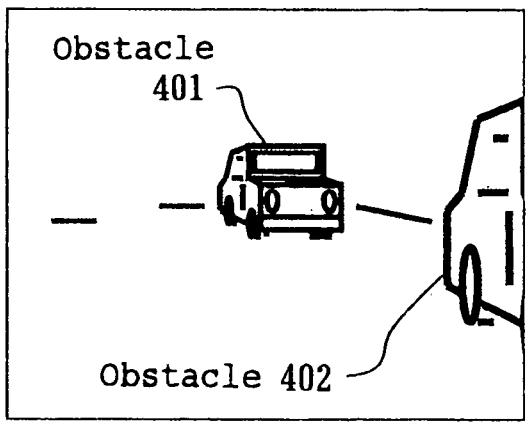
Figure 21:
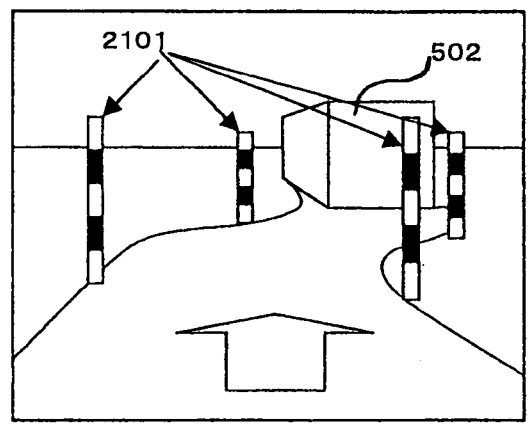
Figure 21:
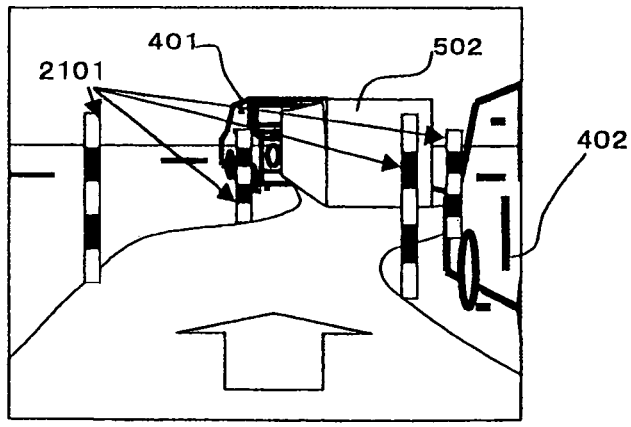

Moreover, as shown in FIG. 21(a), the assumed-movement-pattern storing means 108 stores positions of a plurality of virtual poles 2001[sic;2101] arranged on the tire traces 503 together with stored assumed-movement patterns (operation start position 501, operation end position 502, and tire traces 503). The CG-image synthesizing means 2001 previously generates and stores three-dimensional-data (refer to FIG. 21(b)) corresponding to the assumed-movement patterns in accordance with the data for the assumed-movement patterns and the virtual poles 2001[sic;2101].

In this embodiment, a procedure until a circumferential-state image of the present invention is generated in accordance with the video data imaged by the imaging section 101 is the same as that described for the first embodiment. Moreover, a procedure until an actual driving operation corresponding to an assumed-movement pattern is started in a procedure until the superimposing means 102 generates a synthetic image of the present invention and the displaying means 107 displays the synthetic image is the same as that described for the first embodiment.

A procedure until the superimposing means 102 generates a synthetic image of the present invention and the displaying means 107 displays the synthetic image after an actual driving operation corresponding to an assumed-movement pattern is started is described below by using a case of performing parallel parking to the left side as an example.

Before starting an actual driving operation, a driver changes a viewpoint of a circumferential-state image used by the viewpoint converting means 106 to a viewpoint for viewing the rear from the back of the vehicle concerned from a position just above the vehicle concerned. Or, when the viewpoint converting means 106 detects that an actual driving operation corresponding to an assumed-movement pattern is started, the viewpoint is automatically changed to the latter viewpoint. Specific means for detecting that an actual driving operation is started includes, for examples, means same as the start detecting means 1301 described for the second embodiment.

Because viewpoints are changed, a circumferential-state image which is an output from the viewpoint converting means 106 becomes the image shown in FIG. 21(c). The CG-image synthesizing means 2001 generates a CG image viewed from a viewpoint same as the viewpoint used by the viewpoint converting means 106 by adjusting the current position of the vehicle concerned to the operation start position 501. In this case, the CG image becomes the image shown in FIG. 21(d).

The superimposing means 102 superimposes the CG image on a circumferential-state image and synthesizes them to generate a synthetic image of the present invention as shown in FIG. 21(e). The displaying means 107 displays the synthetic image. Because the synthetic image is an image viewed from a viewpoint fixed on a vehicle, the whole image is displayed while moving relatively when the vehicle moves in case of FIG. 21(e).

In this embodiment, because a driver can determine a parking start position while viewing the displayed image and confirming the relation between a virtual pole or an operation end position and an actual obstacle at a glance, the driver can perform a safe and secure driving operation.

In the above explanation, the CG-image synthesizing means 2001 generates a CG image from a viewpoint same as the viewpoint used by the viewpoint converting means 106 in real time. However, it is also permitted to use a configuration of previously generating a CG image viewed from a predetermined viewpoint position every assumed-movement pattern and storing these CG images.

Figure 22:
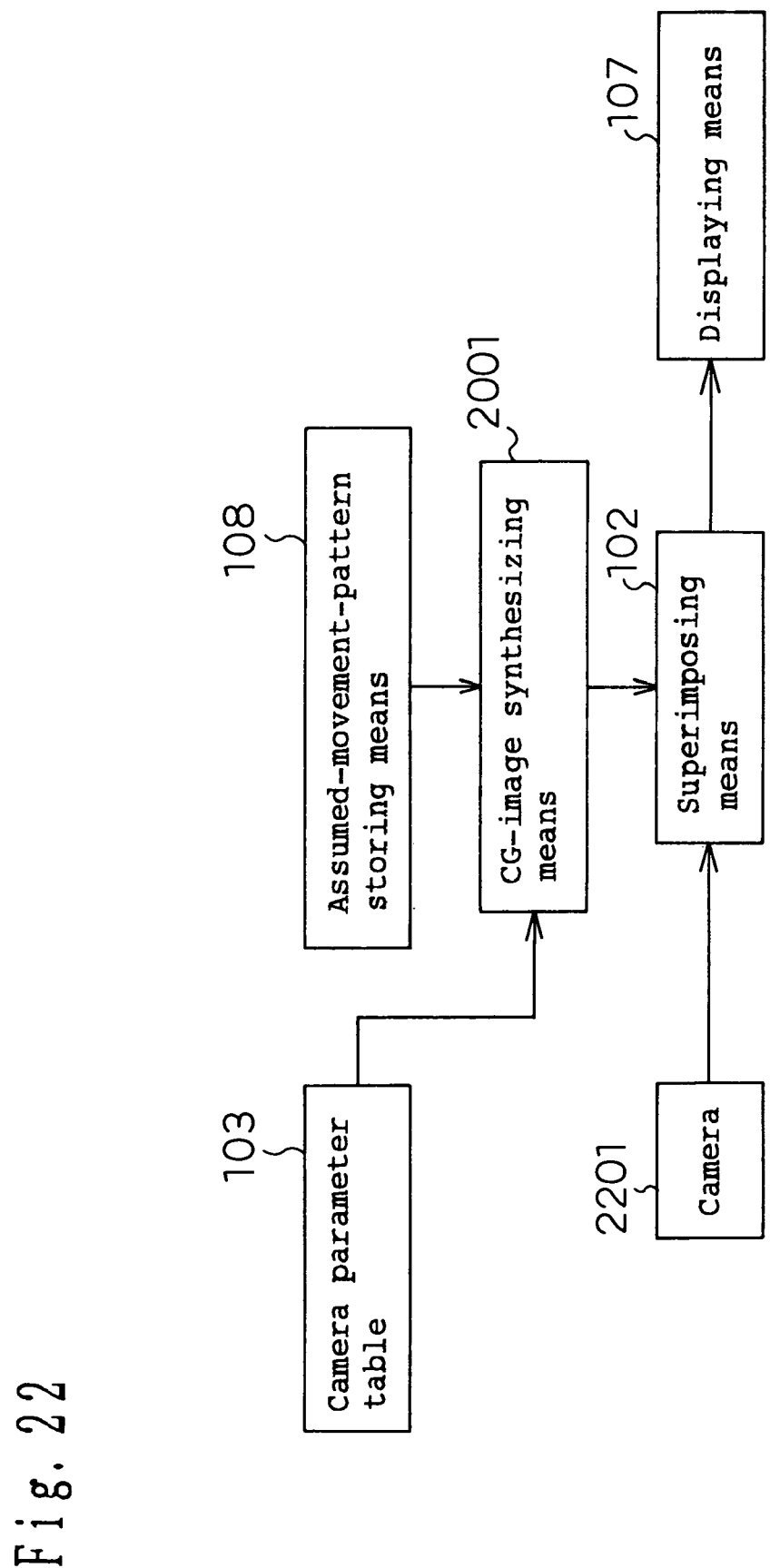
FIG. 22 is a block diagram of a configuration of a modification of the driving-operation assist of the sixth embodiment of the present invention.

Moreover, in this embodiment, it is described that a circumferential-state image viewed from a virtual camera is generated similarly to the case of the first embodiment. However, when purposing only an image viewing the rear from the back of a vehicle without changing any viewpoint, it is also permitted to directly use an image imaged by a camera set to the viewpoint position concerned as a circumferential-state image. A configuration of a driving-operation assist in this case is shown by the block diagram in FIG. 22. That is, the CG-image synthesizing means 2001 generates a CG image by obtaining the data for a viewpoint of a vehicle-mounted camera 2201 from the camera parameter table 103.

Seventh Embodiment

Then, a seventh embodiment of the present invention will be described below by referring to the accompanying drawings.

Figure 23:
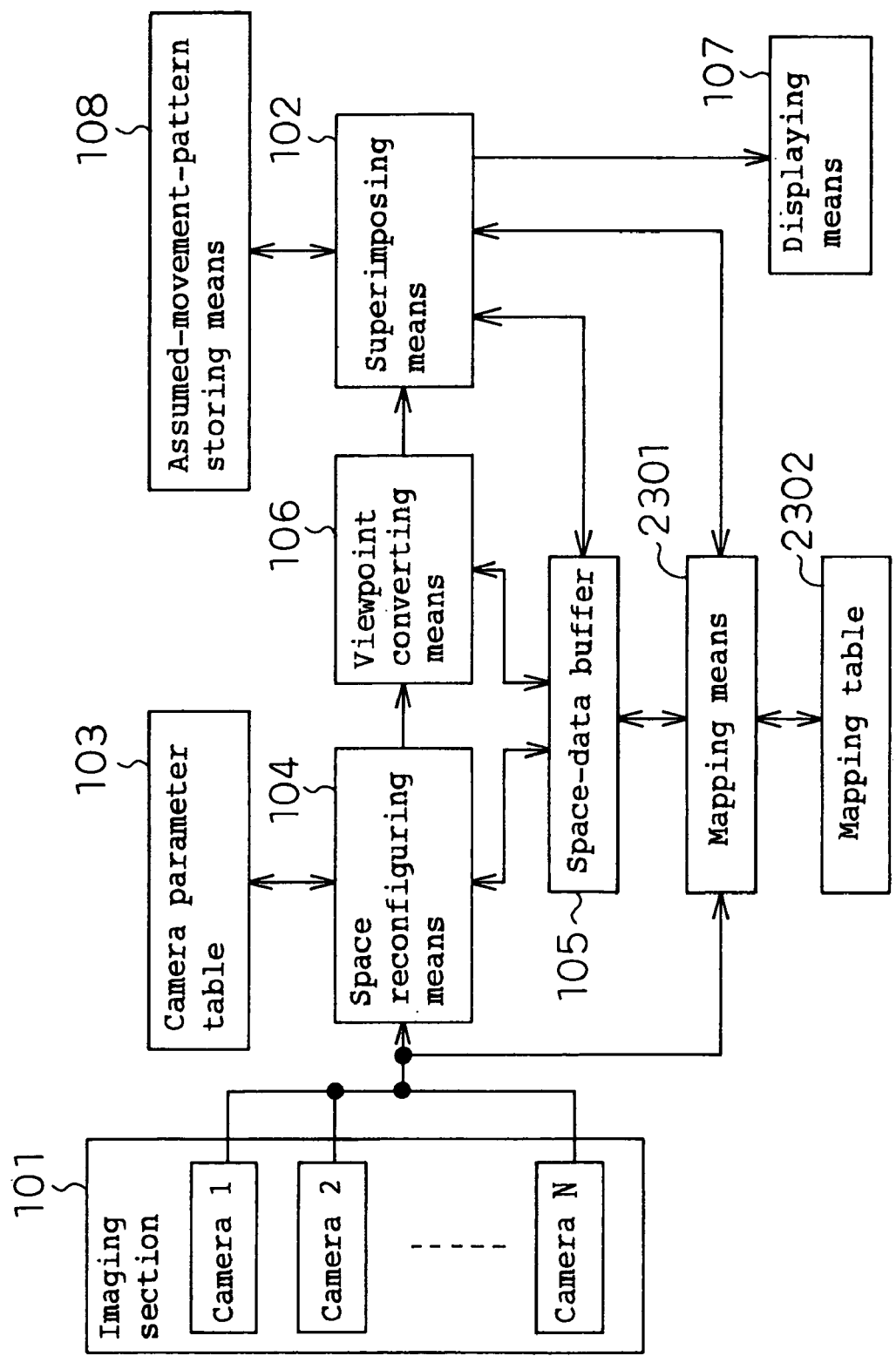
FIG. 23 is a block diagram showing a configuration of a driving-operation assist of a seventh embodiment of the present invention.

FIG. 23 is a block diagram showing a configuration of the driving-operation assist of the seventh embodiment of the present invention. The driving-operation assist of this embodiment is also mainly used to assist driving operations for garaging, parallel parking and the like. Therefore, in this embodiment, it is assumed that a component with no explanation is the same as the case of the first embodiment and a component provided with the same symbol as the case of the first embodiment has the same function as the case of the first embodiment unless otherwise explained. Moreover, it is assumed that each modified example described for the first embodiment can be applied to this embodiment by applying the same modification unless otherwise described.

As shown in FIG. 23, the configuration of the driving-operation assist of this embodiment is different from that of the driving-operation assist of the first embodiment in that mapping means 2301 and a mapping table 2302 are included.

The mapping means 2301 fast performs the processing for converting an image input from each camera of the imaging section 101 into an image viewed from an optional viewpoint.

The mapping table 2302 stores the data used for the mapping means 2301 to perform conversion.

FIG. 24 is a conceptual view showing are example of a mapping table stored in the mapping table 2302. The mapping table is configured by cells equal to the number of pixels of a screen (that is, a synthetic image generated by the superimposing means 102) displayed by the displaying means 107. That is, the mapping table is configured so that the number of horizontal pixels on a display screen becomes equal to the number of columns of the table and the number of vertical pixels on the display screen becomes equal to the number of rows of the table. Moreover, each cell has a camera number and pixel coordinates of an image photographed by each camera as data.

For example, the top-left cell (cell in which the data (1, 10, 10) is entered) in FIG. 24 shows the top left, that is, the portion of (0,0) on the display screen and the mapping means 2301 performs the processing of displaying the data for the pixel (10,10) of an image photographed by a camera No. 1 on a display screen (0,0)" in accordance with the data content (1,10,10) stored in the cell. By using the table, it is unnecessary to perform the computation for deciding the data for a pixel of a camera with which each pixel on a display screen should be replaced whether to replace the data for a pixel of a replaced one. Therefore, it is possible to realize to accelerate the processing.

When the viewpoint converting means 106 uses a plurality of viewpoints by changing them, it is necessary that the table shown in FIG. 24 is stored in the mapping table 2302 every viewpoint.

Eighth Embodiment

Then, an eighth embodiment of the present invention will be described below by referring to the accompanying drawings.

Figure 25:
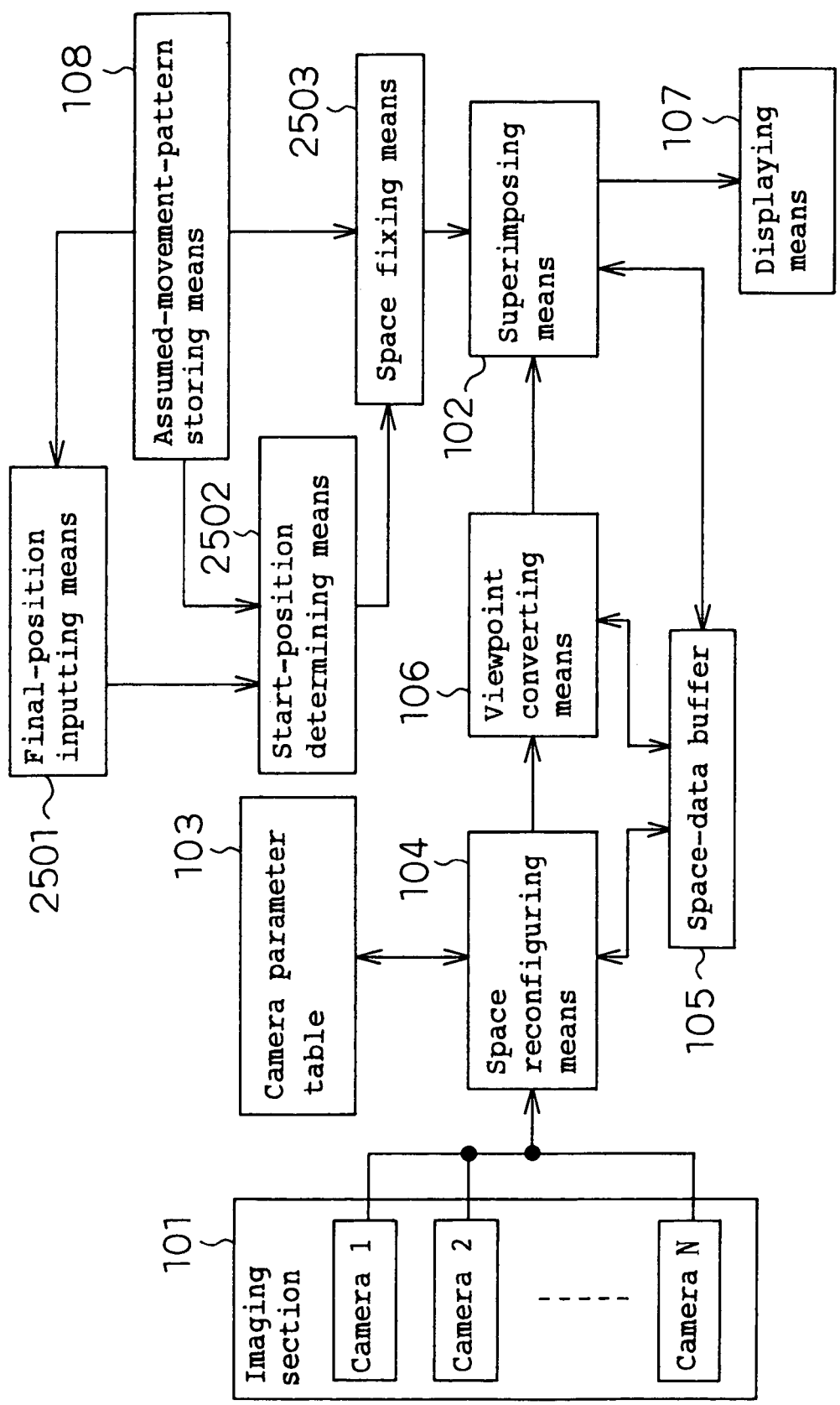
FIG. 25 is a block diagram showing a configuration of a driving-operation assist of an eighth embodiment of the present invention.

FIG. 25 is a block diagram showing a configuration of the driving-operation assist of the eighth embodiment of the present invention. The driving-operation assist of this embodiment is also mainly used to assist driving operations for garaging, parallel parking and the like. Therefore, in this embodiment, it is assumed that a component with no explanation is the same as the case of the first embodiment and a component provided with the same symbol as the case of the first embodiment has the same function as the case of the first embodiment unless otherwise explained. Moreover, it is assumed that each modified example described for the first embodiment can be applied to this embodiment by applying the same modification unless otherwise described.

As shown in FIG. 25, the configuration of the driving-operation assist of this embodiment is different from that of the driving-operation assist of the first embodiment in that final-position inputting means 2501, start-position determining means 2502, and space fixing means 2503 are included.

The final-position inputting means 2501 inputs a target end position of a driving operation by a pointer. It is also permitted to input the target end position by inputting a numerical value or through other means.

The start-position determining means 2502 obtains a start position of a driving operation corresponding to a target end position input by the final-position inputting means 2501 in accordance with an assumed-movement pattern corresponding to the driving operation concerned.

The space fixing means 2503 makes the target end position coincide with the operation end position and thereafter, spatially fixes an assumed-movement pattern corresponding to the driving operation, which has the functions of the integrating means 1302 and space converting means 1303 in FIG. 13 (in FIG. 25, a rear-wheel-rotation-signal input and a steering-wheel-turning-angle signal input are not illustrated).

Moreover, it is permitted that the means 2503 has the functions of the image tracking means 1502 and space converting means 1503 in FIG. 15. In this case, however, it is necessary to receive an input of space data from the space buffer 105 [sic; space data buffer 105] similarly to the case of the image tracking means 1502 in FIG. 15. An assembly configured by the superimposing means 102 and space fixing means 2503 corresponds to synthetic-image generating means of the present invention.

In this embodiment, a procedure until a circumferential-state image of the present invention is generated in accordance with the video data imaged by the imaging section 101 is the same as that described for the first embodiment. Moreover, a procedure until an assumed-movement pattern stored in the assumed-movement-pattern storing means 108 is displayed on a synthetic image by adjusting an operation start position of the pattern to a current position of a vehicle in a procedure until the superimposing means 102 generates a synthetic image of the present invention and the displaying means 107 displays the synthetic image is the same as that described for the first embodiment.

A procedure until a driver inputs a target end position of a driving operation by using the final-position inputting means 2501 and an assumed-movement pattern including a driving-operation start position corresponding to the target end position is displayed on the synthetic image after an assumed-movement pattern is displayed on a synthetic image will be described below by using a case of performing garaging to the left side as an example.

As shown in FIG. 26(a), a case is assumed in which, as a result of driver's displaying a synthetic image of the present invention on the displaying means 107 to park a vehicle between the obstacles 401 and 402 so as not to contact them, the parking position 1001 which is the operation end position of the assumed-movement pattern 1403 using the current position 901 of a vehicle as an operation start position overlaps with the obstacle 402.

The driver moves the parking position 1001 to a target position 2602 by using a pointer 2601 displayed on the screen of the displaying means 107. In this case, as shown in FIG. 26(b), the assumed-movement pattern 1403 moves together with the parking position 1001. Therefore, the operation start position of the assumed-movement pattern 1403 is displayed as a start position 2603 for starting a parking operation.

As shown in FIG. 26(c), even after the above moving operation is completed, the current position 901 of the vehicle is still displayed on the screen of the displaying means 107. The driver only has to move the vehicle to the start position 2603 while viewing the screen. In this case, because the assumed-movement pattern 1403 is fixed in a space by the space fixing means 2503, the relative positional relation between the assumed-movement pattern 1403 and the obstacles 401 and 402 is not changed.

According to this embodiment, because a driving-operation start position can be efficiently obtained in addition to the advantages described for the first embodiment, it is possible to decrease the time required by start of the operation.

Moreover, it is permitted to add a start-position guiding means to the driving-operation assist of this embodiment, which computes a relative positional relation with the current position 901 when the start position 2603 is determined, obtains time-series data for a steering-wheel rotation angle and the number of revolutions of rear wheels necessary to guide a vehicle from the current position 901 up to the start position 2603, generates a steering-wheel-rotation-angle control signal and a number-of-revolution-of-rear-wheel control signal in accordance with the time-series data, controls a steering-wheel system and a rear-wheel driving system, and thereby automatically controls driving of the vehicle and automatically guides the vehicle from the current position 901 up to the start position 2603. Thereby, because the vehicle is guided up to a start position without operations by the driver, simpler and safer vehicle operations are realized.

Ninth Embodiment

Then, a ninth embodiment of the present invention will be described below by referring to the accompanying drawings.

Figure 27:
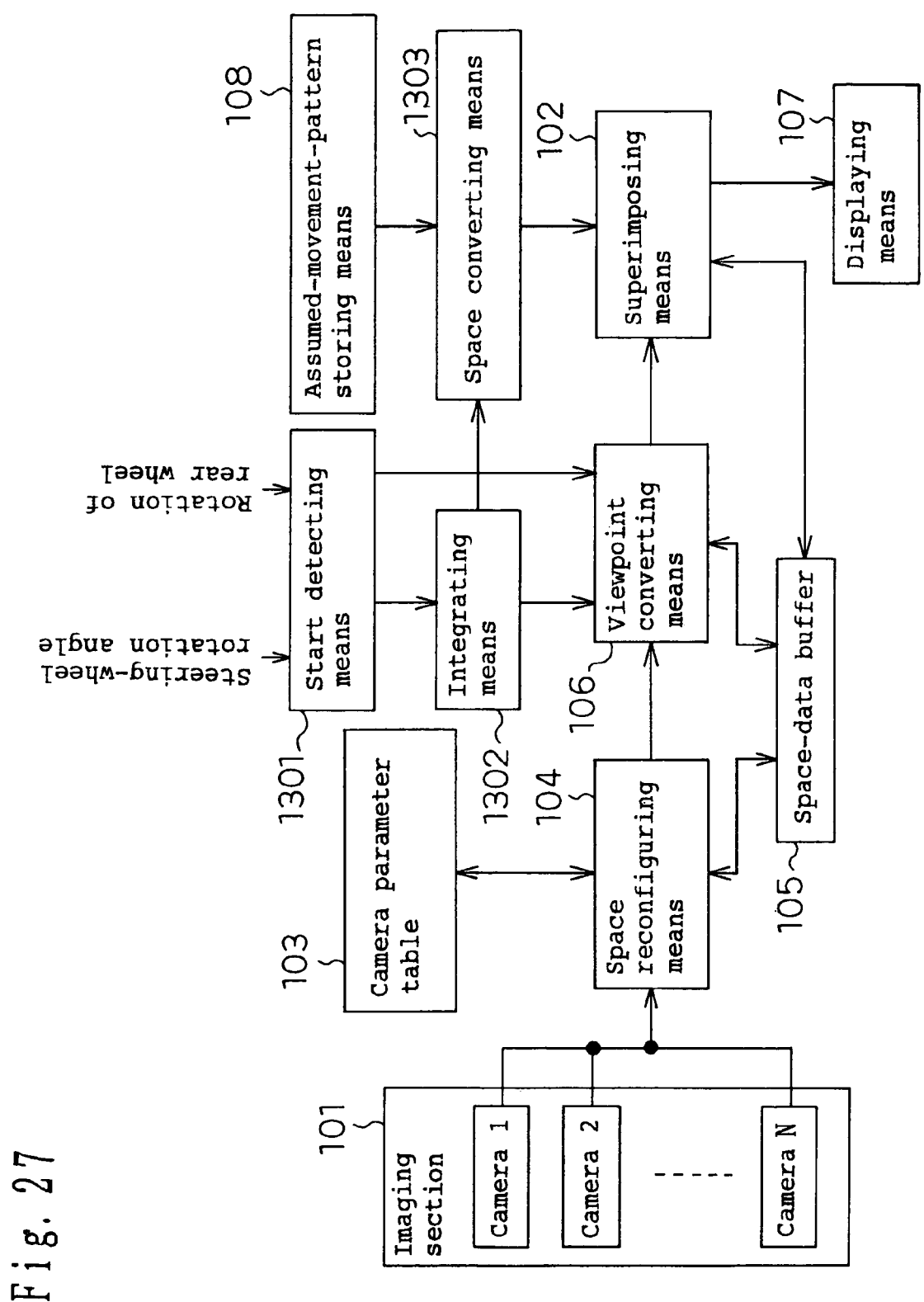
FIG. 27 is a block diagram showing a configuration of a driving-operation assist of a ninth embodiment of the present invention.

FIG. 27 is a block diagram showing a configuration of the driving-operation assist of the ninth embodiment of the present invention. The driving-operation assist of this embodiment is different from that of the second embodiment only in that outputs of the start detecting means 1301 and the integrating means 1302 are input to the viewpoint converting means 106 and the viewpoint converting means 106 changes viewpoints of a virtual camera in accordance with the outputs.

Therefore, in this embodiment, it is assumed that a component with no explanation is the same as the case of the second embodiment and a component provided with the same symbol as the case of the second embodiment has the same function as the case of the second embodiment unless otherwise explained. Moreover, it is assumed that each modified example described for the second embodiment can be applied to this embodiment by applying the same modification unless otherwise described.

In this embodiment, a procedure until a circumferential-state image of the present invention is generated in accordance with the video data imaged by the imaging section 101 is the same as that described for the first embodiment. Moreover, a procedure until an actual driving operation corresponding to an assumed-movement pattern is started in a procedure until the superimposing means 102 generates a synthetic image of the present invention and the displaying means 107 displays the synthetic image is the same as that described for the first embodiment.

A procedure until the superimposing means 102 generates a synthetic image of the present invention and the displaying means 107 displays the synthetic image after an actual driving operation corresponding to an assumed-movement pattern is started will be described below by using a case of performing parallel parking to the left side as an example.

Figure 28A:
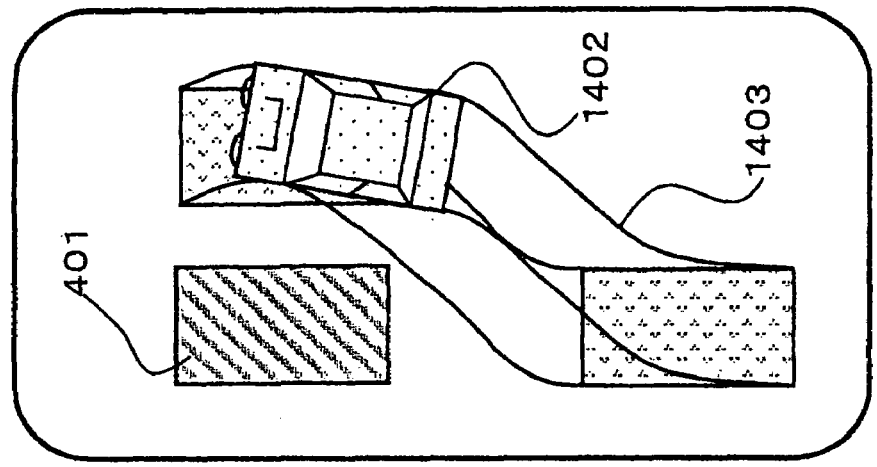
FIGS. 28(a) to 28(c) are illustrations showing synthetic images of the driving-operation assist of the ninth embodiment of the present invention.

Before an actual driving operation is started, a viewpoint position of a virtual camera is fixed to a position just above a vehicle as described for the first embodiment by referring to FIG. 10, the current vehicle position 901 and the assumed-movement pattern 1403 using the position 901 as an operation start position is fixed on a screen as shown in FIG. 28(a), and circumferential-state images such as the obstacles 401, 402 or the like, are displayed while relatively moving on the screen in accordance with movement of the vehicle.

Figure 28B:
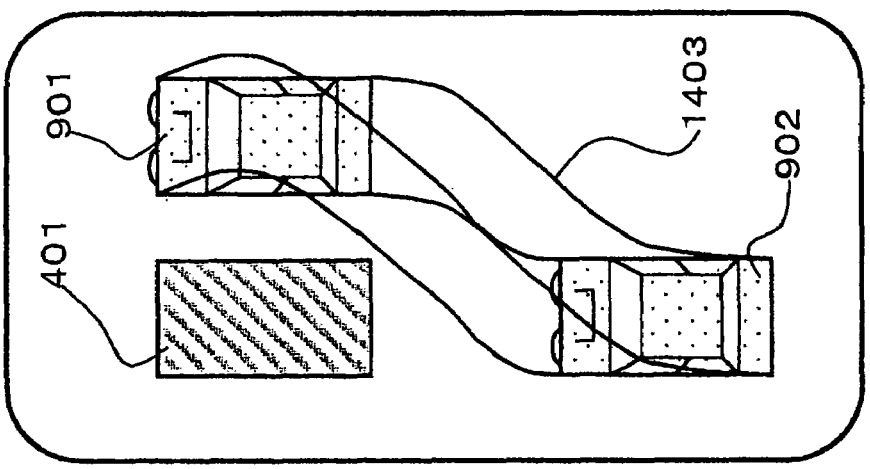

As shown in FIG. 28(b), when the current vehicle position 901 comes to a position corresponding to the target parking position 902, a driver starts a driving operation corresponding to parallel parking to the left side. When the driving operation is started, a gear signal shows a backward-movement state and a front-wheel steering angle according to a steering-wheel-turning-angle signal reaches a certain value or more. Therefore, the start detecting means 1301 judges that the driving operation (parking operation) corresponding to the parallel parking to the left side is started and communicates that the driving operation (parking operation) is started to the integrating means 1302 and viewpoint converting means 106.

The integrating means 1302 integrates input steering-wheel-rotation-angle signal and number-of-revolution-of-rear-wheel signal after start of the driving operation to compute the positional relation between the current vehicle position 1402 and the parking-operation start position 1401 as shown in FIG. 14(a).

In accordance with the computed positional relation, the space converting means 1303 moves the assumed-movement pattern 1403 corresponding to the parallel parking to the left side so that the operation start position (501 in FIG. 5) of the pattern 1403 coincides with the parking-operation start position 1401 as shown in FIG. 14(b). In other words, the space converting means 1303 spatially fixes the assumed-movement pattern 1403 to the position at start of the parking operation after start of the driving operation.

When the viewpoint converting means 106 receives that the driving operation (parking operation) is started, it fixes the then viewpoint position of the virtual camera to a space (ground). That is, after start of the driving operation, the circumferential-state images (obstacles 401, 402 or the like) are fixed on the screen.

Figure 28C:
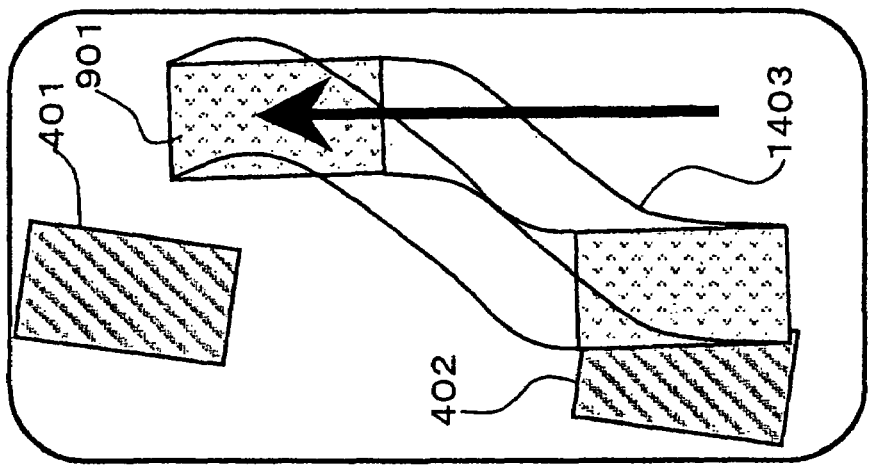

After start of the driving operation, the superimposing means 102 superimposes the assumed-movement pattern 1403 spatially fixed to the position at start of the parking operation and the current vehicle position 1402 on the circumferential-state images and synthesizes them to generate a synthetic image of the present invention as shown in FIG. 28(c). Because the viewpoint of the synthetic image is obtained by spatially fixing the viewpoint position of the virtual camera at start of the parking operation similarly to viewpoints of circumferential-state images. Therefore, the superimposing means 102 generates the synthetic image by computing the positional relation computed by the integrating means 1302 inversely to a viewpoint. That is, in this synthetic image (FIG. 28(c)), the circumferential-state images (obstacles 401, 402 or the like) and the assumed-movement pattern 1403 are fixed on the screen and the current vehicle position 1402 is displayed while relatively moving on the screen in accordance with actual movement of the vehicle.

According to this embodiment, because a viewpoint after start of a parking operation is fixed in a space, a driver can confirm a vehicle moving state to a circumferential state of a parking space at a glance.

When a movement assumed in accordance with an assumed-movement pattern includes a wide range or is complex and a range larger than the field of view of a camera of the imaging section 101 occurs after a driving operation is started, it is also permitted to display the range by using the data stored in the space-data buffer 105.

Tenth Embodiment

Then, a tenth embodiment of the present invention will be described below by referring to the accompanying drawings.

Figure 29:
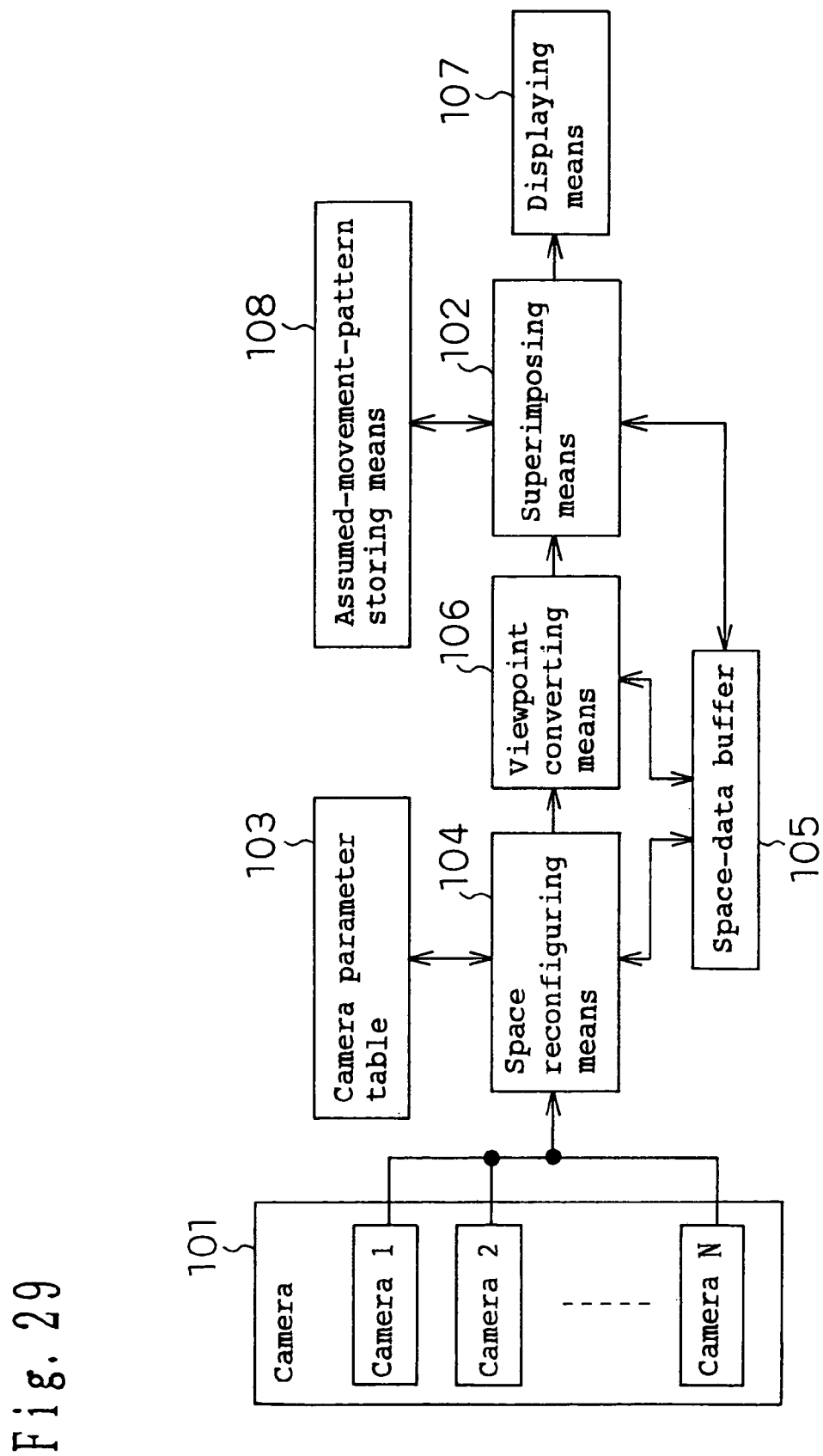
FIG. 29 is a block diagram showing a configuration of a driving-operation assist of a tenth embodiment of the present invention.

FIG. 29 is a block diagram showing a configuration of the driving-operation assist of the tenth embodiment of the present invention. The driving-operation assist of this embodiment is different from that of the first embodiment only in that two cases are assumed in which a vehicle moves backward when turning a steering wheel up to the maximum angle clockwise and counterclockwise to tire rotation as default driving patterns stored in the assumed-movement-pattern storing means 108 as shown in FIG. 30(b), two circumscribed area traces 604 in a space through which the whole of the vehicle passes in stead of the tire traces 603 caused by assumed movements of the two cases are synthesized by the superimposing means 102 at the same time as shown in FIG. 30(a), and the synthesized result is displayed on the displaying means 107.

Therefore, in this embodiment, it is assumed that a component with no explanation is the same as the case of the first embodiment, a component provided with the same symbol as the case of the first embodiment has the same function as the case of the first embodiment unless otherwise explained. Moreover, it is assumed that each modified example described for the first embodiment can be applied to this embodiment by applying the same modification unless otherwise described.

Figure 30:
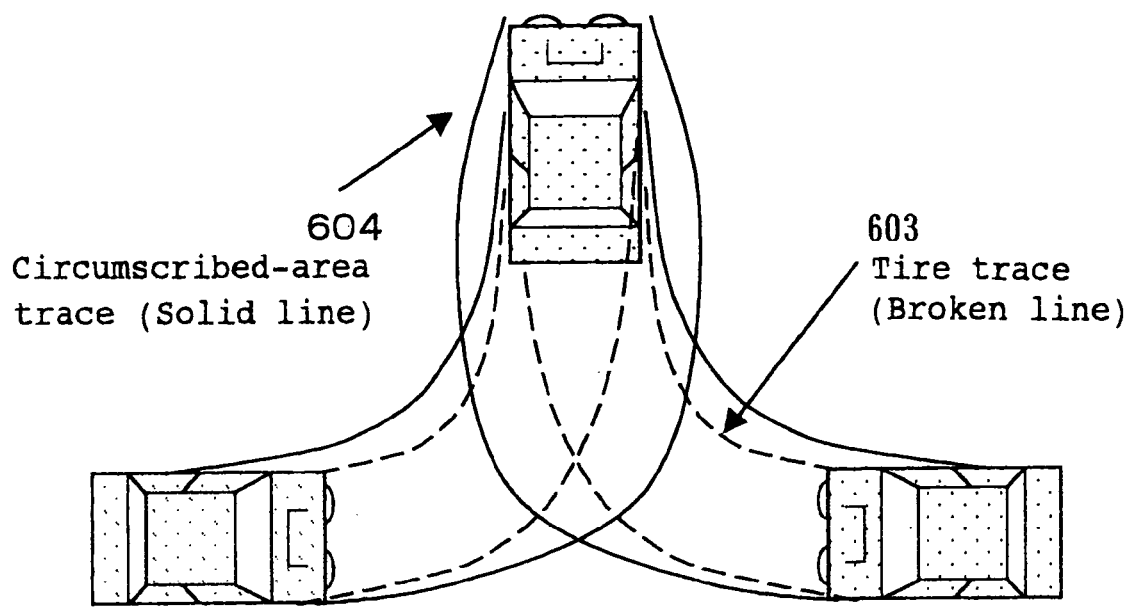
FIGS. 30(a) and 30(b) are illustrations showing synthetic images of the driving-operation assist of the tenth embodiment of the present invention.

According to this embodiment, two simplest cases are assumed in which a vehicle moves backward when turning a steering wheel up to the maximum angle clockwise and counterclockwise as shown in FIG. 30(b) as defaults of the assumed-movement storing pattern 108 [sic; assumed-movement pattern storing means]. Therefore, when the vehicle can be parked in accordance with the defaults of the assumed-movement storing pattern 108 [sic; assumed-movement pattern storing means], advantages can be obtained that it becomes unnecessary to change and select a plurality of assumed-movement storing patterns and an operating load of a driver can be reduced.

Moreover, it becomes unnecessary to change and select two left and right assumed-movement storing patterns by simultaneously synthesizing circumscribed area traces 604 produced due to assumed movements of the above described two cases by the superimposing means 102 and by displaying the synthesized result on the displaying means 107, and consequently there can be obtained such an effect that an operating load of the driver can be reduced.

Furthermore, as shown in FIG. 30(a), the circumscribed area traces 60 in a space through which the whole of the vehicle passes instead of the tire traces 603 are synthesized by the superimposing means 102, and the synthesized result is displayed on the displaying means 107, and thereby an advantage can be obtained that a driver can easily and more accurately confirm whether a portion of a vehicle to be protruded beyond a tire trace such as the right front portion of the vehicle when parking the vehicle while turning left-backward contacts with an obstacle.

Eleventh Embodiment

Then, an eleventh embodiment of the present invention will be described below by referring to the accompanying drawings.

Figure 31:
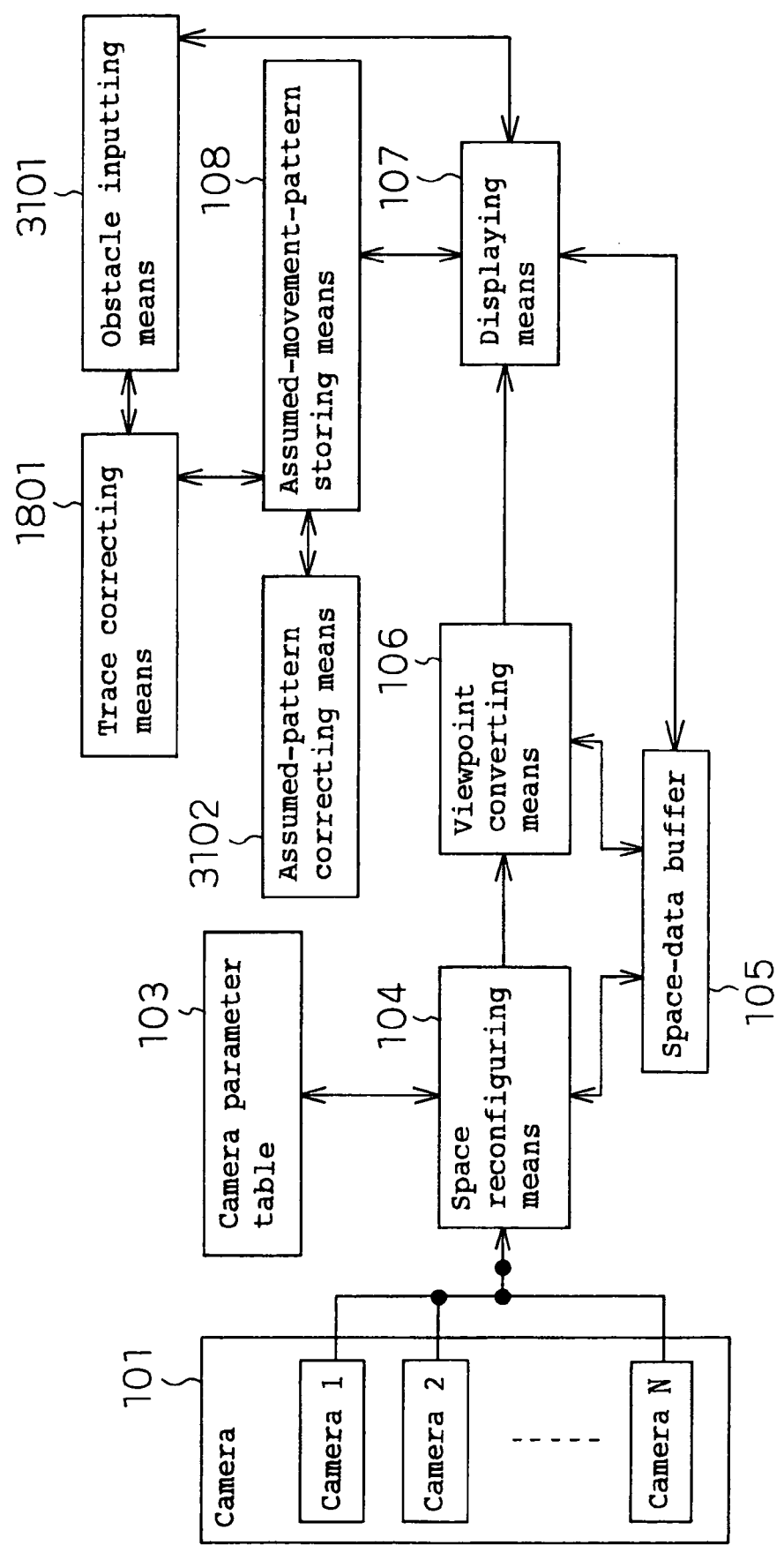
FIG. 31 is a block diagram showing a configuration of a driving-operation assist of an eleventh embodiment of the present invention.

FIG. 31 is a block diagram showing a configuration of the driving-operation assist of the eleventh embodiment of the present invention. The driving-operation assist of this embodiment is also mainly used to assist driving operations for garaging and parallel parking. Therefore, in this embodiment, it is assumed that a component with no explanation is the same as the case of the first and fifth embodiments and a component provided with the same symbol as the case of the first and fifth embodiments has the same function as the case of the first and fifth embodiments unless otherwise explained. Moreover, it is assumed that each modified example described for the first and fifth embodiments can be applied to this embodiment by applying the same modification unless otherwise described.

Figure 32:
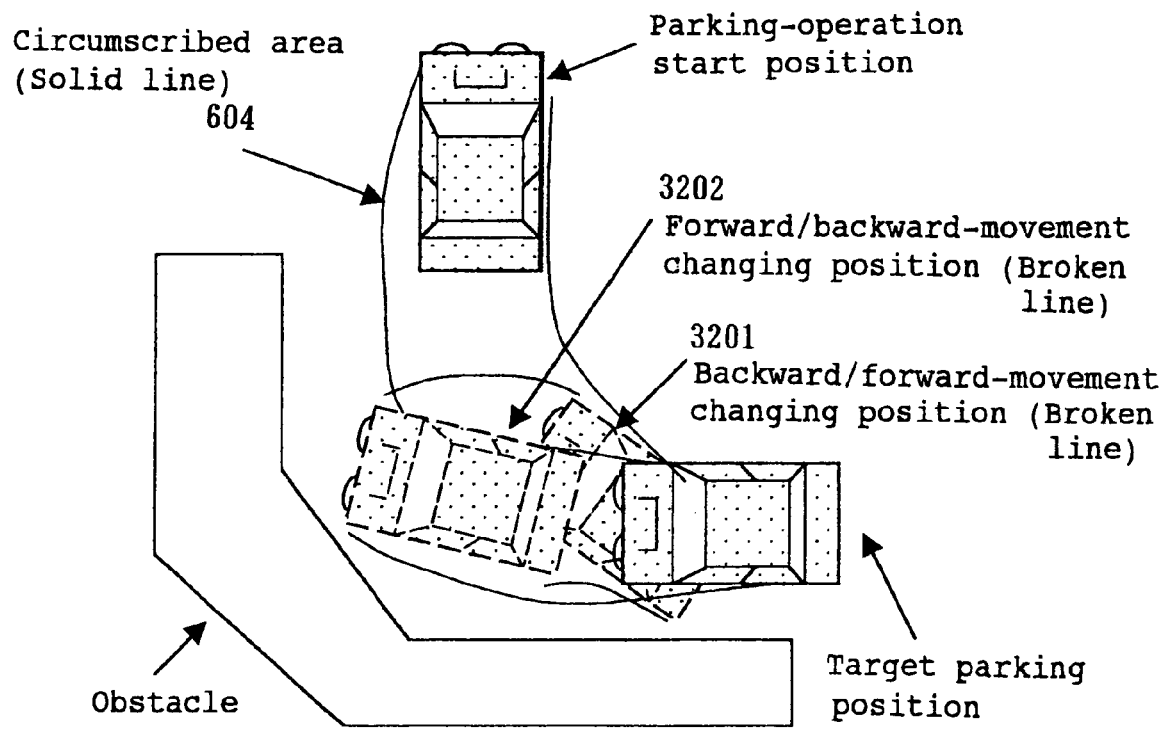
FIGS. 32(a) and 32(b) are illustrations showing synthetic images of the driving-operation assist of the eleventh embodiment of the present invention.

The configuration of the driving-operation assist of this embodiment is different from those of the first and fifth embodiments in that the obstacle inputting means 3101 and assumed-pattern correcting means 3102 shown in FIG. 31 are included and the assumed-movement-pattern storing means 108 includes a movement pattern for changing backward and forward movements of a vehicle while the vehicle moves as shown in FIG. 32(a).

In this case, a steering-wheel angle corresponding to tire rotation is stored in the assumed-movement-pattern storing means 108 in FIG. 31 as time-series data for assumed-movement patterns as shown in FIG. 32(b). As shown in FIG. 32(b), tire rotation of 0 to 0.8 shows backward movement of a vehicle at which backward movement is changed to forward movement. In this case, the position of the vehicle is present at a backward- and forward-movement changing position 3201 shown in FIG. 32(a). Then, the vehicle moves forward to a tire angle of 0.8 to 0.6. When the vehicle reaches the forward- and backward-movement changing position 3202 shown in FIG. 32(a), forward movement is changed to backward movement again such as a tire angle of 0.6 to 1.4.

Thus, by including a movement pattern for changing backward and forward movements during movement, it is possible to control a position and direction of a vehicle even if there is only a small spatial margin for an obstacle as shown in FIG. 32(a).

In this embodiment, a procedure until a circumferential-state image of the present invention is generated in accordance with the video data imaged by the imaging section 101 is the same as that described for the first embodiment. A procedure until an assumed-movement pattern stored in the assumed-movement-pattern storing means 108 is displayed on a synthetic image of the present invention by adjusting an operation start position of the pattern to the current position of a vehicle in a procedure until the superimposing means 102 generates the synthetic image and the displaying means 107 displays the synthetic image is the same as that described for the first embodiment.

A procedure until a driver corrects an assumed-movement pattern and time-series data by using the trace correcting means 1801 and obstacle inputting means 3101 after the assumed-movement pattern is displayed on a synthetic image and the corrected assumed-movement pattern and time-series data are displayed on the synthetic image is described below by using a case of performing garaging to the right side as an example.

Figure 33:
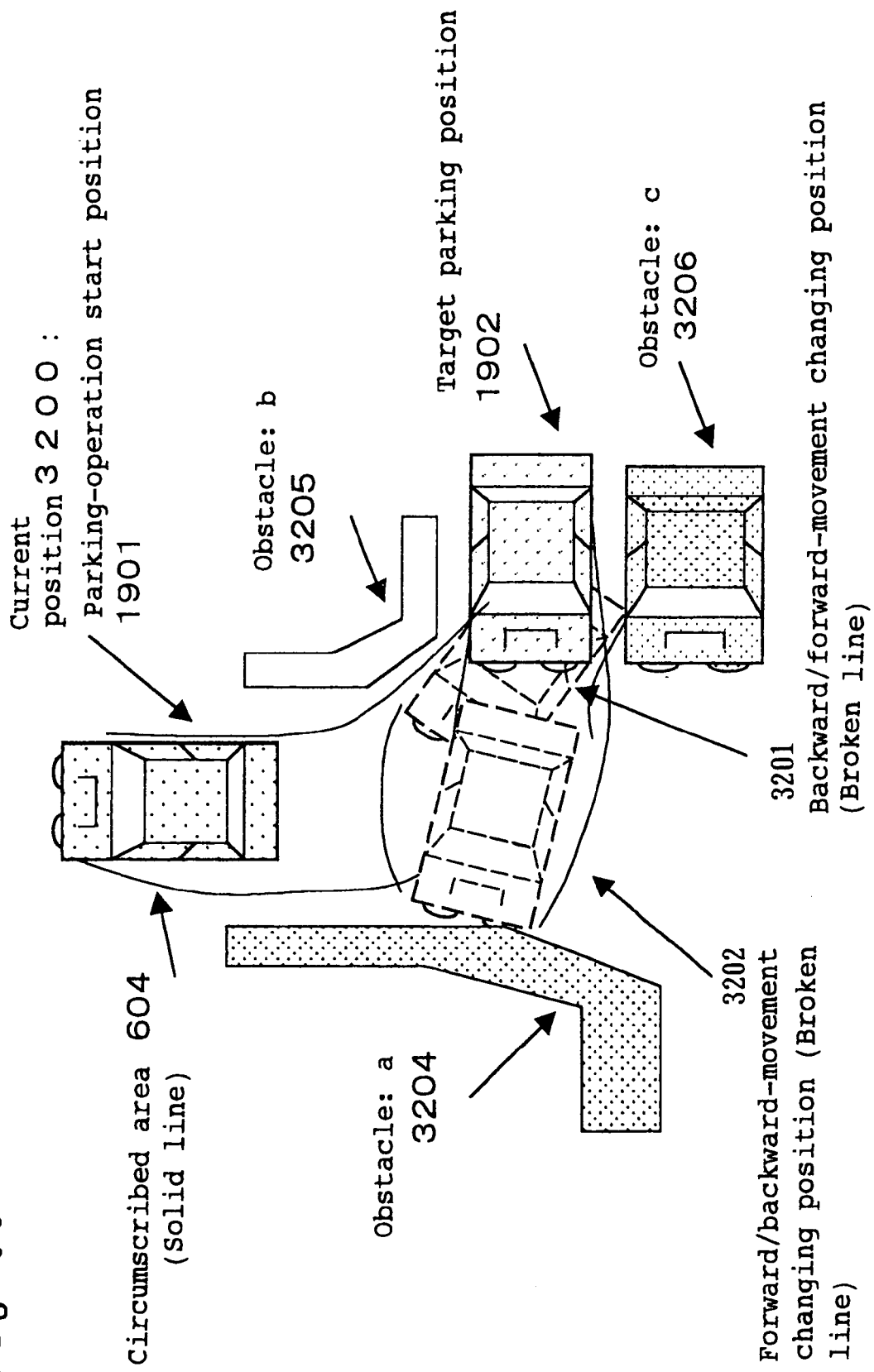
FIG. 33 is an illustration showing a synthetic image of the driving-operation assist of the eleventh embodiment of the present invention.

As shown in FIG. 33, a case is assumed in which a driver moves a vehicle to the current position 1901 where an operation end position of an assumed-movement pattern coincides with the target parking position 1902 in order to perform a garaging operation using the target parking position 1902 as an operation end position so that the vehicle does not contact with an obstacle (a 3204, b 3205, or c 3206) and thereby, it is found that the circumscribed area 604 of the assumed-movement pattern may contact with the obstacle a, b, or c.

When the assumed-movement-pattern storing means 108 stores an assumed-movement pattern for another garaging operation to the right side, it is permitted to select the assumed-movement pattern by pattern selecting means (not illustrated) and study if a parking operation can be smoothly performed. However, when the means 108 does not store the assumed-movement pattern or another assumed-movement pattern also interferes with an obstacle or the like, the driver corrects the assumed-movement pattern.

Figure 34:
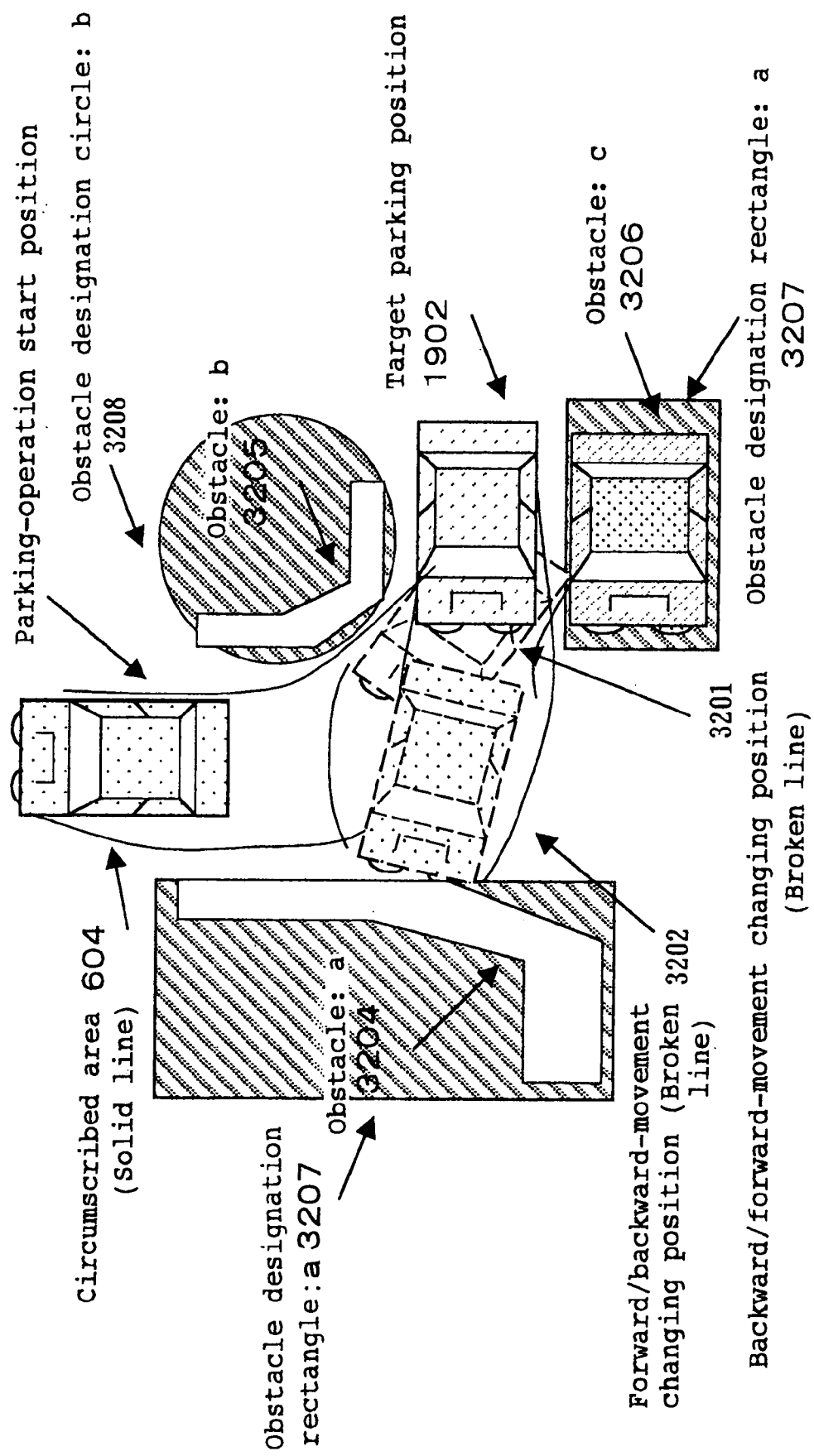
FIG. 34 is an illustration showing a synthetic image of the driving-operation assist of the eleventh embodiment of the present invention.

First, the driver assumes a pattern showing the vehicle present at the current position 3200 of the synthetic image (FIG. 33) shown on the displaying means 107 in FIG. 31 as the parking-operation start position 1901, assumes an area in the image in which the obstacle a, b, or c is present as an obstacle designation rectangle: a 3207 as shown in FIG. 34 by using the obstacle inputting means 3101 in FIG. 31 or as an obstacle designation area: 3210 (refer to FIG. 36) by using an obstacle designation circle: b 3208, and sets and inputs the obstacle designation rectangle or the obstacle designation area through numerical-value input, a pointer, or other means. Moreover, when it is necessary to correct the target parking position, the driver performs movement input through numerical-value input, a pointer, or other means.

Figure 35:
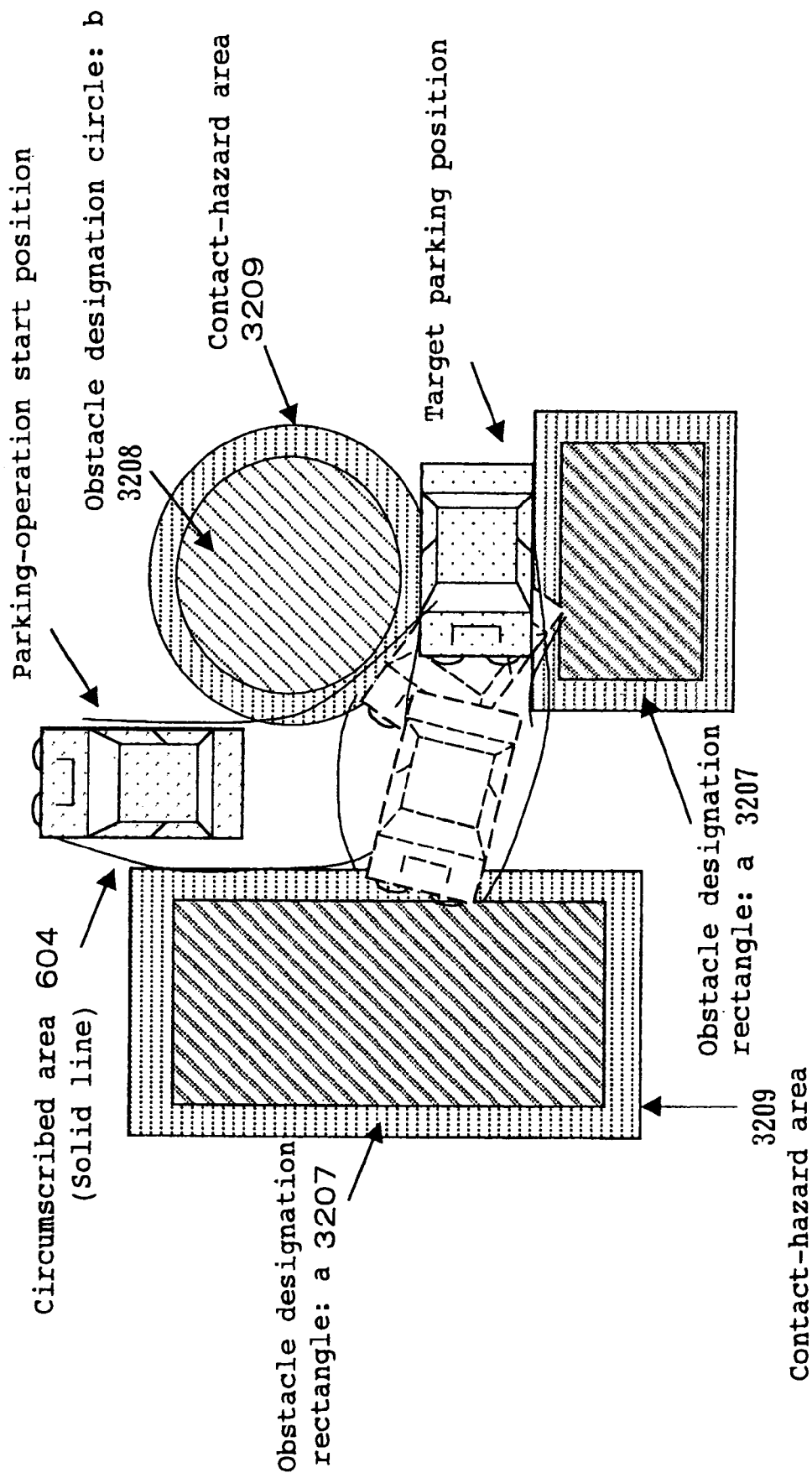
FIG. 35 is an illustration showing a synthetic image of the driving-operation assist of the eleventh embodiment of the present invention.
Figure 36:
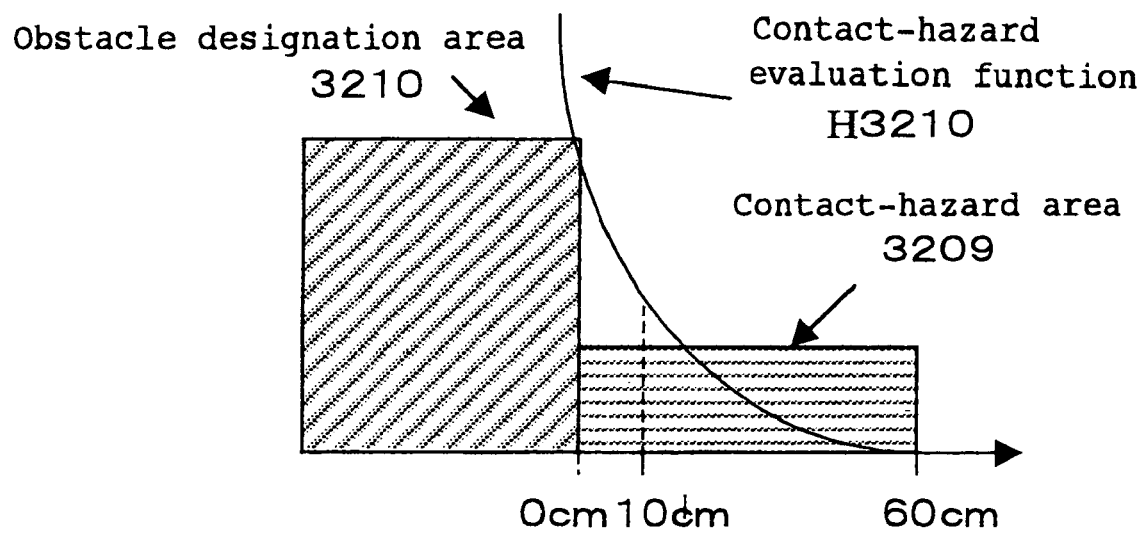
FIG. 36 is a graph for explaining a contact-hazard evaluation function of the driving-operation assist of the eleventh embodiment of the present invention.

When an obstacle area is input, the trace correcting means 1801 sets a contact-hazard area 3209 in an area having a circumference of 60 cm including the obstacle designation area: 3210 as shown in FIG. 35. Moreover, a contact-hazard evaluation function H3210 as shown in FIG. 36 is provided for the area. The function is configured by synthesizing three quadratic functions which sharply increase as approaching for 10 cm or less from the obstacle designation area: 3210, slowly decrease as separating up to 10 cm or more, and become 0 for 60 cm or more.

Figure 37:
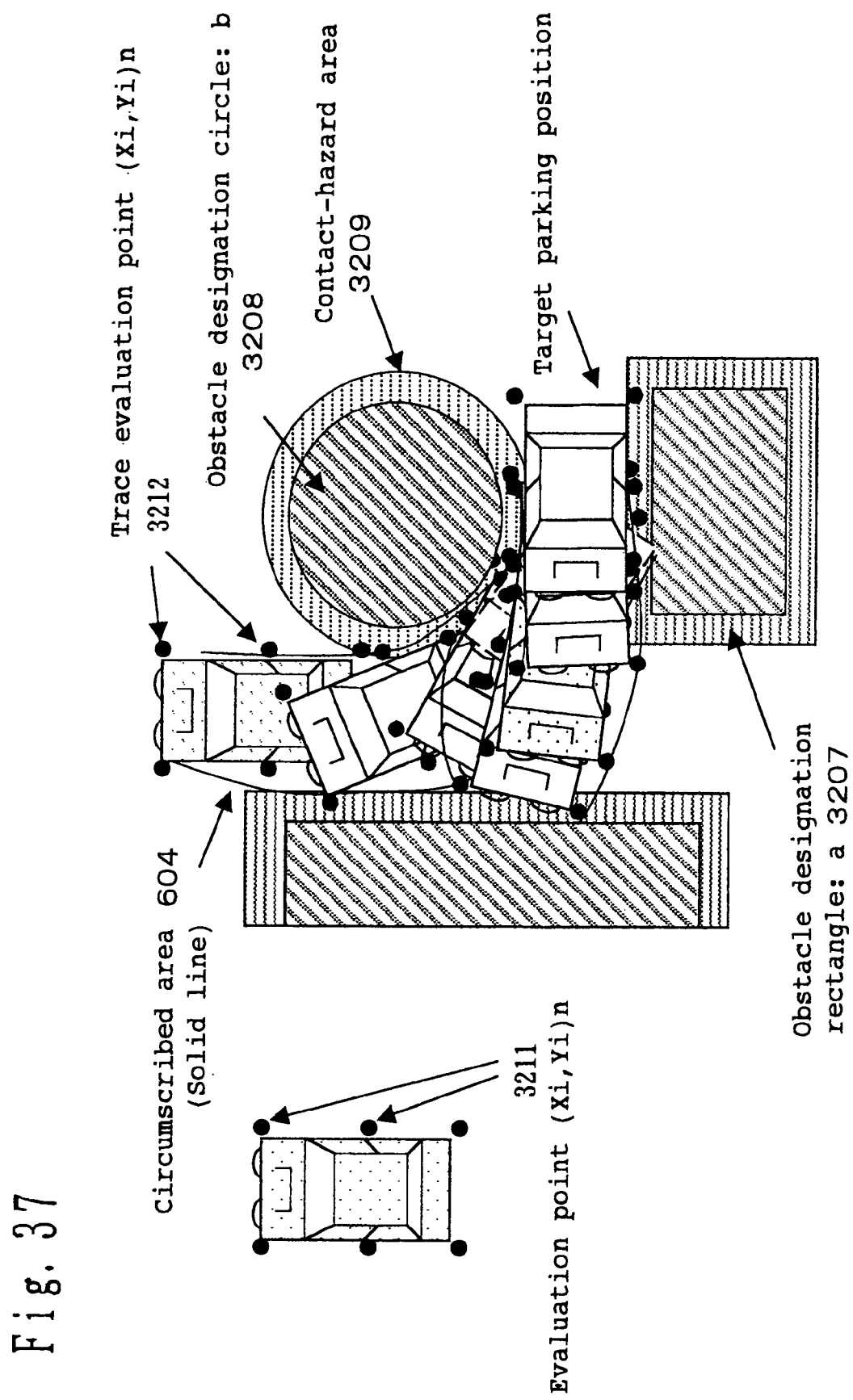
FIG. 37 is an illustration showing a synthetic image of the driving-operation assist of the eleventh embodiment of the present invention.

Moreover, as shown in FIG. 37, an evaluation point 3211 (xi,yi):(i=1-6) is set to six points around a certain area as shown in FIG. 37 and a trace evaluation point 3212 (xi,yi) n:(n=1-N) about N items (tire rotation tm and tire angle km):(m=1-N) in the table shown in FIG. 32(b) is computed.

As shown by the expression in FIG. 38, a trace-contact-hazard evaluation function H" 3213 is obtained from the total of the contact-hazard evaluation function H3210 at the position of the trace evaluation point 3212.

The trace-contact-hazard evaluation function H" 3213 becomes a function of N items (tire rotation tm and tire angle km) in the table in FIG. 32(b) as shown in FIG. 37. Therefore, by successively correcting the diagram (tire rotation tm and tire angle km) through the partial differential method, it is possible to obtain values (tire rotation tm and tire angle km) for minimizing the trace-contact-hazard evaluation function H" 3213.

Figure 39:
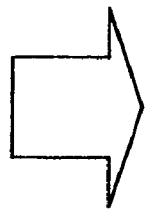
FIG. 39 shows examples of assumed movement data of the driving-operation assist of the eleventh embodiment of the present invention.

Thereby, as shown in FIG. 39, it is possible to correct an assumed-movement pattern from (tire rotation tm and tire angle km) first shown in FIG. 32(b) to (tire rotation tm and tire angle km) for minimizing the trace-contact-hazard evaluation function H" 3213.

When even one point of 10 cm or less is found in the obstacle designation area: 3210 from the contact-hazard evaluation function H about each point of trace evaluation points 3212 (xi,yi)n in (tire rotation tm and tire angle km) for minimizing the trace-contact-hazard evaluation function H" 3213, a warning Careful" is issued to a driver. When even one point of 0 cm or less is found in the obstacle designation area: 3210, a warning Parking not possible" is issued to a driver.

Figure 40:
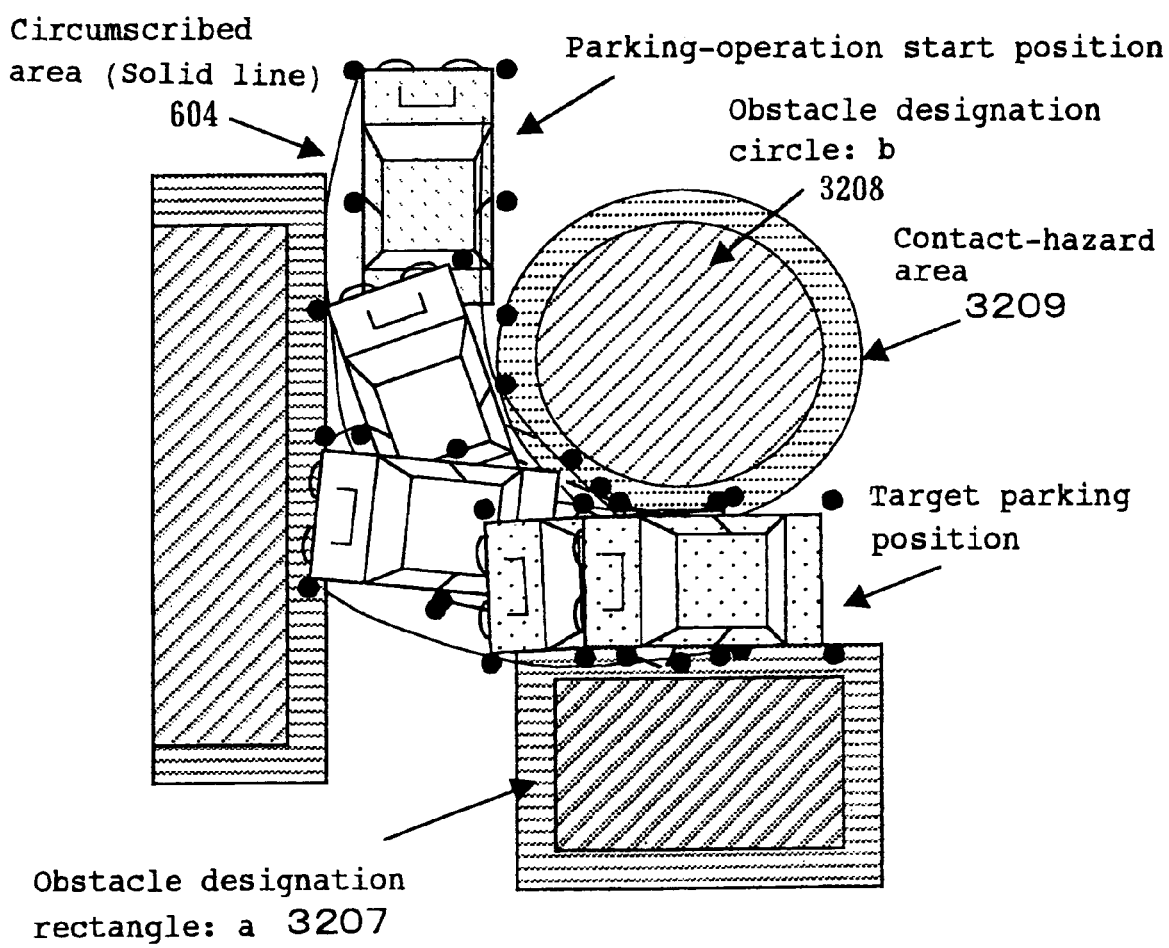
FIG. 40 is an illustration showing a synthetic image of the driving-operation assist of the eleventh embodiment of the present invention.

Because the corrected assumed-movement pattern is a movement pattern for minimizing the trace-contact-hazard evaluation function H" 3213, the assumed-movement pattern generates a trace having a larger margin from an obstacle as shown in FIG. 40 and thereby, a vehicle can be parked more safely.

Figure 41:
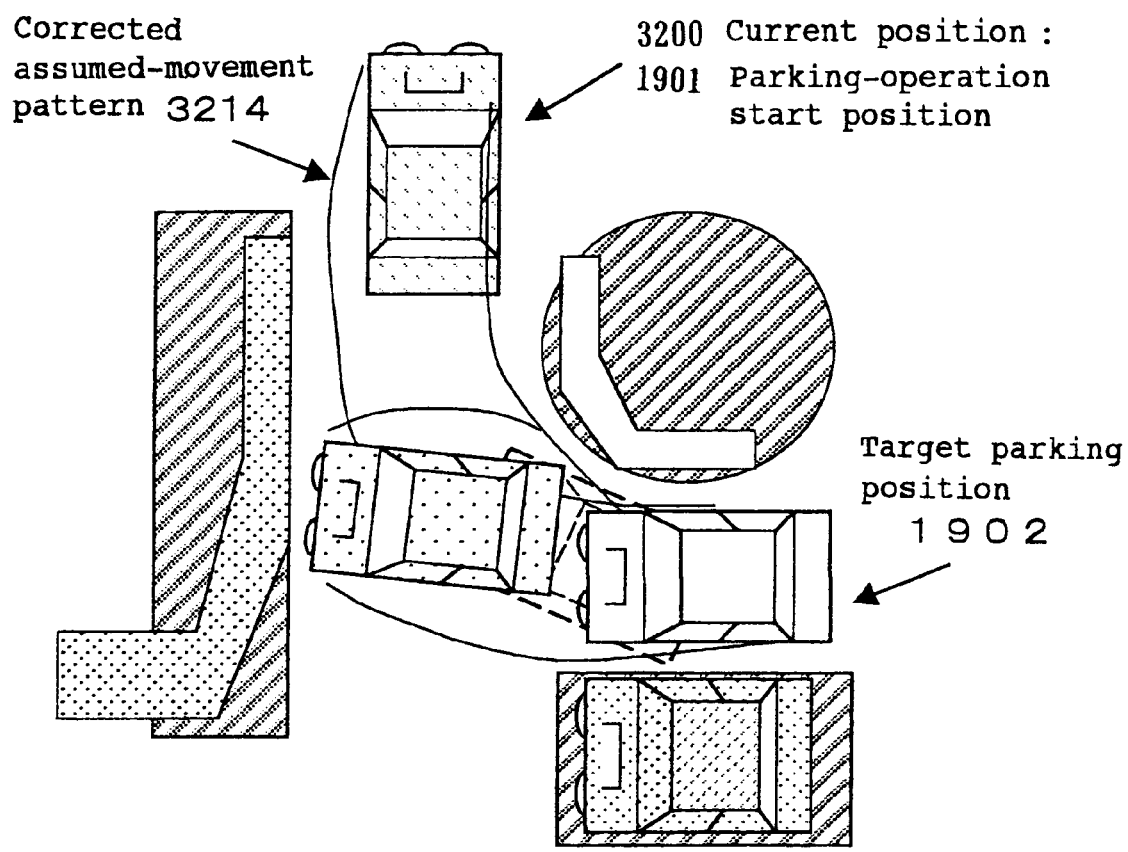
FIG. 41 is an illustration showing a synthetic image of the driving-operation assist of the eleventh embodiment of the present invention.

As shown in FIG. 41, the superimposing means 102 generates a synthetic image by adjusting the operation start position 1901 of a corrected assumed-movement pattern 3214 to a current vehicle position 3200 and the displaying means 107 displays the synthetic image.

Therefore, when a driver starts a driving operation (parking operation) of a vehicle in accordance with the new corrected assumed-movement pattern 3214, the driver can park the vehicle at the target parking position 1902 in accordance with a movement pattern having a larger margin from an obstacle.

It is permitted to store generated new assumed-movement pattern and time-series data in the assumed-movement-pattern storing means 108 by updating an original assumed-movement pattern or to additionally store the new assumed-movement pattern in the means 108 without changing the original assumed-movement pattern. Moreover, it is permitted to temporarily use them without storing them. Furthermore, it is permitted that a driver selects renewed storage, additional storage, or non-storage each time.

Furthermore, this embodiment is described above by assuming that an assumed-movement pattern to be renewedly-stored or additionally-stored in the assumed-movement-pattern storing means 108 can be automatically obtained in accordance with a position of a vehicle at start or end of a movement input from a driver. However, it is also permitted to perform an actual driving operation and thereby, sample time-series data for the then steering angle of a steering wheel and the number of revolutions of wheels, generate an assumed-movement pattern in accordance with the time-series data, and store the pattern.

Twelfth Embodiment

Then, a twelfth embodiment of the present invention will be described below by referring to FIGS. 42 to 46.

Figure 42:
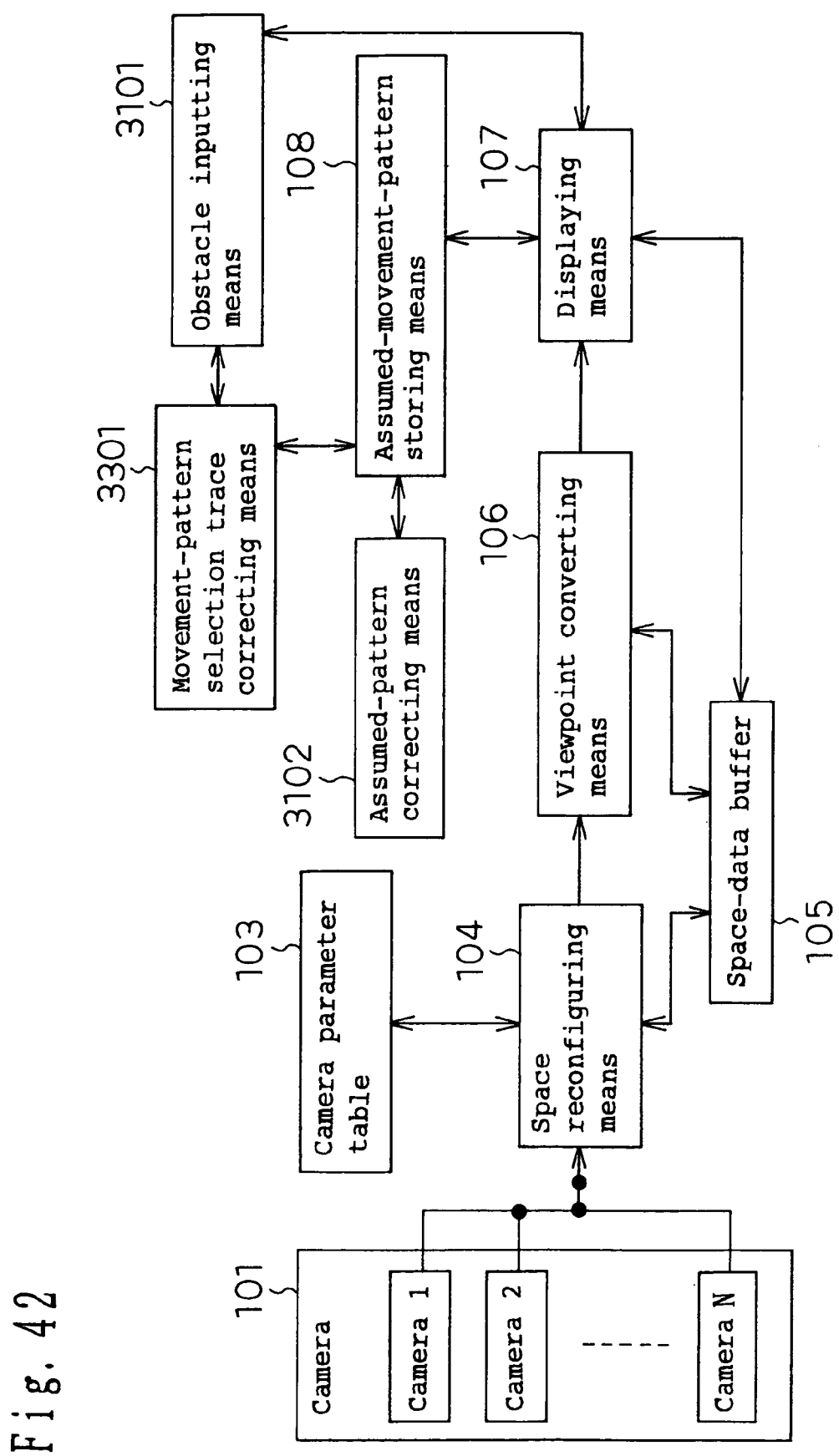
FIG. 42 is a block diagram showing a configuration of a driving-operation assist of a twelfth embodiment of the present invention.

In the eleventh embodiment, it is assumed that an assumed-movement pattern shown in FIG. 32(a) is corrected in accordance with an obstacle area input from a driver. However, it is also permitted to correct two assumed-movement patterns or more and select a preferable one. FIG. 42 is different from FIG. 31 in that movement-pattern selection trace correcting means 3301 is used instead of the trace correcting means 3101.

Figure 44:
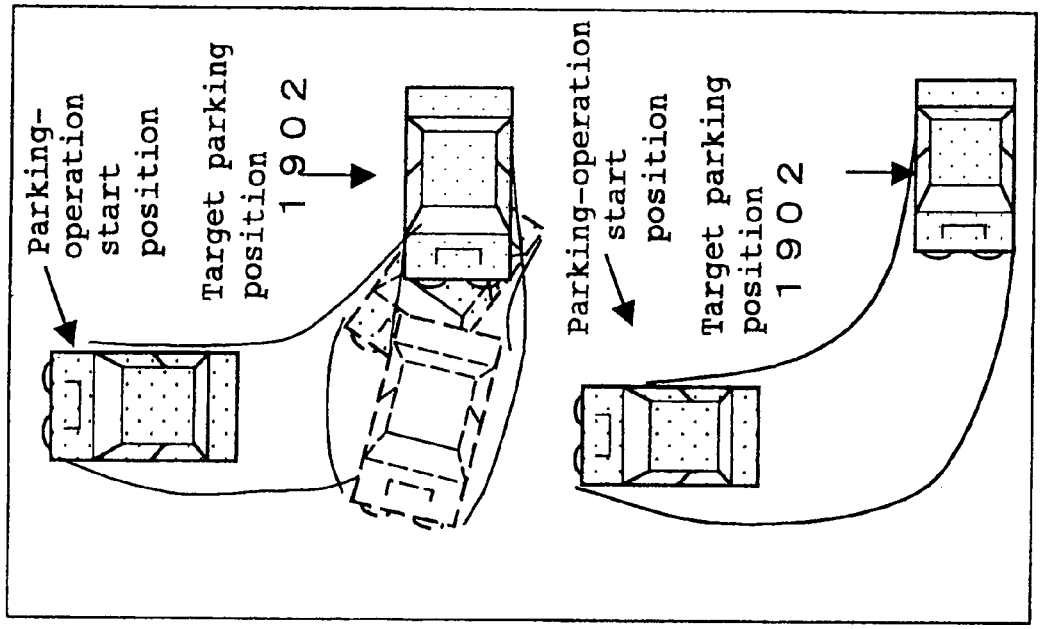
FIG. 44 is a block diagram showing a configuration of the driving-operation assist of the twelfth embodiment of the present invention.
Figure 43:
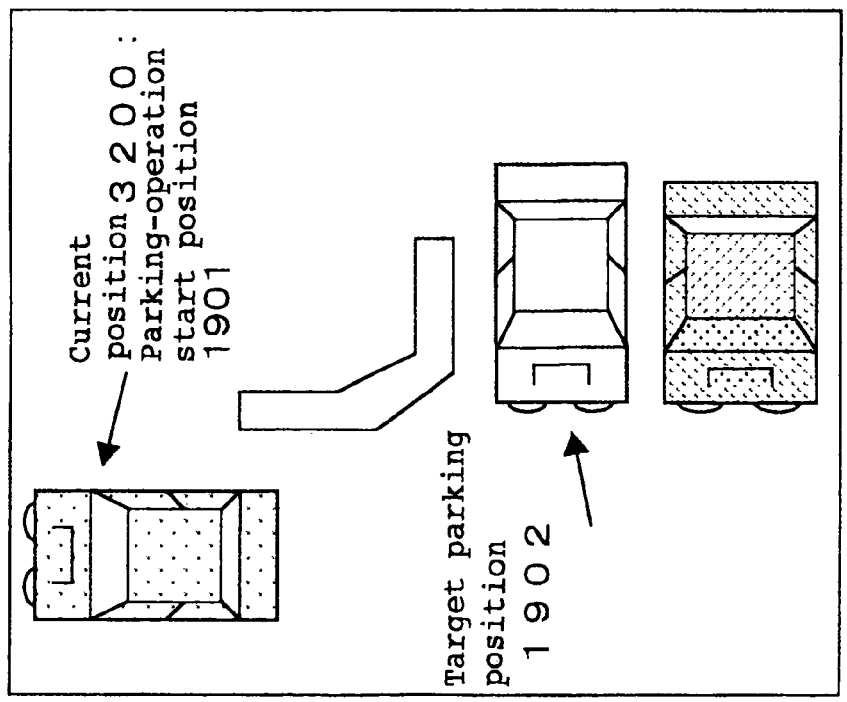
FIG. 43 is an illustration showing a synthetic image of the driving-operation assist of the twelfth embodiment of the present invention.

First, operations of the twelfth embodiment are described. As shown in FIG. 43, a driver designates and inputs the target parking position 1902 on an image displayed on a display unit by assuming a current vehicle position as a parking-operation start position. The movement-pattern selection trace correcting means 3301 extracts two assumed-movement patterns for parking a vehicle right backward as shown in FIG. 44 in accordance with a rough positional relation of the target parking position 1902 to the parking-operation start position out of a plurality of assumed-movement patterns stored in the assumed-movement-pattern storing means 108.

Figure 46:
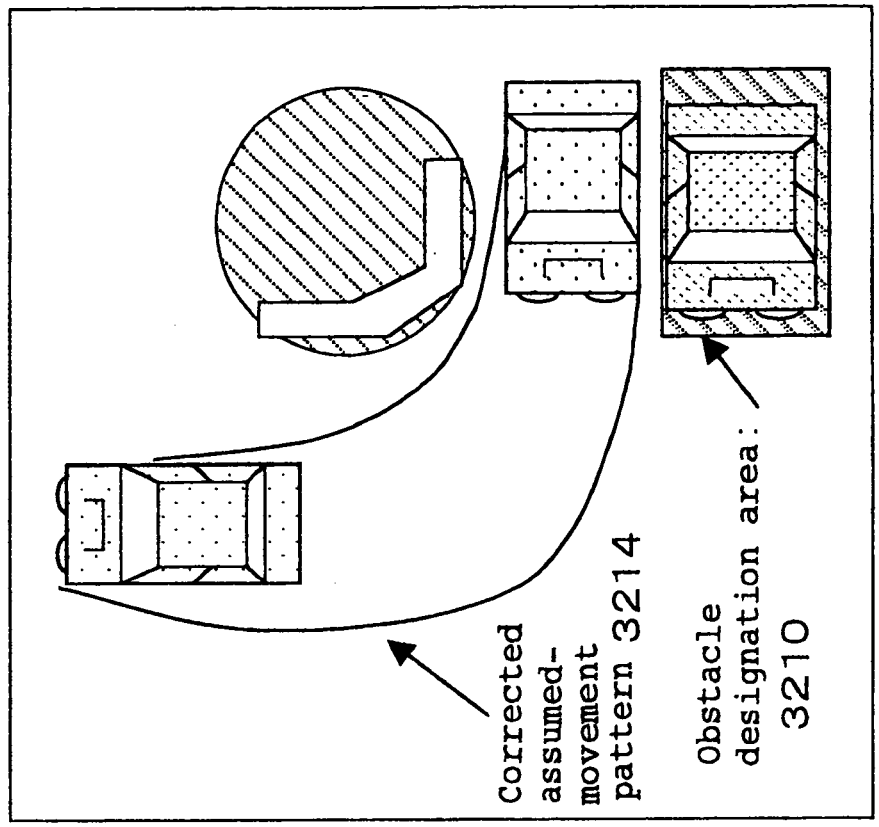
FIG. 46 is an illustration showing a synthetic image of the driving-operation assist of the twelfth embodiment of the present invention.
Figure 45:
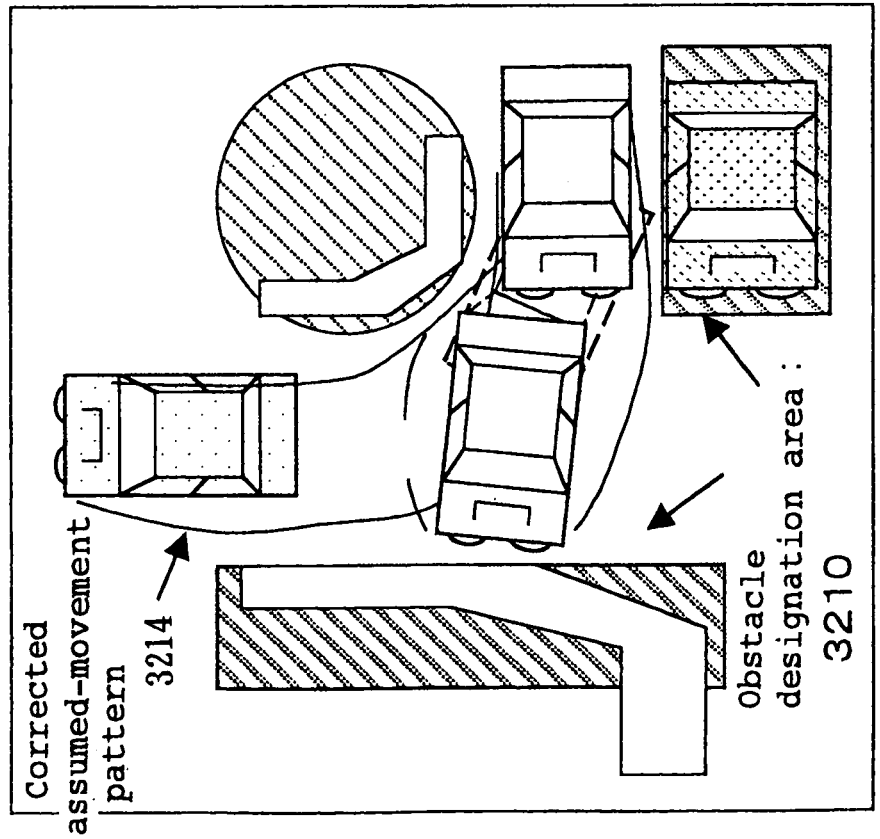
FIG. 45 is an illustration showing a synthetic image of the driving-operation assist of the twelfth embodiment of the present invention.

Moreover, as shown in FIGS. 45 and 46, when the driver inputs an obstacle area on the image displayed on the display unit, the two assumed-movement patterns for respectively minimizing the trace-contact-hazard evaluation function H" 3213 are corrected similarly to the case of the eleventh embodiment. In this case, by comparing the two minimized trace-contact-hazard evaluation functions H" 3213 with each other and selecting a smaller one of the two functions H" 3213, it is possible to select a safer assumed-movement pattern. Moreover, when the two trace-contact-hazard evaluation functions H" 3213 have the same value, a simpler assumed-movement pattern is selected by previously raising the priority of a function H" 3213 allowing a simpler driving operation.

Therefore, when a spatial margin from an obstacle is small, a safer movement pattern having a cutback is automatically selected as shown in FIG. 45. However, when a spatial margin from an obstacle is large, a simpler movement pattern having no cutback is automatically selected as shown in FIG. 446 [sic; FIG. 46].

According to the above configuration, a driver can automatically select an optimum assumed-movement pattern only by inputting a target parking position and an obstacle area and thereby realize optimum parking through a safer and simpler driving operation.

According to this embodiment, it is possible to realize an extensible driving-operation assist compared to the driving-operation assist of the first embodiment.

The above first to twelfth embodiments are described by assuming that circumferential-state imaging means of the present invention mainly generates an image viewed from a viewpoint of a virtual camera by using a plurality of vehicle-mounted cameras. However, it is also permitted to use one camera set to the ceiling of a roof-provided parking lot. In short, it is possible to use any type of means as circumferential-state imaging means of the present invention as long as the means generates a circumferential-state image by imaging a circumferential state of a vehicle with a camera and/or stores the generated circumferential-state image.

Moreover, the above first to twelfth embodiments are described by assuming that driving-operation assist of the embodiments are respectively provided with assumed-movement-pattern storing means of the present invention. However, it is also permitted to use any type of means as assumed-movement-pattern storing means of the present invention as long as an assumed-movement pattern can be input to the means each time. In short, it is permitted to use any type of driving-operation assist as driving-operation assist of the present invention as long as the driving-operation assist includes circumferential-state imaging means for imaging a circumferential state of a vehicle with a camera and thereby generating a circumferential-state image and/or storing the circumferential-state image, synthetic-image generating means for superimposing on the circumferential-state image, an assumed-movement pattern which is video data showing movement of the vehicle in the case of performing a predetermined series of driving operations for the vehicle and generating a synthetic image, and displaying means for displaying the synthetic image. Thereby, because at least a circumferential-state image and an assumed-movement pattern are superimposed on each other and displayed on a synthetic screen, a driver can confirm the relation between the circumferential-state image and the assumed-movement pattern at a glance.

INDUSTRIAL APPLICABILITY

As apparent from the above description, the present invention provides a driving-operation assist by which a driver can directly confirm the relation between vehicle movement according to a predetermined series of driving operations and a circumferential state by displaying the vehicle movement when the driver performs the predetermined series of driving operations together with the circumferential sate and a driver's load can be reduced.

That is, a driver can confirm a position for starting a driving operation such as garaging or parallel parking, a place for finally stopping a vehicle, and a positional relation with an obstacle such as other vehicle by the display image at a glance by using a driving-operation assist of the present invention. Therefore, it is expected that a driver's operation load is reduced and safety is improved. Moreover, by introducing an automatic-driving technique, it is possible to automatically perform every operation including garaging only by driver's moving a vehicle up to a parking-operation start position while viewing the movement trace data.

Furthermore, the present invention provides a recording medium for storing a program for making a computer execute all or some of functions of each means of a driving-operation assist of the present invention.

The invention claimed is:

1. A vehicle operation assist for a vehicle mounted with a camera, said vehicle operation assist comprising:
    an imaging unit operable to generate a circumferential state image using an output image from the camera, said circumferential state image viewed from a virtual viewpoint, said virtual viewpoint being different from a viewpoint of the camera;
    a synthetic-image generating unit operable to generate a synthetic image by using the circumferential state image and an assumed-movement pattern image which is based on a predetermined driving operation of the vehicle, the assumed-movement pattern image including a movement of the vehicle between a start position of the vehicle and a parking position of the vehicle in case of performing the predetermined driving operation; and
    a display unit operable to display the synthetic image,
    wherein the assumed-movement pattern image includes tire traces.

2. A method of vehicle operation assist comprising the steps of:
    (a) imaging a circumferential state of a vehicle;
    (b) generating a circumferential-state image of the vehicle as viewed from a virtual viewpoint based on the imaging of step (a);
    (c) generating a synthetic image of the vehicle by using the circumferential state image of the vehicle with respect to an assumed-movement pattern image which is obtained from a series of a predetermined driving operation for the vehicle, the assumed-movement pattern image including a movement of the vehicle between a start position of the vehicle and a parking position of the vehicle in case of performing the predetermined driving operation; and
    (d) displaying the synthetic image of the vehicle,
    wherein the assumed-movement pattern image includes tire traces.

* * * * *

UNITED STATES PATENT AND TRADEMARK OFFICE
CERTIFICATE OF CORRECTION

PATENT NO. : 7,277,123 B1
APPLICATION NO. : 09/581004
DATED : October 2, 2007
INVENTOR(S) : Shushaku Okamoto et al.

It is certified that error appears in the above-identified patent and that said Letters Patent is hereby corrected as shown below:

On the Title Page Item 56 Reference Cited FOREIGN PATENT DOCUMENTS, Delete duplicate reference WO 02/01876 A1 2/2002.

Signed and Sealed this

Twenty-ninth Day of April, 2008

JON W. DUDAS
*Director of the United States Patent and Trademark Office*